US012810015B2

(12) United States Patent
Patel et al.

(10) Patent No.: US 12,810,015 B2
(45) Date of Patent: Nov. 24, 2026

(54) COMPUTING PLATFORM FOR FACILITATING DATA EXCHANGE AMONG COMPUTING ENVIRONMENTS

(71) Applicant: OneTrust, LLC, Atlanta, GA (US)

(72) Inventors: Shiven Patel, Fayetteville, GA (US); Jason L. Sabourin, Dewitt, MI (US); Sinu John, Vancouver (CA); Siju George, Atlanta, GA (US); Ashish R., Bangalore (IN); Shivakumar Umadi, Hubballi (IN); Sahaj Rao, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 18/917,913

(22) Filed: Oct. 16, 2024

(65) Prior Publication Data

US 2025/0036796 A1 Jan. 30, 2025

Related U.S. Application Data

(62) Division of application No. 17/881,076, filed on Aug. 4, 2022, now Pat. No. 12,153,704.

(60) Provisional application No. 63/229,854, filed on Aug. 5, 2021.

(51) Int. Cl.
*G06F 21/62* (2013.01)
*H04L 9/40* (2022.01)
*H04L 67/306* (2022.01)

(52) U.S. Cl.
CPC ........ *G06F 21/6236* (2013.01); *H04L 63/102* (2013.01); *H04L 67/306* (2013.01)

(58) Field of Classification Search
USPC ........................................................ 726/27
See application file for complete search history.

(56) References Cited

U.S. PATENT DOCUMENTS

| | | | |
|---|---|---|---|
| 4,536,866 | A | 8/1985 | Jerome et al. |
| 4,574,350 | A | 3/1986 | Starr |
| 5,193,162 | A | 3/1993 | Bordsen et al. |
| 5,276,735 | A | 1/1994 | Boebert et al. |

(Continued)

FOREIGN PATENT DOCUMENTS

| | | |
|---|---|---|
| CN | 111496802 | 8/2020 |
| CN | 112115859 | 12/2020 |

(Continued)

OTHER PUBLICATIONS

Advisory Action, dated Jan. 13, 2021, from corresponding U.S. Appl. No. 16/808,493.

(Continued)

*Primary Examiner* — Sakinah White-Taylor
(74) *Attorney, Agent, or Firm* — Ballard Spahr LLP

(57) ABSTRACT

Various aspects of the disclosure provide methods, apparatus, systems, computing devices, computing entities, and/or the like for facilitating the exchange of data among a diverse group of first and third party computing environments. Accordingly, various aspects of the disclosure provide a data exchange computing platform that facilitates data exchange among a diverse group of first and third party computing environments. In some aspects, the data exchange computing platform provides a data exchange service available to various first and third parties who wish to exchange data.

20 Claims, 12 Drawing Sheets

(56) References Cited

U.S. PATENT DOCUMENTS

| | | | |
|---|---|---|---|
| 5,329,447 | A | 7/1994 | Leedom, Jr. |
| 5,404,299 | A | 4/1995 | Tsurubayashi et al. |
| 5,535,393 | A | 7/1996 | Reeve et al. |
| 5,560,005 | A | 9/1996 | Hoover et al. |
| 5,668,986 | A | 9/1997 | Nilsen et al. |
| 5,710,917 | A | 1/1998 | Musa et al. |
| 5,761,529 | A | 6/1998 | Raji |
| 5,764,906 | A | 6/1998 | Edelstein et al. |
| 5,872,973 | A | 2/1999 | Mitchell et al. |
| 5,913,041 | A | 6/1999 | Ramanathan et al. |
| 5,913,214 | A | 6/1999 | Madnick et al. |
| 6,016,394 | A | 1/2000 | Walker |
| 6,122,627 | A | 9/2000 | Carey et al. |
| 6,148,297 | A | 11/2000 | Swor et al. |
| 6,148,342 | A | 11/2000 | Ho |
| 6,240,416 | B1 | 5/2001 | Immon et al. |
| 6,243,816 | B1 | 6/2001 | Fang et al. |
| 6,253,203 | B1 | 6/2001 | Oflaherty et al. |
| 6,263,335 | B1 | 7/2001 | Paik et al. |
| 6,272,631 | B1 | 8/2001 | Thomlinson et al. |
| 6,275,824 | B1 | 8/2001 | Oflaherty et al. |
| 6,282,548 | B1 | 8/2001 | Burner et al. |
| 6,330,562 | B1 | 12/2001 | Boden et al. |
| 6,363,488 | B1 | 3/2002 | Ginter et al. |
| 6,374,237 | B1 | 4/2002 | Reese |
| 6,374,252 | B1 | 4/2002 | Althoff et al. |
| 6,408,336 | B1 | 6/2002 | Schneider et al. |
| 6,427,230 | B1 | 7/2002 | Goiffon et al. |
| 6,442,688 | B1 | 8/2002 | Moses et al. |
| 6,446,120 | B1 | 9/2002 | Dantressangle |
| 6,463,488 | B1 | 10/2002 | San Juan |
| 6,484,149 | B1 | 11/2002 | Jammes et al. |
| 6,484,180 | B1 | 11/2002 | Lyons et al. |
| 6,516,314 | B1 | 2/2003 | Birkler et al. |
| 6,516,337 | B1 | 2/2003 | Tripp et al. |
| 6,519,571 | B1 | 2/2003 | Guheen et al. |
| 6,574,631 | B1 | 6/2003 | Subramanian et al. |
| 6,591,272 | B1 | 7/2003 | Williams |
| 6,601,233 | B1 | 7/2003 | Underwood |
| 6,606,744 | B1 | 8/2003 | Mikurak |
| 6,611,812 | B2 | 8/2003 | Hurtado et al. |
| 6,625,602 | B1 | 9/2003 | Meredith et al. |
| 6,629,081 | B1 | 9/2003 | Cornelius et al. |
| 6,633,878 | B1 | 10/2003 | Underwood |
| 6,662,192 | B1 | 12/2003 | Rebane |
| 6,662,357 | B1 | 12/2003 | Bowman-Amuah |
| 6,697,824 | B1 | 2/2004 | Bowman-Amuah |
| 6,699,042 | B2 | 3/2004 | Smith et al. |
| 6,701,314 | B1 | 3/2004 | Conover et al. |
| 6,721,713 | B1 | 4/2004 | Guheen et al. |
| 6,725,200 | B1 | 4/2004 | Rost |
| 6,732,109 | B2 | 5/2004 | Lindberg et al. |
| 6,754,665 | B1 | 6/2004 | Futagami et al. |
| 6,755,344 | B1 | 6/2004 | Mollett et al. |
| 6,757,685 | B2 | 6/2004 | Raffaele et al. |
| 6,757,888 | B1 | 6/2004 | Knutson et al. |
| 6,779,095 | B2 | 8/2004 | Selkirk et al. |
| 6,816,944 | B2 | 11/2004 | Peng |
| 6,826,693 | B1 | 11/2004 | Yoshida et al. |
| 6,850,252 | B1 | 2/2005 | Hoffberg |
| 6,886,101 | B2 | 4/2005 | Glazer et al. |
| 6,901,346 | B2 | 5/2005 | Tracy et al. |
| 6,904,417 | B2 | 6/2005 | Clayton et al. |
| 6,909,897 | B2 | 6/2005 | Kikuchi |
| 6,912,676 | B1 | 6/2005 | Gusler et al. |
| 6,925,443 | B1 | 8/2005 | Baggett, Jr. et al. |
| 6,938,041 | B1 | 8/2005 | Brandow et al. |
| 6,956,845 | B2 | 10/2005 | Baker et al. |
| 6,978,270 | B1 | 12/2005 | Carty et al. |
| 6,980,927 | B2 | 12/2005 | Tracy et al. |
| 6,980,987 | B2 | 12/2005 | Kaminer |
| 6,983,221 | B2 | 1/2006 | Tracy et al. |
| 6,985,887 | B1 | 1/2006 | Sunstein et al. |
| 6,990,454 | B2 | 1/2006 | McIntosh |
| 6,993,448 | B2 | 1/2006 | Tracy et al. |
| 6,993,495 | B2 | 1/2006 | Smith, Jr. et al. |
| 6,996,807 | B1 | 2/2006 | Vardi et al. |
| 7,003,560 | B1 | 2/2006 | Mullen et al. |
| 7,003,662 | B2 | 2/2006 | Genty et al. |
| 7,013,290 | B2 | 3/2006 | Ananian |
| 7,017,105 | B2 | 3/2006 | Flanagin et al. |
| 7,023,979 | B1 | 4/2006 | Wu et al. |
| 7,039,594 | B1 | 5/2006 | Gersting |
| 7,039,654 | B1 | 5/2006 | Eder |
| 7,047,517 | B1 | 5/2006 | Brown et al. |
| 7,051,036 | B2 | 5/2006 | Rosnow et al. |
| 7,051,038 | B1 | 5/2006 | Yeh et al. |
| 7,058,970 | B2 | 6/2006 | Shaw |
| 7,069,427 | B2 | 6/2006 | Adler et al. |
| 7,076,558 | B1 | 7/2006 | Dunn |
| 7,093,200 | B2 | 8/2006 | Schreiber et al. |
| 7,095,854 | B1 | 8/2006 | Ginter et al. |
| 7,100,195 | B1 | 8/2006 | Underwood |
| 7,120,800 | B2 | 10/2006 | Ginter et al. |
| 7,124,101 | B1 | 10/2006 | Mikurak |
| 7,124,107 | B1 | 10/2006 | Pishevar et al. |
| 7,127,705 | B2 | 10/2006 | Christfort et al. |
| 7,127,741 | B2 | 10/2006 | Bandini et al. |
| 7,133,845 | B1 | 11/2006 | Ginter et al. |
| 7,139,999 | B2 | 11/2006 | Bowman-Amuah |
| 7,143,091 | B2 | 11/2006 | Charnock et al. |
| 7,149,698 | B2 | 12/2006 | Guheen et al. |
| 7,165,041 | B1 | 1/2007 | Guheen et al. |
| 7,167,842 | B1 | 1/2007 | Josephson, II et al. |
| 7,167,844 | B1 | 1/2007 | Leong et al. |
| 7,171,379 | B2 | 1/2007 | Menninger et al. |
| 7,181,438 | B1 | 2/2007 | Szabo |
| 7,203,929 | B1 | 4/2007 | Vinodkrishnan et al. |
| 7,213,233 | B1 | 5/2007 | Vinodkrishnan et al. |
| 7,216,340 | B1 | 5/2007 | Vinodkrishnan et al. |
| 7,219,066 | B2 | 5/2007 | Parks et al. |
| 7,223,234 | B2 | 5/2007 | Stupp et al. |
| 7,225,460 | B2 | 5/2007 | Barzilai et al. |
| 7,234,065 | B2 | 6/2007 | Breslin et al. |
| 7,247,625 | B2 | 7/2007 | Zhang et al. |
| 7,251,624 | B1 | 7/2007 | Lee et al. |
| 7,260,830 | B2 | 8/2007 | Sugimoto |
| 7,266,566 | B1 | 9/2007 | Kennaley et al. |
| 7,272,818 | B2 | 9/2007 | Ishimitsu et al. |
| 7,275,063 | B2 | 9/2007 | Horn |
| 7,281,020 | B2 | 10/2007 | Fine |
| 7,284,232 | B1 | 10/2007 | Bates et al. |
| 7,284,271 | B2 | 10/2007 | Lucovsky et al. |
| 7,287,280 | B2 | 10/2007 | Young |
| 7,290,275 | B2 | 10/2007 | Baudoin et al. |
| 7,293,119 | B2 | 11/2007 | Beale |
| 7,299,299 | B2 | 11/2007 | Hollenbeck et al. |
| 7,302,569 | B2 | 11/2007 | Betz et al. |
| 7,313,575 | B2 | 12/2007 | Carr et al. |
| 7,313,699 | B2 | 12/2007 | Koga |
| 7,313,825 | B2 | 12/2007 | Redlich et al. |
| 7,315,826 | B1 | 1/2008 | Guheen et al. |
| 7,315,849 | B2 | 1/2008 | Bakalash et al. |
| 7,322,047 | B2 | 1/2008 | Redlich et al. |
| 7,330,850 | B1 | 2/2008 | Seibel et al. |
| 7,340,447 | B2 | 3/2008 | Ghatare |
| 7,340,776 | B2 | 3/2008 | Zobel et al. |
| 7,343,434 | B2 | 3/2008 | Kapoor et al. |
| 7,346,518 | B1 | 3/2008 | Frank et al. |
| 7,353,204 | B2 | 4/2008 | Liu |
| 7,353,283 | B2 | 4/2008 | Henaff et al. |
| 7,356,559 | B1 | 4/2008 | Jacobs et al. |
| 7,367,014 | B2 | 4/2008 | Griffin |
| 7,370,025 | B1 | 5/2008 | Pandit |
| 7,376,835 | B2 | 5/2008 | Olkin et al. |
| 7,380,120 | B1 | 5/2008 | Garcia |
| 7,382,903 | B2 | 6/2008 | Ray |
| 7,383,570 | B2 | 6/2008 | Pinkas et al. |
| 7,391,854 | B2 | 6/2008 | Salonen et al. |
| 7,398,393 | B2 | 7/2008 | Mont et al. |
| 7,401,235 | B2 | 7/2008 | Mowers et al. |
| 7,403,942 | B1 | 7/2008 | Bayliss |
| 7,409,354 | B2 | 8/2008 | Putnam et al. |
| 7,412,402 | B2 | 8/2008 | Cooper |

(56) References Cited

U.S. PATENT DOCUMENTS 7,424,680 B2 9/2008 Carpenter
7,428,546 B2 9/2008 Nori et al.
7,428,707 B2 9/2008 Quimby
7,430,585 B2 9/2008 Sibert
7,454,457 B1 11/2008 Lowery et al.
7,454,508 B2 11/2008 Mathew et al.
7,478,157 B2 1/2009 Bohrer et al.
7,480,694 B2 1/2009 Blennerhassett et al.
7,480,755 B2 1/2009 Herrell et al.
7,487,170 B2 2/2009 Stevens
7,493,282 B2 2/2009 Manly et al.
7,500,607 B2 3/2009 Williams
7,512,987 B2 3/2009 Williams
7,516,882 B2 4/2009 Cucinotta
7,523,053 B2 4/2009 Pudhukottai et al.
7,529,836 B1 5/2009 Bolen
7,533,113 B1 5/2009 Haddad
7,548,968 B1 6/2009 Bura et al.
7,552,480 B1 6/2009 Voss
7,562,339 B2 7/2009 Racca et al.
7,565,685 B2 7/2009 Ross et al.
7,567,541 B2 7/2009 Karimi et al.
7,584,505 B2 9/2009 Mondri et al.
7,584,508 B1 9/2009 Kashchenko et al.
7,587,749 B2 9/2009 Leser et al.
7,590,705 B2 9/2009 Mathew et al.
7,590,972 B2 9/2009 Axelrod et al.
7,603,356 B2 10/2009 Schran et al.
7,606,783 B1 10/2009 Carter
7,606,790 B2 10/2009 Levy
7,607,120 B2 10/2009 Sanyal et al.
7,613,700 B1 11/2009 Lobo et al.
7,617,136 B1 11/2009 Lessing et al.
7,617,167 B2 11/2009 Griffis et al.
7,620,644 B2 11/2009 Cote et al.
7,627,666 B1 12/2009 Degiulio et al.
7,630,874 B2 12/2009 Fables et al.
7,630,998 B2 12/2009 Zhou et al.
7,636,742 B1 12/2009 Olavarrieta et al.
7,640,322 B2 12/2009 Wendkos et al.
7,650,497 B2 1/2010 Thornton et al.
7,653,592 B1 1/2010 Flaxman et al.
7,657,476 B2 2/2010 Barney
7,657,694 B2 2/2010 Mansell et al.
7,665,073 B2 2/2010 Meijer et al.
7,665,125 B2 2/2010 Heard et al.
7,668,947 B2 2/2010 Hutchinson et al.
7,673,282 B2 3/2010 Amaru et al.
7,676,034 B1 3/2010 Wu et al.
7,681,034 B1 3/2010 Lee et al.
7,681,140 B2 3/2010 Ebert
7,685,561 B2 3/2010 Deem et al.
7,685,577 B2 3/2010 Pace et al.
7,693,593 B2 4/2010 Ishibashi et al.
7,698,398 B1 4/2010 Lai
7,702,639 B2 4/2010 Stanley et al.
7,707,224 B2 4/2010 Chastagnol et al.
7,711,995 B1 5/2010 Morris
7,712,029 B2 5/2010 Ferreira et al.
7,716,242 B2 5/2010 Pae et al.
7,725,474 B2 5/2010 Tamai et al.
7,725,875 B2 5/2010 Waldrep
7,729,940 B2 6/2010 Harvey et al.
7,730,142 B2 6/2010 Levasseur et al.
7,752,124 B2 7/2010 Green et al.
7,756,826 B2 7/2010 Bots et al.
7,756,987 B2 7/2010 Wang et al.
7,761,586 B2 7/2010 Olenick et al.
7,774,745 B2 8/2010 Fildebrandt et al.
7,788,212 B2 8/2010 Beckmann et al.
7,788,222 B2 8/2010 Shah et al.
7,788,632 B2 8/2010 Kuester et al.
7,788,726 B2 8/2010 Teixeira
7,797,726 B2 9/2010 Ashley et al.
7,801,758 B2 9/2010 Gracie et al.
7,801,826 B2 9/2010 Labrou et al.
7,801,912 B2 9/2010 Ransil et al.
7,802,305 B1 9/2010 Leeds
7,805,349 B2 9/2010 Yu et al.
7,805,451 B2 9/2010 Hosokawa
7,813,947 B2 10/2010 Deangelis et al.
7,822,620 B2 10/2010 Dixon et al.
7,827,523 B2 11/2010 Ahmed et al.
7,844,640 B2 11/2010 Bender et al.
7,849,143 B2 12/2010 Vuong
7,853,468 B2 12/2010 Callahan et al.
7,853,470 B2 12/2010 Sonnleithner et al.
7,853,925 B2 12/2010 Kemmler
7,860,816 B2 12/2010 Fokoue-Nkoutche et al.
7,870,540 B2 1/2011 Zare et al.
7,870,608 B2 1/2011 Shraim et al.
7,873,541 B1 1/2011 Klar et al.
7,877,327 B2 1/2011 Gwiazda et al.
7,877,812 B2 1/2011 Koved et al.
7,885,841 B2 2/2011 King
7,890,461 B2 2/2011 Oeda et al.
7,895,260 B2 2/2011 Archer et al.
7,904,360 B2 3/2011 Evans
7,904,478 B2 3/2011 Yu et al.
7,904,487 B2 3/2011 Ghatare
7,917,888 B2 3/2011 Chong et al.
7,917,963 B2 3/2011 Goyal et al.
7,921,152 B2 4/2011 Ashley et al.
7,930,197 B2 4/2011 Ozzie et al.
7,930,753 B2 4/2011 Mellinger et al.
7,953,725 B2 5/2011 Burris et al.
7,954,150 B2 5/2011 Croft et al.
7,958,087 B2 6/2011 Blumenau
7,958,494 B2 6/2011 Chaar et al.
7,962,900 B2 6/2011 Barraclough et al.
7,966,310 B2 6/2011 Sullivan et al.
7,966,599 B1 6/2011 Malasky et al.
7,966,663 B2 6/2011 Strickland et al.
7,974,992 B2 7/2011 Fastabend et al.
7,975,000 B2 7/2011 Dixon et al.
7,991,559 B2 8/2011 Dzekunov et al.
7,991,747 B1 8/2011 Upadhyay et al.
7,996,372 B2 8/2011 Rubel, Jr.
8,005,891 B2 8/2011 Knowles et al.
8,010,612 B2 8/2011 Costea et al.
8,010,720 B2 8/2011 Iwaoka et al.
8,019,881 B2 9/2011 Sandhu et al.
8,020,206 B2 9/2011 Hubbard et al.
8,024,384 B2 9/2011 Prabhakar et al.
8,032,721 B2 10/2011 Murai
8,036,374 B2 10/2011 Noble, Jr.
8,037,409 B2 10/2011 Jacob et al.
8,041,749 B2 10/2011 Beck
8,041,763 B2 10/2011 Kordun et al.
8,041,913 B2 10/2011 Wang
8,069,161 B2 11/2011 Bugir et al.
8,069,471 B2 11/2011 Boren
8,082,539 B1 12/2011 Schelkogonov
8,090,754 B2 1/2012 Schmidt et al.
8,095,923 B2 1/2012 Harvey et al.
8,099,709 B2 1/2012 Baikov et al.
8,103,962 B2 1/2012 Embley et al.
8,117,441 B2 2/2012 Kurien et al.
8,135,815 B2 3/2012 Mayer
8,146,054 B2 3/2012 Baker et al.
8,146,074 B2 3/2012 Ito et al.
8,150,717 B2 4/2012 Whitmore
8,156,105 B2 4/2012 Altounian et al.
8,156,158 B2 4/2012 Rolls et al.
8,156,159 B2 4/2012 Ebrahimi et al.
8,166,406 B1 4/2012 Goldfeder et al.
8,176,061 B2 5/2012 Swan et al.
8,176,177 B2 5/2012 Sussman et al.
8,176,334 B2 5/2012 Vainstein
8,176,470 B2 5/2012 Klumpp et al.
8,180,759 B2 5/2012 Hamzy
8,181,151 B2 5/2012 Sedukhin et al.
8,185,409 B2 5/2012 Putnam et al.
8,185,497 B2 5/2012 Vermeulen et al.

(56) References Cited

U.S. PATENT DOCUMENTS 8,196,176 B2 6/2012 Berteau et al.
8,205,093 B2 6/2012 Argott
8,205,140 B2 6/2012 Hafeez et al.
8,214,362 B1 7/2012 Djabarov
8,214,803 B2 7/2012 Horii et al.
8,234,377 B2 7/2012 Cohn
8,239,244 B2 8/2012 Ginsberg et al.
8,250,051 B2 8/2012 Bugir et al.
8,255,468 B2 8/2012 Mtaldevara et al.
8,260,262 B2 9/2012 Ben Ayed
8,261,362 B2 9/2012 Goodwin et al.
8,266,231 B1 9/2012 Golovin et al.
8,275,632 B2 9/2012 Awaraji et al.
8,275,793 B2 9/2012 Ahmad et al.
8,286,239 B1 10/2012 Sutton
8,312,549 B2 11/2012 Goldberg et al.
8,316,237 B1 11/2012 Felsher et al.
8,332,908 B2 12/2012 Hatakeyama et al.
8,340,999 B2 12/2012 Kumaran et al.
8,341,405 B2 12/2012 Meijer et al.
8,346,929 B1 1/2013 Lai
8,364,713 B2 1/2013 Pollard
8,370,224 B2 2/2013 Grewal
8,370,794 B2 2/2013 Moosmann et al.
8,380,630 B2 2/2013 Felsher
8,380,743 B2 2/2013 Convertino et al.
8,381,180 B2 2/2013 Rostoker
8,381,297 B2 2/2013 Touboul
8,386,314 B2 2/2013 Kirkby et al.
8,392,982 B2 3/2013 Harris et al.
8,418,226 B2 4/2013 Gardner
8,423,954 B2 4/2013 Ronen et al.
8,429,179 B1 4/2013 Mirhaji
8,429,597 B2 4/2013 Prigge
8,429,630 B2 4/2013 Nickolov et al.
8,429,758 B2 4/2013 Chen et al.
8,438,644 B2 5/2013 Watters et al.
8,448,252 B1 5/2013 King et al.
8,452,693 B2 5/2013 Shah et al.
8,463,247 B2 6/2013 Misiag
8,464,311 B2 6/2013 Ashley et al.
8,468,244 B2 6/2013 Redlich et al.
8,473,324 B2 6/2013 Alvarez et al.
8,474,012 B2 6/2013 Ahmed et al.
8,494,894 B2 7/2013 Jaster et al.
8,504,481 B2 8/2013 Motahari et al.
8,510,199 B1 8/2013 Erlanger
8,515,988 B2 8/2013 Jones et al.
8,516,076 B2 8/2013 Thomas
8,527,337 B1 9/2013 Lim et al.
8,533,746 B2 9/2013 Nolan et al.
8,533,844 B2 9/2013 Mahaffey et al.
8,538,817 B2 9/2013 Wilson
8,539,359 B2 9/2013 Rapaport et al.
8,539,437 B2 9/2013 Finlayson et al.
8,560,645 B2 10/2013 Linden et al.
8,560,841 B2 10/2013 Chin et al.
8,560,956 B2 10/2013 Curtis et al.
8,561,100 B2 10/2013 Hu et al.
8,561,153 B2 10/2013 Grason et al.
8,565,729 B2 10/2013 Moseler et al.
8,566,726 B2 10/2013 Dixon et al.
8,566,938 B1 10/2013 Prakash et al.
8,571,909 B2 10/2013 Miller et al.
8,572,717 B2 10/2013 Narayanaswamy
8,578,036 B1 11/2013 Holfelder et al.
8,578,166 B2 11/2013 De Monseignat et al.
8,578,481 B2 11/2013 Rowley
8,578,501 B1 11/2013 Ogilvie
8,583,694 B2 11/2013 Siegel et al.
8,583,766 B2 11/2013 Dixon et al.
8,589,183 B2 11/2013 Awaraji et al.
8,589,372 B2 11/2013 Krislov
8,601,467 B2 12/2013 Hofhansl et al.
8,601,591 B2 12/2013 Krishnamurthy et al.
8,606,746 B2 12/2013 Yeap et al.
8,612,420 B2 12/2013 Sun et al.
8,612,993 B2 12/2013 Grant et al.
8,615,549 B2 12/2013 Knowles et al.
8,615,731 B2 12/2013 Doshi
8,620,952 B2 12/2013 Bennett et al.
8,621,637 B2 12/2013 Al-Harbi et al.
8,626,671 B2 1/2014 Federgreen
8,627,114 B2 1/2014 Resch et al.
8,630,961 B2 1/2014 Beilby et al.
8,631,048 B1 1/2014 Davis et al.
8,640,110 B2 1/2014 Kopp et al.
8,646,072 B1 2/2014 Savant
8,650,399 B2 2/2014 Le Bihan et al.
8,655,939 B2 2/2014 Redlich et al.
8,656,265 B1 2/2014 Paulin et al.
8,656,456 B2 2/2014 Maxson et al.
8,661,036 B2 2/2014 Turski et al.
8,667,074 B1 3/2014 Farkas
8,667,487 B1 3/2014 Boodman et al.
8,677,472 B1 3/2014 Dotan et al.
8,681,984 B2 3/2014 Lee et al.
8,682,698 B2 3/2014 Cashman et al.
8,683,201 B2 3/2014 Shaty
8,683,502 B2 3/2014 Shkedi et al.
8,688,601 B2 4/2014 Jaiswal
8,689,292 B2 4/2014 Williams et al.
8,693,689 B2 4/2014 Belenkiy et al.
8,700,524 B2 4/2014 Williams et al.
8,700,699 B2 4/2014 Shen et al.
8,706,742 B1 4/2014 Ravid et al.
8,707,451 B2 4/2014 Ture et al.
8,712,813 B2 4/2014 King
8,713,098 B1 4/2014 Adya et al.
8,713,638 B2 4/2014 Hu et al.
8,719,366 B2 5/2014 Mathew et al.
8,732,839 B2 5/2014 Hohl
8,744,894 B2 6/2014 Christiansen et al.
8,751,285 B2 6/2014 Deb et al.
8,762,406 B2 6/2014 Ho et al.
8,762,413 B2 6/2014 Graham, Jr. et al.
8,763,071 B2 6/2014 Sinha et al.
8,763,082 B2 6/2014 Huber et al.
8,763,131 B2 6/2014 Archer et al.
8,767,947 B1 7/2014 Ristock et al.
8,769,242 B2 7/2014 Tkac et al.
8,769,412 B2 7/2014 Gill et al.
8,769,671 B2 7/2014 Shraim et al.
8,776,241 B2 7/2014 Zaitsev
8,788,935 B1 7/2014 Hirsch et al.
8,793,614 B2 7/2014 Wilson et al.
8,793,650 B2 7/2014 Hilerio et al.
8,793,781 B2 7/2014 Grossi et al.
8,793,809 B2 7/2014 Falkenburg et al.
8,799,984 B2 8/2014 Ahn
8,805,707 B2 8/2014 Schumann, Jr. et al.
8,805,806 B2 8/2014 Amarendran et al.
8,805,925 B2 8/2014 Price et al.
8,812,342 B2 8/2014 Barcelo et al.
8,812,752 B1 8/2014 Shih et al.
8,812,766 B2 8/2014 Kranendonk et al.
8,813,028 B2 8/2014 Farooqi
8,813,214 B1 8/2014 Mcnair et al.
8,819,253 B2 8/2014 Simeloff et al.
8,819,617 B1 8/2014 Koenig et al.
8,819,800 B2 8/2014 Gao et al.
8,826,446 B1 9/2014 Liu et al.
8,832,649 B2 9/2014 Bishop et al.
8,832,854 B1 9/2014 Staddon et al.
8,839,232 B2 9/2014 Taylor et al.
8,839,346 B2 9/2014 Murgia et al.
8,843,487 B2 9/2014 Mcgraw et al.
8,843,745 B2 9/2014 Roberts, Jr.
8,849,757 B2 9/2014 Kruglick
8,856,534 B2 10/2014 Khosravi et al.
8,856,936 B2 10/2014 Datta Ray et al.
8,862,507 B2 10/2014 Sandhu et al.
8,863,261 B2 10/2014 Yang
8,875,232 B2 10/2014 Blom et al.

(56) References Cited

U.S. PATENT DOCUMENTS

| | | | |
|---|---|---|---|
| 8,893,078 | B2 | 11/2014 | Schaude et al. |
| 8,893,286 | B1 | 11/2014 | Oliver |
| 8,893,297 | B2 | 11/2014 | Eversoll et al. |
| 8,904,494 | B2 | 12/2014 | Kindler et al. |
| 8,914,263 | B2 | 12/2014 | Shimada et al. |
| 8,914,299 | B2 | 12/2014 | Pesci-Anderson et al. |
| 8,914,342 | B2 | 12/2014 | Kalaboukis et al. |
| 8,914,902 | B2 | 12/2014 | Moritz et al. |
| 8,918,306 | B2 | 12/2014 | Cashman et al. |
| 8,918,392 | B1 | 12/2014 | Brooker et al. |
| 8,918,632 | B1 | 12/2014 | Sartor |
| 8,924,388 | B2 | 12/2014 | Elliot et al. |
| 8,930,364 | B1 | 1/2015 | Brooker et al. |
| 8,930,896 | B1 | 1/2015 | Wiggins |
| 8,930,897 | B2 | 1/2015 | Nassar |
| 8,935,198 | B1 | 1/2015 | Phillips et al. |
| 8,935,266 | B2 | 1/2015 | Wu |
| 8,935,342 | B2 | 1/2015 | Patel |
| 8,935,804 | B1 | 1/2015 | Clark et al. |
| 8,938,221 | B2 | 1/2015 | Brazier et al. |
| 8,943,076 | B2 | 1/2015 | Stewart et al. |
| 8,943,548 | B2 | 1/2015 | Drokov et al. |
| 8,943,602 | B2 | 1/2015 | Roy et al. |
| 8,949,137 | B2 | 2/2015 | Crapo et al. |
| 8,955,038 | B2 | 2/2015 | Nicodemus et al. |
| 8,959,568 | B2 | 2/2015 | Hudis et al. |
| 8,959,584 | B2 | 2/2015 | Piliouras |
| 8,966,575 | B2 | 2/2015 | Mcquay et al. |
| 8,966,597 | B1 | 2/2015 | Saylor et al. |
| 8,973,108 | B1 | 3/2015 | Roth et al. |
| 8,977,234 | B2 | 3/2015 | Chava |
| 8,977,643 | B2 | 3/2015 | Schindlauer et al. |
| 8,978,158 | B2 | 3/2015 | Rajkumar et al. |
| 8,983,972 | B2 | 3/2015 | Kriebel et al. |
| 8,984,031 | B1 | 3/2015 | Todd |
| 8,990,933 | B1 | 3/2015 | Magdalin |
| 8,996,417 | B1 | 3/2015 | Channakeshava |
| 8,996,480 | B2 | 3/2015 | Agarwala et al. |
| 8,997,213 | B2 | 3/2015 | Papakipos et al. |
| 9,001,673 | B2 | 4/2015 | Birdsall et al. |
| 9,002,939 | B2 | 4/2015 | Laden et al. |
| 9,003,295 | B2 | 4/2015 | Baschy |
| 9,003,552 | B2 | 4/2015 | Goodwin et al. |
| 9,009,851 | B2 | 4/2015 | Droste et al. |
| 9,014,661 | B2 | 4/2015 | Decharms |
| 9,015,796 | B1 | 4/2015 | Fujioka |
| 9,021,469 | B2 | 4/2015 | Hilerio et al. |
| 9,026,526 | B1 | 5/2015 | Bau et al. |
| 9,030,987 | B2 | 5/2015 | Bianchetti et al. |
| 9,032,067 | B2 | 5/2015 | Prasad et al. |
| 9,043,217 | B2 | 5/2015 | Cashman et al. |
| 9,043,480 | B2 | 5/2015 | Barton et al. |
| 9,047,463 | B2 | 6/2015 | Porras |
| 9,047,582 | B2 | 6/2015 | Hutchinson et al. |
| 9,047,583 | B2 | 6/2015 | Patton et al. |
| 9,047,639 | B1 | 6/2015 | Quintiliani et al. |
| 9,049,244 | B2 | 6/2015 | Prince et al. |
| 9,049,314 | B2 | 6/2015 | Pugh et al. |
| 9,055,071 | B1 | 6/2015 | Gates et al. |
| 9,058,590 | B2 | 6/2015 | Criddle et al. |
| 9,064,033 | B2 | 6/2015 | Jin et al. |
| 9,069,940 | B2 | 6/2015 | Hars |
| 9,076,231 | B1 | 7/2015 | Hill et al. |
| 9,077,736 | B2 | 7/2015 | Werth et al. |
| 9,081,952 | B2 | 7/2015 | Sagi et al. |
| 9,087,090 | B1 | 7/2015 | Cormier et al. |
| 9,092,796 | B2 | 7/2015 | Eversoll et al. |
| 9,094,434 | B2 | 7/2015 | Williams et al. |
| 9,098,515 | B2 | 8/2015 | Richter et al. |
| 9,100,778 | B2 | 8/2015 | Stogaitis et al. |
| 9,106,691 | B1 | 8/2015 | Burger et al. |
| 9,106,710 | B1 | 8/2015 | Feimster |
| 9,110,918 | B1 | 8/2015 | Rajaa et al. |
| 9,111,105 | B2 | 8/2015 | Barton et al. |
| 9,111,295 | B2 | 8/2015 | Tietzen et al. |
| 9,123,330 | B1 | 9/2015 | Sharifi et al. |
| 9,123,339 | B1 | 9/2015 | Shaw et al. |
| 9,129,311 | B2 | 9/2015 | Schoen et al. |
| 9,135,261 | B2 | 9/2015 | Maunder et al. |
| 9,135,444 | B2 | 9/2015 | Carter et al. |
| 9,141,823 | B2 | 9/2015 | Dawson |
| 9,141,911 | B2 | 9/2015 | Zhao et al. |
| 9,152,818 | B1 | 10/2015 | Hathaway et al. |
| 9,152,820 | B1 | 10/2015 | Pauley, Jr. et al. |
| 9,154,514 | B1 | 10/2015 | Prakash |
| 9,154,556 | B1 | 10/2015 | Dotan et al. |
| 9,158,655 | B2 | 10/2015 | Wadhwani et al. |
| 9,165,036 | B2 | 10/2015 | Mehra |
| 9,170,996 | B2 | 10/2015 | Lovric et al. |
| 9,172,706 | B2 | 10/2015 | Krishnamurthy et al. |
| 9,177,293 | B1 | 11/2015 | Gagnon et al. |
| 9,178,901 | B2 | 11/2015 | Xue et al. |
| 9,183,100 | B2 | 11/2015 | Gventer et al. |
| 9,189,642 | B2 | 11/2015 | Perlman |
| 9,201,572 | B2 | 12/2015 | Lyon et al. |
| 9,201,770 | B1 | 12/2015 | Duerk |
| 9,202,026 | B1 | 12/2015 | Reeves |
| 9,202,085 | B2 | 12/2015 | Mawdsley et al. |
| 9,215,076 | B1 | 12/2015 | Roth et al. |
| 9,215,252 | B2 | 12/2015 | Smith et al. |
| 9,218,596 | B2 | 12/2015 | Ronca et al. |
| 9,224,009 | B1 | 12/2015 | Liu et al. |
| 9,230,036 | B2 | 1/2016 | Davis |
| 9,231,935 | B1 | 1/2016 | Bridge et al. |
| 9,232,040 | B2 | 1/2016 | Barash et al. |
| 9,235,476 | B2 | 1/2016 | Mchugh et al. |
| 9,240,987 | B2 | 1/2016 | Barrett-Bowen et al. |
| 9,241,259 | B2 | 1/2016 | Daniela et al. |
| 9,245,126 | B2 | 1/2016 | Christodorescu et al. |
| 9,245,266 | B2 | 1/2016 | Hardt |
| 9,253,609 | B2 | 2/2016 | Hosier, Jr. |
| 9,264,443 | B2 | 2/2016 | Weisman |
| 9,274,858 | B2 | 3/2016 | Milliron et al. |
| 9,280,581 | B1 | 3/2016 | Grimes et al. |
| 9,286,149 | B2 | 3/2016 | Sampson et al. |
| 9,286,282 | B2 | 3/2016 | Ling, III et al. |
| 9,288,118 | B1 | 3/2016 | Pattan |
| 9,288,556 | B2 | 3/2016 | Kim et al. |
| 9,294,498 | B1 | 3/2016 | Yampolskiy et al. |
| 9,299,050 | B2 | 3/2016 | Stiffler et al. |
| 9,306,939 | B2 | 4/2016 | Chan et al. |
| 9,317,697 | B2 | 4/2016 | Maier et al. |
| 9,317,715 | B2 | 4/2016 | Schuette et al. |
| 9,325,731 | B2 | 4/2016 | Mcgeehan |
| 9,336,184 | B2 | 5/2016 | Mital et al. |
| 9,336,220 | B2 | 5/2016 | Li et al. |
| 9,336,324 | B2 | 5/2016 | Lomme et al. |
| 9,336,332 | B2 | 5/2016 | Davis et al. |
| 9,336,400 | B2 | 5/2016 | Milman et al. |
| 9,338,188 | B1 | 5/2016 | Ahn |
| 9,342,706 | B2 | 5/2016 | Chawla et al. |
| 9,344,297 | B2 | 5/2016 | Shah et al. |
| 9,344,424 | B2 | 5/2016 | Tenenboym et al. |
| 9,344,484 | B2 | 5/2016 | Ferris |
| 9,348,802 | B2 | 5/2016 | Massand |
| 9,348,862 | B2 | 5/2016 | Kawecki, III |
| 9,348,929 | B2 | 5/2016 | Eberlein |
| 9,349,016 | B1 | 5/2016 | Brisebois et al. |
| 9,350,718 | B2 | 5/2016 | Sondhi et al. |
| 9,355,157 | B2 | 5/2016 | Mohammed et al. |
| 9,356,961 | B1 | 5/2016 | Todd et al. |
| 9,361,446 | B1 | 6/2016 | Demirjian et al. |
| 9,369,488 | B2 | 6/2016 | Woods et al. |
| 9,372,869 | B2 | 6/2016 | Joseph et al. |
| 9,374,693 | B1 | 6/2016 | Olincy et al. |
| 9,384,199 | B2 | 7/2016 | Thereska et al. |
| 9,384,357 | B2 | 7/2016 | Patil et al. |
| 9,386,078 | B2 | 7/2016 | Reno et al. |
| 9,386,104 | B2 | 7/2016 | Adams et al. |
| 9,396,332 | B2 | 7/2016 | Abrams et al. |
| 9,401,900 | B2 | 7/2016 | Levasseur et al. |
| 9,411,967 | B2 | 8/2016 | Parecki et al. |
| 9,411,982 | B1 | 8/2016 | Dippenaar et al. |
| 9,417,859 | B2 | 8/2016 | Gounares et al. |

(56) References Cited

U.S. PATENT DOCUMENTS 9,418,221 B2 8/2016 Turgeman
9,424,021 B2 8/2016 Zamir
9,424,414 B1 8/2016 Demirjian et al.
9,426,177 B2 8/2016 Wang et al.
9,450,940 B2 9/2016 Belov et al.
9,460,136 B1 10/2016 Todd et al.
9,460,171 B2 10/2016 Marrelli et al.
9,460,307 B2 10/2016 Breslau et al.
9,461,876 B2 10/2016 Van Dusen et al.
9,462,009 B1 10/2016 Kolman et al.
9,465,702 B2 10/2016 Gventer et al.
9,465,800 B2 10/2016 Lacey
9,473,446 B2 10/2016 Vijay et al.
9,473,505 B1 10/2016 Asano et al.
9,473,535 B2 10/2016 Sartor
9,477,523 B1 10/2016 Warman et al.
9,477,660 B2 10/2016 Scott et al.
9,477,685 B1 10/2016 Leung et al.
9,477,942 B2 10/2016 Adachi et al.
9,483,659 B2 11/2016 Bao et al.
9,489,366 B2 11/2016 Scott et al.
9,495,547 B1 11/2016 Schepis et al.
9,501,523 B2 11/2016 Hyatt et al.
9,507,960 B2 11/2016 Bell et al.
9,509,674 B1 11/2016 Nasserbakht et al.
9,509,702 B2 11/2016 Grigg et al.
9,514,231 B2 12/2016 Eden
9,516,012 B2 12/2016 Chochois et al.
9,521,166 B2 12/2016 Wilson
9,524,500 B2 12/2016 Dave et al.
9,529,989 B2 12/2016 Kling et al.
9,536,108 B2 1/2017 Powell et al.
9,537,546 B2 1/2017 Cordeiro et al.
9,542,568 B2 1/2017 Francis et al.
9,549,047 B1 1/2017 Fredinburg et al.
9,552,395 B2 1/2017 Bayer et al.
9,552,470 B2 1/2017 Turgeman et al.
9,553,918 B1 1/2017 Manion et al.
9,558,497 B2 1/2017 Carvalho
9,569,752 B2 2/2017 Deering et al.
9,571,506 B2 2/2017 Boss et al.
9,571,509 B1 2/2017 Satish et al.
9,571,526 B2 2/2017 Sartor
9,571,559 B2 2/2017 Raleigh et al.
9,571,991 B1 2/2017 Brizendine et al.
9,576,289 B2 2/2017 Henderson et al.
9,578,060 B1 2/2017 Brisebois et al.
9,578,173 B2 2/2017 Sanghavi et al.
9,582,681 B2 2/2017 Mishra
9,584,964 B2 2/2017 Pelkey
9,589,110 B2 3/2017 Carey et al.
9,600,181 B2 3/2017 Patel et al.
9,602,529 B2 3/2017 Jones et al.
9,606,971 B2 3/2017 Seolas et al.
9,607,041 B2 3/2017 Himmelstein
9,619,652 B2 4/2017 Slater
9,619,661 B1 4/2017 Finkelstein
9,621,357 B2 4/2017 Williams et al.
9,621,566 B2 4/2017 Gupta et al.
9,626,124 B2 4/2017 Lipinski et al.
9,626,680 B1 4/2017 Ryan et al.
9,629,064 B2 4/2017 Graves et al.
9,642,008 B2 5/2017 Wyatt et al.
9,646,095 B1 5/2017 Gottlieb et al.
9,647,949 B2 5/2017 Varki et al.
9,648,036 B2 5/2017 Seiver et al.
9,652,314 B2 5/2017 Mahiddini
9,654,506 B2 5/2017 Barrett
9,654,541 B1 5/2017 Kapczynski et al.
9,665,722 B2 5/2017 Nagasundarem et al.
9,665,733 B1 5/2017 Sills et al.
9,665,883 B2 5/2017 Roullier et al.
9,672,053 B2 6/2017 Tang et al.
9,672,355 B2 6/2017 Titonis et al.
9,678,794 B1 6/2017 Barrett et al.
9,691,090 B1 6/2017 Barday
9,699,209 B2 7/2017 Ng et al.
9,703,549 B2 7/2017 Dufresne
9,704,103 B2 7/2017 Suskind et al.
9,705,840 B2 7/2017 Pujare et al.
9,705,880 B2 7/2017 Siris
9,721,078 B2 8/2017 Cornick et al.
9,721,108 B2 8/2017 Krishnamurthy et al.
9,727,751 B2 8/2017 Oliver et al.
9,729,583 B1 8/2017 Barday
9,734,148 B2 8/2017 Bendersky et al.
9,734,255 B2 8/2017 Jiang
9,736,004 B2 8/2017 Jung et al.
9,740,985 B2 8/2017 Byron et al.
9,740,987 B2 8/2017 Dolan
9,749,408 B2 8/2017 Subramani et al.
9,754,091 B2 9/2017 Kode et al.
9,756,059 B2 9/2017 Demirjian et al.
9,760,620 B2 9/2017 Nachnani et al.
9,760,635 B2 9/2017 Bliss et al.
9,760,697 B1 9/2017 Walker
9,760,849 B2 9/2017 Mnnakota et al.
9,762,553 B2 9/2017 Ford et al.
9,767,202 B2 9/2017 Darby et al.
9,767,309 B1 9/2017 Patel et al.
9,769,124 B2 9/2017 Yan
9,773,269 B1 9/2017 Lazarus
9,785,795 B2 10/2017 Grondin et al.
9,787,671 B1 10/2017 Bogrett
9,798,749 B2 10/2017 Saner
9,798,826 B2 10/2017 Wilson et al.
9,798,896 B2 10/2017 Jakobsson
9,800,605 B2 10/2017 Baikalov et al.
9,800,606 B1 10/2017 Yumer
9,804,649 B2 10/2017 Cohen et al.
9,804,928 B2 10/2017 Davis et al.
9,805,381 B2 10/2017 Frank et al.
9,811,532 B2 11/2017 Parkinson et al.
9,817,850 B2 11/2017 Dubbels et al.
9,817,978 B2 11/2017 Marsh et al.
9,819,684 B2 11/2017 Cernoch et al.
9,825,928 B2 11/2017 Lelcuk et al.
9,830,563 B2 11/2017 Paknad
9,832,633 B2 11/2017 Gerber, Jr. et al.
9,836,598 B2 12/2017 Iyer et al.
9,838,407 B1 12/2017 Oprea et al.
9,838,839 B2 12/2017 Vudali et al.
9,841,969 B2 12/2017 Seibert, Jr. et al.
9,842,042 B2 12/2017 Chhatwal et al.
9,842,349 B2 12/2017 Sawczuk et al.
9,848,005 B2 12/2017 Ardeli et al.
9,848,061 B1 12/2017 Jain et al.
9,852,150 B2 12/2017 Sharpe et al.
9,853,959 B1 12/2017 Kapczynski et al.
9,860,226 B2 1/2018 Thormaehlen
9,864,735 B1 1/2018 Lamprecht
9,876,825 B2 1/2018 Amar et al.
9,877,138 B1 1/2018 Franklin
9,880,157 B2 1/2018 Levak et al.
9,882,935 B2 1/2018 Barday
9,887,965 B2 2/2018 Kay et al.
9,888,377 B1 2/2018 Mccorkendale et al.
9,892,441 B2 2/2018 Barday
9,892,442 B2 2/2018 Barday
9,892,443 B2 2/2018 Barday
9,892,444 B2 2/2018 Barday
9,894,076 B2 2/2018 Li et al.
9,898,613 B1 2/2018 Swerdlow et al.
9,898,739 B2 2/2018 Monastyrsky et al.
9,898,769 B2 2/2018 Barday
9,912,625 B2 3/2018 Mutha et al.
9,912,677 B2 3/2018 Chien
9,912,810 B2 3/2018 Segre et al.
9,916,703 B2 3/2018 Levinson et al.
9,922,124 B2 3/2018 Rathod
9,923,927 B1 3/2018 Mcclintock et al.
9,928,379 B1 3/2018 Hoffer
9,934,493 B2 4/2018 Castinado et al.
9,934,544 B1 4/2018 Whitfield et al.

(56) References Cited

U.S. PATENT DOCUMENTS 9,936,127 B2 4/2018 Todasco
9,942,214 B1 4/2018 Burciu et al.
9,942,244 B2 4/2018 Lahoz et al.
9,942,276 B2 4/2018 Sartor
9,946,897 B2 4/2018 Lovin
9,948,652 B2 4/2018 Yu et al.
9,948,663 B1 4/2018 Wang et al.
9,953,189 B2 4/2018 Cook et al.
9,954,879 B1 4/2018 Sadaghiani et al.
9,954,883 B2 4/2018 Ahuja et al.
9,959,551 B1 5/2018 Schermerhorn et al.
9,959,582 B2 5/2018 Sukman et al.
9,961,070 B2 5/2018 Tang
9,973,518 B2 5/2018 Lee et al.
9,973,585 B2 5/2018 Ruback et al.
9,977,904 B2 5/2018 Khan et al.
9,977,920 B2 5/2018 Danielson et al.
9,983,936 B2 5/2018 Dornemann et al.
9,984,252 B2 5/2018 Pollard
9,990,499 B2 6/2018 Chan et al.
9,992,213 B2 6/2018 Sinnema
10,001,975 B2 6/2018 Bharthulwar
10,002,064 B2 6/2018 Muske
10,007,895 B2 6/2018 Vanasco
10,013,577 B1 7/2018 Beaumont et al.
10,015,164 B2 7/2018 Hamburg et al.
10,019,339 B2 7/2018 Von Hanxleden et al.
10,019,588 B2 7/2018 Garcia et al.
10,019,591 B1 7/2018 Beguin
10,019,741 B2 7/2018 Hesselink
10,021,143 B2 7/2018 Cabrera et al.
10,025,804 B2 7/2018 Vranyes et al.
10,025,836 B2 7/2018 Batchu et al.
10,032,172 B2 7/2018 Barday
10,044,761 B2 8/2018 Ducatel et al.
10,055,426 B2 8/2018 Arasan et al.
10,055,869 B2 8/2018 Borrelli et al.
10,061,847 B2 8/2018 Mohammed et al.
10,069,858 B2 9/2018 Robinson et al.
10,069,914 B1 9/2018 Smith
10,073,924 B2 9/2018 Karp et al.
10,075,437 B1 9/2018 Costigan et al.
10,075,451 B1 9/2018 Hall et al.
10,084,817 B2 9/2018 Saher et al.
10,091,214 B2 10/2018 Godlewski et al.
10,091,312 B1 10/2018 Khanwalkar et al.
10,097,551 B2 10/2018 Chan et al.
10,102,533 B2 10/2018 Barday
10,108,409 B2 10/2018 Pirzadeh et al.
10,122,663 B2 11/2018 Hu et al.
10,122,760 B2 11/2018 Terrill et al.
10,127,403 B2 11/2018 Kong et al.
10,129,211 B2 11/2018 Heath
10,140,666 B1 11/2018 Wang et al.
10,142,113 B2 11/2018 Zaidi et al.
10,152,560 B2 12/2018 Potiagalov et al.
10,158,676 B2 12/2018 Barday
10,165,011 B2 12/2018 Barday
10,169,762 B2 1/2019 Ogawa
10,176,503 B2 1/2019 Barday et al.
10,181,043 B1 1/2019 Pauley, Jr. et al.
10,181,051 B2 1/2019 Barday et al.
10,187,363 B2 1/2019 Smirnoff et al.
10,187,394 B2 1/2019 Bar et al.
10,204,154 B2 2/2019 Barday et al.
10,205,994 B2 2/2019 Splaine et al.
10,212,134 B2 2/2019 Rai
10,212,175 B2 2/2019 Seul et al.
10,223,533 B2 3/2019 Dawson
10,230,571 B2 3/2019 Rangasamy et al.
10,242,228 B2 3/2019 Barday et al.
10,250,594 B2 4/2019 Chathoth et al.
10,255,602 B2 4/2019 Wang
10,257,127 B2 4/2019 Dotan-Cohen et al.
10,257,181 B1 4/2019 Sherif et al.
10,268,838 B2 4/2019 Yadgiri et al.
10,275,221 B2 4/2019 Thattai et al.
10,275,614 B2 4/2019 Barday et al.
10,282,370 B1 5/2019 Barday et al.
10,282,559 B2 5/2019 Barday et al.
10,284,604 B2 5/2019 Barday et al.
10,289,584 B2 5/2019 Chiba
10,289,857 B1 5/2019 Brinskelle
10,289,866 B2 5/2019 Barday et al.
10,289,867 B2 5/2019 Barday et al.
10,289,870 B2 5/2019 Barday et al.
10,296,504 B2 5/2019 Hock et al.
10,304,442 B1 5/2019 Rudden et al.
10,310,723 B2 6/2019 Rathod
10,311,042 B1 6/2019 Kumar
10,311,475 B2 6/2019 Yuasa
10,311,492 B2 6/2019 Gelfenbeyn et al.
10,318,761 B2 6/2019 Barday et al.
10,320,940 B1 6/2019 Brennan et al.
10,324,960 B1 6/2019 Skvortsov et al.
10,326,768 B2 6/2019 Verweyst et al.
10,326,798 B2 6/2019 Lambert
10,326,841 B2 6/2019 Bradley et al.
10,331,689 B2 6/2019 Sorrentino et al.
10,331,904 B2 6/2019 Sher-Jan et al.
10,333,975 B2 6/2019 Soman et al.
10,346,186 B2 7/2019 Kalyanpur
10,346,635 B2 7/2019 Kumar et al.
10,346,637 B2 7/2019 Barday et al.
10,346,638 B2 7/2019 Barday et al.
10,346,849 B2 7/2019 Ionescu et al.
10,348,726 B2 7/2019 Caluwaert
10,348,775 B2 7/2019 Barday
10,353,673 B2 7/2019 Barday et al.
10,361,857 B2 7/2019 Woo
10,366,241 B2 7/2019 Sartor
10,373,119 B2 8/2019 Driscoll et al.
10,373,409 B2 8/2019 White et al.
10,375,115 B2 8/2019 Mallya
10,387,559 B1 8/2019 Wendt et al.
10,387,577 B2 8/2019 Hill et al.
10,387,657 B2 8/2019 Belfiore, Jr. et al.
10,387,952 B1 8/2019 Sandhu et al.
10,395,201 B2 8/2019 Vescio
10,402,545 B2 9/2019 Gorfein et al.
10,404,729 B2 9/2019 Turgeman
10,417,401 B2 9/2019 Votaw et al.
10,417,445 B2 9/2019 Wouhaybi et al.
10,417,621 B2 9/2019 Cassel et al.
10,419,476 B2 9/2019 Parekh
10,423,985 B1 9/2019 Dutta et al.
10,425,492 B2 9/2019 Comstock et al.
10,430,608 B2 10/2019 Peri et al.
10,435,350 B2 10/2019 Ito et al.
10,437,412 B2 10/2019 Barday et al.
10,437,860 B2 10/2019 Barday et al.
10,438,016 B2 10/2019 Barday et al.
10,438,273 B2 10/2019 Burns et al.
10,440,062 B2 10/2019 Barday et al.
10,445,508 B2 10/2019 Sher-Jan et al.
10,445,526 B2 10/2019 Barday et al.
10,452,864 B2 10/2019 Barday et al.
10,452,866 B2 10/2019 Barday et al.
10,453,076 B2 10/2019 Parekh et al.
10,453,092 B1 10/2019 Wang et al.
10,454,934 B2 10/2019 Parimi et al.
10,481,763 B2 11/2019 Bartkiewicz et al.
10,489,454 B1 11/2019 Chen
10,503,926 B2 12/2019 Barday et al.
10,510,031 B2 12/2019 Barday et al.
10,521,623 B2 12/2019 Rodriguez et al.
10,534,851 B1 1/2020 Chan et al.
10,535,081 B2 1/2020 Ferreira et al.
10,536,475 B1 1/2020 Mccorkle, Jr. et al.
10,536,478 B2 1/2020 Kirti et al.
10,540,212 B2 1/2020 Feng et al.
10,541,938 B1 1/2020 Timmerman et al.
10,546,135 B1 1/2020 Kassoumeh et al.
10,552,462 B1 2/2020 Hart

(56) References Cited

U.S. PATENT DOCUMENTS 10,558,809 B1 2/2020 Joyce et al.
10,558,821 B2 2/2020 Barday et al.
10,564,815 B2 2/2020 Soon-Shiong
10,564,935 B2 2/2020 Barday et al.
10,564,936 B2 2/2020 Barday et al.
10,565,161 B2 2/2020 Barday et al.
10,565,236 B1 2/2020 Barday et al.
10,567,439 B2 2/2020 Barday et al.
10,567,517 B2 2/2020 Weinig et al.
10,572,684 B2 2/2020 Lafever et al.
10,572,686 B2 2/2020 Barday et al.
10,572,778 B1 2/2020 Robinson et al.
10,574,705 B2 2/2020 Barday et al.
10,581,825 B2 3/2020 Poschel et al.
10,592,648 B2 3/2020 Barday et al.
10,592,692 B2 3/2020 Brannon et al.
10,599,456 B2 3/2020 Mendle
10,606,916 B2 3/2020 Brannon et al.
10,613,971 B1 4/2020 Vasikarla
10,628,553 B1 4/2020 Murrish et al.
10,645,102 B2 5/2020 Hamdi
10,645,548 B2 5/2020 Reynolds et al.
10,649,630 B1 5/2020 Vora et al.
10,650,408 B1 5/2020 Andersen et al.
10,657,469 B2 5/2020 Bade et al.
10,657,504 B1 5/2020 Zimmerman et al.
10,659,566 B1 5/2020 Luah et al.
10,671,749 B2 6/2020 Felice-Steele et al.
10,671,760 B2 6/2020 Esmailzadeh et al.
10,678,945 B2 6/2020 Barday et al.
10,685,140 B2 6/2020 Barday et al.
10,706,176 B2 7/2020 Brannon et al.
10,706,226 B2 7/2020 Byun et al.
10,708,305 B2 7/2020 Barday et al.
10,713,387 B2 7/2020 Brannon et al.
10,726,145 B2 7/2020 Duminy et al.
10,726,153 B2 7/2020 Nerurkar et al.
10,726,158 B2 7/2020 Brannon et al.
10,732,865 B2 8/2020 Jain et al.
10,735,388 B2 8/2020 Rose et al.
10,740,487 B2 8/2020 Barday et al.
10,747,893 B2 8/2020 Kiriyama et al.
10,747,897 B2 8/2020 Cook
10,762,213 B2 9/2020 Rudek et al.
10,762,230 B2 9/2020 Ancin et al.
10,762,236 B2 9/2020 Brannon et al.
10,769,302 B2 9/2020 Barday et al.
10,769,303 B2 9/2020 Brannon et al.
10,776,510 B2 9/2020 Antonelli et al.
10,776,518 B2 9/2020 Barday et al.
10,778,792 B1 9/2020 Handy Bosma et al.
10,783,256 B2 9/2020 Brannon et al.
10,785,173 B2 9/2020 Willett et al.
10,785,299 B2 9/2020 Gupta et al.
10,791,150 B2 9/2020 Barday et al.
10,795,527 B1 10/2020 Legge et al.
10,796,020 B2 10/2020 Barday et al.
10,796,260 B2 10/2020 Brannon et al.
10,798,133 B2 10/2020 Barday et al.
10,803,196 B2 10/2020 Bodegas Martinez et al.
10,805,331 B2 10/2020 Boyer et al.
10,831,831 B2 11/2020 Greene
10,834,590 B2 11/2020 Turgeman et al.
10,846,433 B2 11/2020 Brannon et al.
10,853,356 B1 12/2020 Mcpherson et al.
10,853,501 B2 12/2020 Brannon et al.
10,860,721 B1 12/2020 Gentile
10,860,742 B2 12/2020 Joseph et al.
10,860,979 B2 12/2020 Geffen et al.
10,878,127 B2 12/2020 Brannon et al.
10,885,485 B2 1/2021 Brannon et al.
10,891,393 B2 1/2021 Currier et al.
10,893,074 B2 1/2021 Sartor
10,896,394 B2 1/2021 Brannon et al.
10,902,490 B2 1/2021 He et al.
10,909,488 B2 2/2021 Hecht et al.
10,924,514 B1 2/2021 Altman et al.
10,929,557 B2 2/2021 Chavez
10,949,555 B2 3/2021 Rattan et al.
10,949,565 B2 3/2021 Barday et al.
10,956,213 B1 3/2021 Chambers et al.
10,957,326 B2 3/2021 Bhaya et al.
10,963,571 B2 3/2021 Bar Joseph et al.
10,963,572 B2 3/2021 Belfiore, Jr. et al.
10,965,547 B1 3/2021 Esposito et al.
10,970,418 B2 4/2021 Durvasula et al.
10,972,509 B2 4/2021 Barday et al.
10,976,950 B1 4/2021 Trezzo et al.
10,983,963 B1 4/2021 Venkatasubramanian et al.
10,984,458 B1 4/2021 Gutierrez
10,997,318 B2 5/2021 Barday et al.
11,003,748 B2 5/2021 Oliker et al.
11,012,475 B2 5/2021 Patnala et al.
11,023,528 B1 6/2021 Lee et al.
11,037,168 B1 6/2021 Lee et al.
11,057,356 B2 7/2021 Malhotra et al.
11,057,427 B2 7/2021 Wright et al.
11,062,051 B2 7/2021 Barday et al.
11,068,318 B2 7/2021 Kuesel et al.
11,068,584 B2 7/2021 Burriesci et al.
11,068,618 B2 7/2021 Brannon et al.
11,068,797 B2 7/2021 Bhide et al.
11,068,847 B2 7/2021 Boutros et al.
11,093,950 B2 8/2021 Hersh et al.
11,094,014 B1 8/2021 Gordon, III et al.
11,100,444 B2 8/2021 Brannon et al.
11,138,299 B2 10/2021 Brannon et al.
11,144,678 B2 10/2021 Dondini et al.
11,144,862 B1 10/2021 Jackson et al.
11,195,134 B2 12/2021 Brannon et al.
11,201,929 B2 12/2021 Dudmesh et al.
11,210,420 B2 12/2021 Brannon et al.
11,238,390 B2 2/2022 Brannon et al.
11,240,273 B2 2/2022 Barday et al.
11,252,159 B2 2/2022 Kannan et al.
11,256,777 B2 2/2022 Brannon et al.
11,263,262 B2 3/2022 Chen
11,301,589 B2 4/2022 Barday et al.
11,327,996 B2 5/2022 Reynolds et al.
11,500,909 B1 11/2022 Perretta et al.
11,682,399 B2 6/2023 Paulraj et al.
2002/0004736 A1 1/2002 Roundtree et al.
2002/0049907 A1 4/2002 Woods et al.
2002/0055932 A1 5/2002 Wheeler et al.
2002/0077941 A1 6/2002 Halligan et al.
2002/0103854 A1 8/2002 Okita
2002/0129216 A1 9/2002 Collins
2002/0161594 A1 10/2002 Bryan et al.
2002/0161733 A1 10/2002 Grainger
2003/0041250 A1 2/2003 Proudler
2003/0065641 A1 4/2003 Chaloux
2003/0093680 A1 5/2003 Astley et al.
2003/0097451 A1 5/2003 Bjorkstein et al.
2003/0097661 A1 5/2003 Li et al.
2003/0115142 A1 6/2003 Brickell et al.
2003/0130893 A1 7/2003 Farmer
2003/0131001 A1 7/2003 Matsuo
2003/0131093 A1 7/2003 Aschen et al.
2003/0140150 A1 7/2003 Kemp et al.
2003/0167216 A1 9/2003 Brown et al.
2003/0212604 A1 11/2003 Cullen
2004/0002818 A1 1/2004 Kulp et al.
2004/0025053 A1 2/2004 Hayward
2004/0088235 A1 5/2004 Ziekle et al.
2004/0098366 A1 5/2004 Sinclair et al.
2004/0098493 A1 5/2004 Rees
2004/0111359 A1 6/2004 Hudock
2004/0186912 A1 9/2004 Harlow et al.
2004/0193907 A1 9/2004 Patanella
2005/0022198 A1 1/2005 Olapurath et al.
2005/0033616 A1 2/2005 Vavul et al.
2005/0076294 A1 4/2005 Dehamer et al.
2005/0114343 A1 5/2005 Wesinger et al.
2005/0144066 A1 6/2005 Cope et al.

(56) References Cited

U.S. PATENT DOCUMENTS

| | | | |
|---|---|---|---|
| 2005/0197884 | A1 | 9/2005 | Mullen |
| 2005/0198177 | A1 | 9/2005 | Black |
| 2005/0198646 | A1 | 9/2005 | Kortela |
| 2005/0246292 | A1 | 11/2005 | Sarcanin |
| 2005/0278538 | A1 | 12/2005 | Fowler |
| 2006/0031078 | A1 | 2/2006 | Pizzinger et al. |
| 2006/0035204 | A1 | 2/2006 | Lamarche et al. |
| 2006/0075122 | A1 | 4/2006 | Lindskog et al. |
| 2006/0149730 | A1 | 7/2006 | Curtis |
| 2006/0156052 | A1 | 7/2006 | Bodnar et al. |
| 2006/0190280 | A1 | 8/2006 | Hoebel et al. |
| 2006/0206375 | A1 | 9/2006 | Scott et al. |
| 2006/0224422 | A1 | 10/2006 | Cohen |
| 2006/0253597 | A1 | 11/2006 | Mujica |
| 2006/0259416 | A1 | 11/2006 | Johnson |
| 2007/0011058 | A1 | 1/2007 | Dev |
| 2007/0027715 | A1 | 2/2007 | Gropper et al. |
| 2007/0061125 | A1 | 3/2007 | Bhatt et al. |
| 2007/0061393 | A1 | 3/2007 | Moore |
| 2007/0130101 | A1 | 6/2007 | Andersen et al. |
| 2007/0130323 | A1 | 6/2007 | Landsman et al. |
| 2007/0156901 | A1 | 7/2007 | Becker et al. |
| 2007/0157311 | A1 | 7/2007 | Meier et al. |
| 2007/0173355 | A1 | 7/2007 | Klein |
| 2007/0179793 | A1 | 8/2007 | Bagchi et al. |
| 2007/0180490 | A1 | 8/2007 | Renzi et al. |
| 2007/0192438 | A1 | 8/2007 | Goei |
| 2007/0266420 | A1 | 11/2007 | Hawkins et al. |
| 2007/0283171 | A1 | 12/2007 | Breslin et al. |
| 2008/0005194 | A1 | 1/2008 | Smollen et al. |
| 2008/0015927 | A1 | 1/2008 | Ramirez |
| 2008/0028065 | A1 | 1/2008 | Caso et al. |
| 2008/0028435 | A1 | 1/2008 | Strickland et al. |
| 2008/0047016 | A1 | 2/2008 | Spoonamore |
| 2008/0120699 | A1 | 5/2008 | Spear |
| 2008/0140696 | A1 | 6/2008 | Mathuria |
| 2008/0189306 | A1 | 8/2008 | Hewett et al. |
| 2008/0195436 | A1 | 8/2008 | Whyte |
| 2008/0222271 | A1 | 9/2008 | Spires |
| 2008/0235177 | A1 | 9/2008 | Kim et al. |
| 2008/0270203 | A1 | 10/2008 | Holmes et al. |
| 2008/0270351 | A1 | 10/2008 | Thomsen |
| 2008/0270381 | A1 | 10/2008 | Thomsen |
| 2008/0270382 | A1 | 10/2008 | Thomsen et al. |
| 2008/0270451 | A1 | 10/2008 | Thomsen et al. |
| 2008/0270462 | A1 | 10/2008 | Thomsen |
| 2008/0281649 | A1 | 11/2008 | Morris |
| 2008/0282320 | A1 | 11/2008 | Denovo et al. |
| 2008/0288271 | A1 | 11/2008 | Faust |
| 2008/0288299 | A1 | 11/2008 | Schultz |
| 2009/0012896 | A1 | 1/2009 | Arnold |
| 2009/0022301 | A1 | 1/2009 | Mudaliar |
| 2009/0037975 | A1 | 2/2009 | Ishikawa et al. |
| 2009/0119500 | A1 | 5/2009 | Roth et al. |
| 2009/0132419 | A1 | 5/2009 | Grammer et al. |
| 2009/0138276 | A1 | 5/2009 | Hayashida et al. |
| 2009/0140035 | A1 | 6/2009 | Miller |
| 2009/0144702 | A1 | 6/2009 | Atkin et al. |
| 2009/0158249 | A1 | 6/2009 | Tomkins et al. |
| 2009/0172705 | A1 | 7/2009 | Cheong |
| 2009/0182818 | A1 | 7/2009 | Krywaniuk |
| 2009/0187764 | A1 | 7/2009 | Astakhov et al. |
| 2009/0204452 | A1 | 8/2009 | Iskandar et al. |
| 2009/0204820 | A1 | 8/2009 | Brandenburg et al. |
| 2009/0210347 | A1 | 8/2009 | Sarcanin |
| 2009/0216610 | A1 | 8/2009 | Chorny |
| 2009/0249076 | A1 | 10/2009 | Reed et al. |
| 2009/0303237 | A1 | 12/2009 | Liu et al. |
| 2010/0010912 | A1 | 1/2010 | Jones et al. |
| 2010/0010968 | A1 | 1/2010 | Redlich et al. |
| 2010/0077484 | A1 | 3/2010 | Paretti et al. |
| 2010/0082533 | A1 | 4/2010 | Nakumura et al. |
| 2010/0094650 | A1 | 4/2010 | Tran et al. |
| 2010/0100398 | A1 | 4/2010 | Auker et al. |
| 2010/0121773 | A1 | 5/2010 | Currier et al. |
| 2010/0192201 | A1 | 7/2010 | Shimoni et al. |
| 2010/0205057 | A1 | 8/2010 | Hook et al. |
| 2010/0223349 | A1 | 9/2010 | Thorson |
| 2010/0228786 | A1 | 9/2010 | Tibor |
| 2010/0234987 | A1 | 9/2010 | Benschop et al. |
| 2010/0235297 | A1 | 9/2010 | Mamorsky |
| 2010/0235915 | A1 | 9/2010 | Memon et al. |
| 2010/0262624 | A1 | 10/2010 | Pullikottil |
| 2010/0268628 | A1 | 10/2010 | Pitkow et al. |
| 2010/0268932 | A1 | 10/2010 | Bhattacharjee |
| 2010/0281313 | A1 | 11/2010 | White et al. |
| 2010/0287114 | A1 | 11/2010 | Bartko et al. |
| 2010/0333012 | A1 | 12/2010 | Adachi et al. |
| 2011/0006996 | A1 | 1/2011 | Smith et al. |
| 2011/0010202 | A1 | 1/2011 | Neale |
| 2011/0082794 | A1 | 4/2011 | Blechman |
| 2011/0137696 | A1 | 6/2011 | Meyer et al. |
| 2011/0145154 | A1 | 6/2011 | Rivers et al. |
| 2011/0153396 | A1 | 6/2011 | Marcuvitz et al. |
| 2011/0191664 | A1 | 8/2011 | Sheleheda et al. |
| 2011/0208850 | A1 | 8/2011 | Sheleheda et al. |
| 2011/0209067 | A1 | 8/2011 | Bogess et al. |
| 2011/0211813 | A1 * | 9/2011 | Marks .............. H04N 21/41407 715/764 |
| 2011/0231896 | A1 | 9/2011 | Tovar |
| 2011/0238573 | A1 | 9/2011 | Varadarajan |
| 2011/0252456 | A1 | 10/2011 | Hatakeyama |
| 2011/0302643 | A1 | 12/2011 | Pichna et al. |
| 2012/0041939 | A1 | 2/2012 | Amsterdamski |
| 2012/0084151 | A1 | 4/2012 | Kozak et al. |
| 2012/0084349 | A1 | 4/2012 | Lee et al. |
| 2012/0102411 | A1 | 4/2012 | Sathish |
| 2012/0102543 | A1 | 4/2012 | Kohli et al. |
| 2012/0110674 | A1 | 5/2012 | Belani et al. |
| 2012/0116923 | A1 | 5/2012 | Irving et al. |
| 2012/0131438 | A1 | 5/2012 | Li et al. |
| 2012/0143650 | A1 | 6/2012 | Crowley et al. |
| 2012/0144499 | A1 | 6/2012 | Tan et al. |
| 2012/0191596 | A1 | 7/2012 | Kremen et al. |
| 2012/0226621 | A1 | 9/2012 | Petran et al. |
| 2012/0239557 | A1 | 9/2012 | Weinflash et al. |
| 2012/0254320 | A1 | 10/2012 | Dove et al. |
| 2012/0259752 | A1 | 10/2012 | Agee |
| 2012/0323700 | A1 | 12/2012 | Aleksandrovich et al. |
| 2012/0330769 | A1 | 12/2012 | Arceo |
| 2012/0330869 | A1 | 12/2012 | Durham |
| 2013/0004933 | A1 | 1/2013 | Bhaskaran |
| 2013/0018954 | A1 | 1/2013 | Cheng |
| 2013/0085801 | A1 | 4/2013 | Sharpe et al. |
| 2013/0091156 | A1 | 4/2013 | Raiche et al. |
| 2013/0103485 | A1 | 4/2013 | Postrel |
| 2013/0111323 | A1 | 5/2013 | Taghaddos et al. |
| 2013/0124257 | A1 | 5/2013 | Schubert |
| 2013/0159351 | A1 | 6/2013 | Hamann et al. |
| 2013/0171968 | A1 | 7/2013 | Wang |
| 2013/0179982 | A1 | 7/2013 | Bridges et al. |
| 2013/0179988 | A1 | 7/2013 | Bekker et al. |
| 2013/0185806 | A1 | 7/2013 | Hatakeyama |
| 2013/0211872 | A1 | 8/2013 | Cherry et al. |
| 2013/0218829 | A1 | 8/2013 | Martinez |
| 2013/0219459 | A1 | 8/2013 | Bradley |
| 2013/0254139 | A1 | 9/2013 | Lei |
| 2013/0254649 | A1 | 9/2013 | Michael |
| 2013/0254699 | A1 | 9/2013 | Bashir et al. |
| 2013/0262328 | A1 | 10/2013 | Federgreen |
| 2013/0282438 | A1 | 10/2013 | Hunter et al. |
| 2013/0282466 | A1 | 10/2013 | Hampton |
| 2013/0290169 | A1 | 10/2013 | Bathula et al. |
| 2013/0297625 | A1 | 11/2013 | Bierner et al. |
| 2013/0298071 | A1 | 11/2013 | Wine |
| 2013/0311224 | A1 | 11/2013 | Heroux et al. |
| 2013/0318207 | A1 | 11/2013 | Dotter |
| 2013/0326112 | A1 | 12/2013 | Park et al. |
| 2013/0332362 | A1 | 12/2013 | Ciurea |
| 2013/0340086 | A1 | 12/2013 | Blom |
| 2014/0006355 | A1 | 1/2014 | Kirihata |
| 2014/0006616 | A1 | 1/2014 | Aad et al. |
| 2014/0012833 | A1 | 1/2014 | Humprecht |
| 2014/0019561 | A1 | 1/2014 | Belity et al. |

(56) References Cited

U.S. PATENT DOCUMENTS

2014/0026228 A1 1/2014 Isozaki et al.
2014/0032259 A1 1/2014 Lafever et al.
2014/0032265 A1 1/2014 Paprocki
2014/0040134 A1 2/2014 Peter
2014/0040161 A1 2/2014 Jason
2014/0040979 A1 2/2014 Barton et al.
2014/0041048 A1 2/2014 Goodwin et al.
2014/0047551 A1 2/2014 Nagasundaram et al.
2014/0052463 A1 2/2014 Cashman et al.
2014/0067731 A1 3/2014 Adams
2014/0067973 A1 3/2014 Eden
2014/0074550 A1 3/2014 Chourey
2014/0074645 A1 3/2014 Ingram
2014/0075493 A1 3/2014 Krishnan et al.
2014/0089027 A1 3/2014 Brown
2014/0089039 A1 3/2014 Mcclellan
2014/0108173 A1 4/2014 Cooper et al.
2014/0108968 A1 4/2014 Eric
2014/0137257 A1 5/2014 Martinez et al.
2014/0142988 A1 5/2014 Grosso et al.
2014/0143011 A1 5/2014 Mudugu et al.
2014/0143844 A1 5/2014 Goertzen
2014/0164476 A1 6/2014 Thomson
2014/0188956 A1 7/2014 Subba et al.
2014/0196143 A1 7/2014 Fliderman et al.
2014/0208418 A1 7/2014 Libin
2014/0222468 A1 8/2014 Araya et al.
2014/0244309 A1 8/2014 Francois
2014/0244325 A1 8/2014 Cartwright
2014/0244375 A1 8/2014 Kim
2014/0244399 A1 8/2014 Orduna et al.
2014/0257917 A1 9/2014 Spencer et al.
2014/0258093 A1 9/2014 Gardiner et al.
2014/0278539 A1 9/2014 Edwards
2014/0278663 A1 9/2014 Samuel et al.
2014/0278730 A1 9/2014 Muhart et al.
2014/0278802 A1 9/2014 Macpherson
2014/0283027 A1 9/2014 Orona et al.
2014/0283106 A1 9/2014 Stahura et al.
2014/0288971 A1 9/2014 Whibbs, III
2014/0289681 A1 9/2014 Wielgosz
2014/0289862 A1 9/2014 Gorfein et al.
2014/0317171 A1 10/2014 Fox et al.
2014/0324480 A1 10/2014 Dufel et al.
2014/0337041 A1 11/2014 Madden et al.
2014/0337466 A1 11/2014 Li et al.
2014/0344015 A1 11/2014 Puertolas-Montanes et al.
2015/0006514 A1 1/2015 Hung
2015/0012363 A1 1/2015 Grant et al.
2015/0019530 A1 1/2015 Felch
2015/0026056 A1 1/2015 Calman et al.
2015/0026260 A1 1/2015 Worthley
2015/0033112 A1 1/2015 Norwood et al.
2015/0066577 A1 3/2015 Christiansen et al.
2015/0066865 A1 3/2015 Yara et al.
2015/0088598 A1 3/2015 Acharyya et al.
2015/0106260 A1 4/2015 Andrews et al.
2015/0106264 A1 4/2015 Johnson
2015/0106867 A1 4/2015 Liang
2015/0106948 A1 4/2015 Holman et al.
2015/0106949 A1 4/2015 Holman et al.
2015/0121462 A1 4/2015 Courage et al.
2015/0143258 A1 5/2015 Carolan et al.
2015/0149362 A1 5/2015 Baum et al.
2015/0154520 A1 6/2015 Federgreen et al.
2015/0169318 A1 6/2015 Nash
2015/0172296 A1 6/2015 Fujioka
2015/0178740 A1 6/2015 Borawski et al.
2015/0199534 A1 7/2015 Francis et al.
2015/0199541 A1 7/2015 Koch et al.
2015/0199702 A1 7/2015 Singh
2015/0229664 A1 8/2015 Hawthorn et al.
2015/0235049 A1 8/2015 Cohen et al.
2015/0235050 A1 8/2015 Wouhaybi et al.
2015/0235283 A1 8/2015 Nishikawa
2015/0242773 A1 8/2015 Major et al.
2015/0242778 A1 8/2015 Wilcox et al.
2015/0242858 A1 8/2015 Smith et al.
2015/0248391 A1 9/2015 Watanabe
2015/0254597 A1 9/2015 Jahagirdar
2015/0261887 A1 9/2015 Joukov
2015/0262189 A1 9/2015 Vergeer
2015/0264417 A1 9/2015 Spitz et al.
2015/0269384 A1 9/2015 Holman et al.
2015/0271167 A1 9/2015 Kalai
2015/0288715 A1 10/2015 Hotchkiss
2015/0309813 A1 10/2015 Patel
2015/0310227 A1 10/2015 Ishida et al.
2015/0310575 A1 10/2015 Shelton
2015/0348200 A1 12/2015 Fair et al.
2015/0356362 A1 12/2015 Demos
2015/0379430 A1 12/2015 Dirac et al.
2016/0006760 A1 1/2016 Lala et al.
2016/0012465 A1 1/2016 Sharp
2016/0026394 A1 1/2016 Goto
2016/0034918 A1 2/2016 Bjelajac et al.
2016/0048700 A1 2/2016 Stransky-Heilkron
2016/0050213 A1 2/2016 Storr
2016/0063523 A1 3/2016 Nistor et al.
2016/0063567 A1 3/2016 Srivastava
2016/0071112 A1 3/2016 Unser
2016/0080405 A1 3/2016 Schler et al.
2016/0099963 A1 4/2016 Mahaffey et al.
2016/0103963 A1 4/2016 Mishra
2016/0125550 A1 5/2016 Joao et al.
2016/0125749 A1 5/2016 Delacroix et al.
2016/0125751 A1 5/2016 Barker et al.
2016/0140466 A1 5/2016 Sidebottom et al.
2016/0143570 A1 5/2016 Valacich et al.
2016/0148143 A1 5/2016 Anderson et al.
2016/0162269 A1 6/2016 Pogorelik et al.
2016/0164915 A1 6/2016 Cook
2016/0180386 A1 6/2016 Konig
2016/0188450 A1 6/2016 Appusamy et al.
2016/0189156 A1 6/2016 Kim et al.
2016/0196189 A1 7/2016 Miyagi et al.
2016/0225000 A1 8/2016 Glasgow
2016/0232465 A1 8/2016 Kurtz et al.
2016/0232534 A1 8/2016 Lacey et al.
2016/0234319 A1 8/2016 Griffin
2016/0253497 A1 9/2016 Christodorescu et al.
2016/0255089 A1* 9/2016 Diestler .............. G06F 21/6236 726/4
2016/0255139 A1 9/2016 Rathod
2016/0261631 A1 9/2016 Mssamsetty et al.
2016/0262163 A1 9/2016 Gonzalez Garrido et al.
2016/0292453 A1 10/2016 Patterson et al.
2016/0292621 A1 10/2016 Ciccone et al.
2016/0321582 A1 11/2016 Broudou et al.
2016/0321748 A1 11/2016 Mahatma et al.
2016/0330237 A1 11/2016 Edlabadkar
2016/0335531 A1 11/2016 Mullen et al.
2016/0342811 A1 11/2016 Whitcomb et al.
2016/0359861 A1 12/2016 Manov et al.
2016/0364736 A1 12/2016 Maugans, III
2016/0370954 A1 12/2016 Burningham et al.
2016/0378762 A1 12/2016 Rohter
2016/0381064 A1 12/2016 Chan et al.
2016/0381560 A1 12/2016 Margaliot
2017/0004055 A1 1/2017 Horan et al.
2017/0032395 A1 2/2017 Kaufman et al.
2017/0032408 A1 2/2017 Kumar et al.
2017/0034101 A1 2/2017 Kumar et al.
2017/0041296 A1 2/2017 Ford et al.
2017/0041324 A1 2/2017 Ionutescu et al.
2017/0046399 A1 2/2017 Sankaranarasimhan et al.
2017/0046753 A1 2/2017 Deupree, IV
2017/0061501 A1 3/2017 Horwich
2017/0068785 A1 3/2017 Experton et al.
2017/0070495 A1 3/2017 Cherry et al.
2017/0075513 A1 3/2017 Watson et al.
2017/0093917 A1 3/2017 Chandra et al.
2017/0115864 A1 4/2017 Thomas et al.
2017/0124570 A1 5/2017 Nidamanuri et al.

(56) References Cited

U.S. PATENT DOCUMENTS

2017/0140174 A1 5/2017 Lacey et al.
2017/0140467 A1 5/2017 Neag et al.
2017/0142158 A1 5/2017 Laoutaris et al.
2017/0142177 A1 5/2017 Hu
2017/0154188 A1 6/2017 Meier et al.
2017/0161520 A1 6/2017 Lockhart, III et al.
2017/0171235 A1 6/2017 Mulchandani et al.
2017/0171325 A1 6/2017 Perez
2017/0177324 A1 6/2017 Frank et al.
2017/0180378 A1 6/2017 Tyler et al.
2017/0180505 A1 6/2017 Shaw et al.
2017/0193017 A1 7/2017 Migliori
2017/0193624 A1 7/2017 Tsai
2017/0201518 A1 7/2017 Holmqvist et al.
2017/0206707 A1 7/2017 Guay et al.
2017/0208084 A1 7/2017 Steelman et al.
2017/0213206 A1 7/2017 Shearer
2017/0220685 A1 8/2017 Yan et al.
2017/0220964 A1 8/2017 Datta Ray
2017/0249710 A1 8/2017 Guillama et al.
2017/0269791 A1 9/2017 Meyerzon et al.
2017/0270318 A1 9/2017 Ritchie
2017/0278004 A1 9/2017 Mcelhinney et al.
2017/0278117 A1 9/2017 Wallace et al.
2017/0286719 A1 10/2017 Krishnamurthy et al.
2017/0287031 A1 10/2017 Barday
2017/0289199 A1 10/2017 Barday
2017/0308875 A1 10/2017 O'Regan et al.
2017/0316400 A1 11/2017 Venkatakrishnan et al.
2017/0330197 A1 11/2017 Dimaggio et al.
2017/0353404 A1 12/2017 Hodge
2018/0032757 A1 2/2018 Michael
2018/0039975 A1 2/2018 Hefetz
2018/0041498 A1 2/2018 Kikuchi
2018/0046753 A1 2/2018 Shelton
2018/0046939 A1 2/2018 Meron et al.
2018/0063174 A1 3/2018 Grill et al.
2018/0063190 A1 3/2018 Wright et al.
2018/0082368 A1 3/2018 Weinflash et al.
2018/0083843 A1 3/2018 Sambandam
2018/0091476 A1 3/2018 Jakobsson et al.
2018/0129989 A1* 5/2018 Bowers .............. G06Q 10/0635
2018/0131574 A1 5/2018 Jacobs et al.
2018/0131658 A1 5/2018 Bhagwan et al.
2018/0165637 A1 6/2018 Romero et al.
2018/0198614 A1 7/2018 Neumann
2018/0204281 A1 7/2018 Painter et al.
2018/0219917 A1 8/2018 Chiang
2018/0239500 A1 8/2018 Allen et al.
2018/0248914 A1 8/2018 Sartor
2018/0285887 A1 10/2018 Maung
2018/0301222 A1 10/2018 Dew, Sr. et al.
2018/0307859 A1 10/2018 Lafever et al.
2018/0336509 A1 11/2018 Guttmann
2018/0343215 A1 11/2018 Ganapathi et al.
2018/0349583 A1 12/2018 Turgeman et al.
2018/0351888 A1 12/2018 Howard
2018/0352003 A1 12/2018 Winn et al.
2018/0357243 A1 12/2018 Yoon
2018/0365720 A1 12/2018 Goldman et al.
2018/0374030 A1 12/2018 Barday et al.
2018/0375814 A1 12/2018 Hart
2019/0005210 A1 1/2019 Wiederspohn et al.
2019/0012211 A1 1/2019 Selvaraj
2019/0012672 A1 1/2019 Francesco
2019/0019184 A1 1/2019 Lacey et al.
2019/0050547 A1 2/2019 Welsh et al.
2019/0087570 A1 3/2019 Sloane
2019/0096020 A1 3/2019 Barday et al.
2019/0108353 A1 4/2019 Sadeh et al.
2019/0130132 A1 5/2019 Barbas et al.
2019/0138496 A1 5/2019 Yamaguchi
2019/0139087 A1 5/2019 Dabbs et al.
2019/0148003 A1 5/2019 Van Hoe
2019/0156053 A1 5/2019 Vogel et al.
2019/0156058 A1 5/2019 Van Dyne et al.
2019/0171801 A1 6/2019 Barday et al.
2019/0179652 A1 6/2019 Hesener et al.
2019/0180051 A1 6/2019 Barday et al.
2019/0182294 A1 6/2019 Rieke et al.
2019/0188402 A1 6/2019 Wang et al.
2019/0266200 A1 8/2019 Francolla
2019/0266201 A1 8/2019 Barday et al.
2019/0266350 A1 8/2019 Barday et al.
2019/0266634 A1 8/2019 Axelrod
2019/0268343 A1 8/2019 Barday et al.
2019/0268344 A1 8/2019 Barday et al.
2019/0272492 A1 9/2019 Elledge et al.
2019/0294818 A1 9/2019 Barday et al.
2019/0318370 A1 10/2019 Kopikare
2019/0332802 A1 10/2019 Barday et al.
2019/0332807 A1 10/2019 Lafever et al.
2019/0333118 A1 10/2019 Crimmins et al.
2019/0354709 A1 11/2019 Brinskelle
2019/0356684 A1 11/2019 Sinha et al.
2019/0362169 A1 11/2019 Lin et al.
2019/0362268 A1 11/2019 Fogarty et al.
2019/0371303 A1 12/2019 Siva Kumaran et al.
2019/0377901 A1 12/2019 Balzer et al.
2019/0378073 A1 12/2019 Lopez et al.
2019/0384934 A1 12/2019 Kim
2019/0392162 A1 12/2019 Stern et al.
2019/0392170 A1 12/2019 Barday et al.
2019/0392171 A1 12/2019 Barday et al.
2020/0004938 A1 1/2020 Brannon et al.
2020/0020454 A1 1/2020 Mcgarvey et al.
2020/0050966 A1 2/2020 Enuka et al.
2020/0051117 A1 2/2020 Mitchell
2020/0057781 A1 2/2020 Mccormick
2020/0074471 A1 3/2020 Adjaoute
2020/0081865 A1 3/2020 Farrar et al.
2020/0082270 A1 3/2020 Gu et al.
2020/0090197 A1* 3/2020 Rodriguez ............... G06N 3/09
2020/0092179 A1 3/2020 Chieu et al.
2020/0110589 A1 4/2020 Bequet et al.
2020/0110904 A1 4/2020 Shinde et al.
2020/0117737 A1 4/2020 Gopalakrishnan et al.
2020/0120098 A1 4/2020 Berg et al.
2020/0137097 A1 4/2020 Zimmermann et al.
2020/0143301 A1 5/2020 Bowers
2020/0143797 A1 5/2020 Manoharan et al.
2020/0159952 A1 5/2020 Dain et al.
2020/0159955 A1 5/2020 Barlik et al.
2020/0167653 A1 5/2020 Manjunath et al.
2020/0175424 A1 6/2020 Kursun
2020/0183655 A1 6/2020 Barday et al.
2020/0186355 A1 6/2020 Davies
2020/0193018 A1 6/2020 Van Dyke
2020/0193022 A1 6/2020 Lunsford et al.
2020/0210558 A1 7/2020 Barday et al.
2020/0210620 A1 7/2020 Haletky
2020/0211002 A1 7/2020 Steinberg
2020/0220901 A1 7/2020 Barday et al.
2020/0226156 A1 7/2020 Borra et al.
2020/0226196 A1 7/2020 Brannon et al.
2020/0242259 A1 7/2020 Chirravuri et al.
2020/0242719 A1 7/2020 Lee
2020/0250342 A1 8/2020 Miller et al.
2020/0252413 A1 8/2020 Buzbee et al.
2020/0252817 A1 8/2020 Brouillette et al.
2020/0272764 A1 8/2020 Brannon et al.
2020/0285755 A1 9/2020 Kassoumeh et al.
2020/0293637 A1 9/2020 Schulze et al.
2020/0293679 A1 9/2020 Handy Bosma et al.
2020/0296171 A1 9/2020 Mocanu et al.
2020/0302089 A1 9/2020 Barday et al.
2020/0310917 A1 10/2020 Tkachev et al.
2020/0311310 A1 10/2020 Barday et al.
2020/0344243 A1 10/2020 Brannon et al.
2020/0356695 A1 11/2020 Brannon et al.
2020/0364369 A1 11/2020 Brannon et al.
2020/0366671 A1* 11/2020 Larson .................. H04L 9/3231
2020/0372178 A1 11/2020 Barday et al.
2020/0394327 A1 12/2020 Childress et al.

(56) References Cited

U.S. PATENT DOCUMENTS

| | | | |
|---|---|---|---|
| 2020/0401380 | A1 | 12/2020 | Jacobs et al. |
| 2020/0401962 | A1 | 12/2020 | Gottemukkala et al. |
| 2020/0410117 | A1 | 12/2020 | Barday et al. |
| 2020/0410131 | A1 | 12/2020 | Barday et al. |
| 2020/0410132 | A1 | 12/2020 | Brannon et al. |
| 2021/0012341 | A1 | 1/2021 | Garg et al. |
| 2021/0036850 | A1 | 2/2021 | Sunkavally et al. |
| 2021/0056148 | A1 | 2/2021 | Smit et al. |
| 2021/0056569 | A1 | 2/2021 | Silberman et al. |
| 2021/0075775 | A1 | 3/2021 | Cheng et al. |
| 2021/0081567 | A1 | 3/2021 | Park et al. |
| 2021/0099449 | A1 | 4/2021 | Frederick et al. |
| 2021/0110047 | A1 | 4/2021 | Victor |
| 2021/0125089 | A1 | 4/2021 | Nickl et al. |
| 2021/0152496 | A1 | 5/2021 | Kim et al. |
| 2021/0174016 | A1 | 6/2021 | Fox et al. |
| 2021/0182940 | A1 | 6/2021 | Gupta et al. |
| 2021/0224402 | A1 | 7/2021 | Sher-Jan et al. |
| 2021/0233157 | A1 | 7/2021 | Crutchfield, Jr. |
| 2021/0243595 | A1 | 8/2021 | Buck et al. |
| 2021/0248247 | A1 | 8/2021 | Poothokaran et al. |
| 2021/0256163 | A1 | 8/2021 | Fleming et al. |
| 2021/0279360 | A1 | 9/2021 | Gimenez Palop et al. |
| 2021/0288995 | A1 | 9/2021 | Attar et al. |
| 2021/0297441 | A1 | 9/2021 | Olalere |
| 2021/0303828 | A1 | 9/2021 | Lafreniere et al. |
| 2021/0312061 | A1 | 10/2021 | Schroeder et al. |
| 2021/0326786 | A1 | 10/2021 | Sun et al. |
| 2021/0326978 | A1 | 10/2021 | Hsu |
| 2021/0328969 | A1 | 10/2021 | Gaddam et al. |
| 2021/0382949 | A1 | 12/2021 | Yastrebenetsky et al. |
| 2021/0397735 | A1 | 12/2021 | Samatov et al. |
| 2021/0400018 | A1 | 12/2021 | Vettaikaran et al. |
| 2021/0406712 | A1 | 12/2021 | Bhide et al. |
| 2022/0137850 | A1 | 5/2022 | Boddu et al. |
| 2022/0171759 | A1 | 6/2022 | Jindal et al. |
| 2022/0217045 | A1 | 7/2022 | Blau et al. |

FOREIGN PATENT DOCUMENTS

| | | | |
|---|---|---|---|
| EP | 1394698 | | 3/2004 |
| EP | 2031540 | | 3/2009 |
| GB | 2541040 | A | 2/2017 |
| KR | 20130062500 | | 6/2013 |
| WO | 2001033430 | | 5/2001 |
| WO | 20020067158 | | 8/2002 |
| WO | 20030050773 | | 6/2003 |
| WO | 2005008411 | | 1/2005 |
| WO | 2007002412 | | 1/2007 |
| WO | 2008134203 | | 11/2008 |
| WO | 2012174659 | | 12/2012 |
| WO | 2014000764 | | 1/2014 |
| WO | 2015116905 | | 8/2015 |
| WO | 2020146028 | | 7/2020 |
| WO | 2022006421 | | 1/2022 |

OTHER PUBLICATIONS

Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Decision Regarding Institution of Post-Grant Review in Case PGR2018-00056 for U.S. Pat. No. 9,691,090 B1, Oct. 11, 2018.
Ex Parte Quayle Action, dated May 10, 2022, from corresponding U.S. Appl. No. 17/668,714.
Final Office Action, dated Apr. 1, 2022, from corresponding U.S. Appl. No. 17/370,650.
Final Office Action, dated Apr. 23, 2020, from corresponding U.S. Appl. No. 16/572,347.
Final Office Action, dated Apr. 25, 2022, from corresponding U.S. Appl. No. 17/149,421.
Final Office Action, dated Apr. 27, 2021, from corresponding U.S. Appl. No. 17/068,454.
Final Office Action, dated Apr. 28, 2022, from corresponding U.S. Appl. No. 16/925,550.
Final Office Action, dated Apr. 5, 2022, from corresponding U.S. Appl. No. 17/013,756.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 10, 2021, from corresponding U.S. Appl. No. 17/187,329.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 25, 2022, from corresponding U.S. Appl. No. 17/346,586.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Jul. 1, 2022, from corresponding U.S. Appl. No. 17/187,329.
Final Office Action, dated Jul. 21, 2021, from corresponding U.S. Appl. No. 17/151,334.
Final Office Action, dated Jul. 6, 2022, from corresponding U.S. Appl. No. 17/200,698.
Final Office Action, dated Jul. 7, 2021, from corresponding U.S. Appl. No. 17/149,421.
Final Office Action, dated Jun. 10, 2022, from corresponding U.S. Appl. No. 17/161,159.
Final Office Action, dated Jun. 29, 2022, from corresponding U.S. Appl. No. 17/020,275.
Final Office Action, dated Jun. 9, 2022, from corresponding U.S. Appl. No. 17/494,220.
Final Office Action, dated Mar. 16, 2022, from corresponding U.S. Appl. No. 17/838,939.
Final Office Action, dated Mar. 16, 2023, from corresponding U.S. Appl. No. 17/670,341.
Final Office Action, dated Mar. 21, 2022, from corresponding U.S. Appl. No. 17/373,444.
Final Office Action, dated Mar. 22, 2022, from corresponding U.S. Appl. No. 17/380,485.

(56) References Cited

OTHER PUBLICATIONS

Final Office Action, dated Mar. 26, 2021, from corresponding U.S. Appl. No. 17/020,275.
Final Office Action, dated Mar. 2, 2023, from corresponding U.S. Appl. No. 17/836,865.
Final Office Action, dated Mar. 3, 2023, from corresponding U.S. Appl. No. 17/670,354.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated Mar. 9, 2023, from corresponding U.S. Appl. No. 17/679,734.
Final Office Action, dated May 12, 2022, from corresponding U.S. Appl. No. 17/499,624.
Final Office Action, dated May 14, 2021, from corresponding U.S. Appl. No. 17/013,756.
Final Office Action, dated May 16, 2022, from corresponding U.S. Appl. No. 17/480,377.
Final Office Action, dated May 2, 2022, from corresponding U.S. Appl. No. 17/499,595.
Final Office Action, dated May 24, 2022, from corresponding U.S. Appl. No. 17/499,582.
Final Office Action, dated Nov. 8, 2022, from corresponding U.S. Appl. No. 17/151,334.
Final Office Action, dated Nov. 29, 2017, from corresponding U.S. Appl. No. 15/619,237.
Final Office Action, dated Oct. 26, 2021, from corresponding U.S. Appl. No. 17/306,496.
Final Office Action, dated Oct. 28, 2021, from corresponding U.S. Appl. No. 17/234,205.
Final Office Action, dated Oct. 29, 2021, from corresponding U.S. Appl. No. 17/020,275.
Final Office Action, dated Sep. 17, 2021, from corresponding U.S. Appl. No. 17/200,698.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Notice of Allowance, dated Apr. 12, 2017, from corresponding U.S. Appl. No. 15/256,419.
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 20, 2022, from corresponding U.S. Appl. No. 17/573,808.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 27, 2022, from corresponding U.S. Appl. No. 17/573,999.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.
Notice of Allowance, dated Apr. 28, 2022, from corresponding U.S. Appl. No. 17/592,922.
Notice of Allowance, dated Apr. 28, 2022, from corresponding U.S. Appl. No. 17/670,352.
Notice of Allowance, dated Apr. 29, 2020, from corresponding U.S. Appl. No. 16/700,049.
Notice of Allowance, dated Apr. 29, 2022, from corresponding U.S. Appl. No. 17/387,421.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 4, 2022, from corresponding U.S. Appl. No. 17/493,332.
Notice of Allowance, dated Apr. 4, 2022, from corresponding U.S. Appl. No. 17/572,298.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 22, 2022, from corresponding U.S. Appl. No. 17/499,595.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 3, 2022, from corresponding U.S. Appl. No. 17/668,714.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 4, 2022, from corresponding U.S. Appl. No. 17/670,349.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.

(56) References Cited

OTHER PUBLICATIONS

Notice of Allowance, dated Aug. 9, 2022, from corresponding U.S. Appl. No. 17/832,313.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 2, 2021, from corresponding U.S. Appl. No. 16/901,654.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Dec. 3, 2019, from corresponding U.S. Appl. No. 16/563,749.
Notice of Allowance, dated Dec. 30, 2021, from corresponding U.S. Appl. No. 16/938,520.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 8, 2021, from corresponding U.S. Appl. No. 17/397,472.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 1, 2022, from corresponding U.S. Appl. No. 17/346,509.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 14, 2022, from corresponding U.S. Appl. No. 16/623,157.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.
Notice of Allowance, dated Feb. 22, 2022, from corresponding U.S. Appl. No. 17/535,065.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Notice of Allowance, dated Jan. 1, 2021, from corresponding U.S. Appl. No. 17/026,727.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019, from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 24, 2022, from corresponding U.S. Appl. No. 17/340,699.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
Notice of Allowance, dated Jan. 26, 2022, from corresponding U.S. Appl. No. 17/491,906.
Notice of Allowance, dated Jan. 29, 2020, from corresponding U.S. Appl. No. 16/278,119.
Notice of Allowance, dated Jan. 31, 2022, from corresponding U.S. Appl. No. 17/472,948.
Notice of Allowance, dated Jan. 5, 2022, from corresponding U.S. Appl. No. 17/475,241.

(56) References Cited

OTHER PUBLICATIONS

Notice of Allowance, dated Jan. 6, 2021, from corresponding U.S. Appl. No. 16/595,327.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 20, 2022, from corresponding U.S. Appl. No. 16/938,509.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 27, 2022, from corresponding U.S. Appl. No. 17/679,750.
Notice of Allowance, dated Jul. 29, 2022, from corresponding U.S. Appl. No. 17/670,341.
Notice of Allowance, dated Jul. 31, 2019, from corresponding U.S. Appl. No. 16/221,153.
Notice of Allowance, dated Jul. 7, 2022, from corresponding U.S. Appl. No. 17/571,871.
Notice of Allowance, dated Jul. 7, 2023, from corresponding U.S. Appl. No. 17/977,285.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 14, 2022, from corresponding U.S. Appl. No. 17/679,734.
Notice of Allowance, dated Jun. 16, 2020, from corresponding U.S. Appl. No. 16/798,818.
Notice of Allowance, dated Jun. 16, 2022, from corresponding U.S. Appl. No. 17/119,080.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 2, 2021, from corresponding U.S. Appl. No. 17/198,581.
Notice of Allowance, dated Jun. 2, 2022, from corresponding U.S. Appl. No. 17/493,290.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Notice of Allowance, dated Jun. 23, 2022, from corresponding U.S. Appl. No. 17/588,645.
Notice of Allowance, dated Jun. 27, 2018, from corresponding U.S. Appl. No. 15/882,989.
Notice of Allowance, dated Jun. 29, 2022, from corresponding U.S. Appl. No. 17/675,118.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Jun. 8, 2022, from corresponding U.S. Appl. No. 17/722,551.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 16, 2022, from corresponding U.S. Appl. No. 17/486,350.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.

(56) References Cited

OTHER PUBLICATIONS

Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 28, 2022, from corresponding U.S. Appl. No. 17/499,609.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated Mar. 31, 2022, from corresponding U.S. Appl. No. 17/476,209.
Notice of Allowance, dated Mar. 4, 2022, from corresponding U.S. Appl. No. 17/409,999.
Notice of Allowance, dated Mar. 6, 2023, from corresponding U.S. Appl. No. 17/836,430.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 11, 2022, from corresponding U.S. Appl. No. 17/395,759.
Notice of Allowance, dated May 13, 2021, from corresponding U.S. Appl. No. 17/101,915.
Notice of Allowance, dated May 18, 2022, from corresponding U.S. Appl. No. 17/670,354.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Notice of Allowance, dated May 25, 2022, from corresponding U.S. Appl. No. 16/872,031.
Notice of Allowance, dated May 26, 2021, from corresponding U.S. Appl. No. 16/808,493.
Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 27, 2022, from corresponding U.S. Appl. No. 17/543,546.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 31, 2022, from corresponding U.S. Appl. No. 17/679,715.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 6, 2022, from corresponding U.S. Appl. No. 17/666,886.
Notice of Allowance, dated May 7, 2020, from corresponding U.S. Appl. No. 16/505,426.
Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 16, 2021, from corresponding U.S. Appl. No. 17/491,871.
Notice of Allowance, dated Nov. 2, 2018, from corresponding U.S. Appl. No. 16/054,762.
Notice of Allowance, dated Nov. 22, 2021, from corresponding U.S. Appl. No. 17/383,889.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Nov. 9, 2020, from corresponding U.S. Appl. No. 16/595,342.
Notice of Allowance, dated Oct. 1, 2021, from corresponding U.S. Appl. No. 17/340,395.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 25, 2022, from corresponding U.S. Appl. No. 17/711,331.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 1, 2022, from corresponding U.S. Appl. No. 17/480,377.
Notice of Allowance, dated Sep. 2, 2022, from corresponding U.S. Appl. No. 17/380,485.

(56) References Cited

OTHER PUBLICATIONS

Notice of Allowance, dated Sep. 12, 2019, from corresponding U.S. Appl. No. 16/512,011.
Notice of Allowance, dated Sep. 12, 2022, from corresponding U.S. Appl. No. 17/674,187.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 29, 2021, from corresponding U.S. Appl. No. 17/316,179.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Notice of Filing Date for Petition for Post-Grant Review of related U.S. Pat. No. 9,691,090 dated Apr. 12, 2018.
Office Action, dated Apr. 1, 2021, from corresponding U.S. Appl. No. 17/119,080.
Office Action, dated Apr. 12, 2022, from corresponding U.S. Appl. No. 17/670,341.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 18, 2022, from corresponding U.S. Appl. No. 17/670,349.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Apr. 8, 2022, from corresponding U.S. Appl. No. 16/938,509.
Office Action, dated Aug. 12, 2022, from corresponding U.S. Appl. No. 17/679,734.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 17, 2022, from corresponding U.S. Appl. No. 17/373,444.
Office Action, dated Aug. 17, 2022, from corresponding U.S. Appl. No. 17/836,430.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 19, 2022, from corresponding U.S. Appl. No. 17/584,187.
Office Action, dated Aug. 2, 2022, from corresponding U.S. Appl. No. 17/670,354.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 4, 2022, from corresponding U.S. Appl. No. 17/828,953.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 13, 2021, from corresponding U.S. Appl. No. 17/476,209.
Office Action, dated Dec. 14, 2018, from corresponding U.S. Appl. No. 16/104,393.
Office Action, dated Dec. 15, 2016, from corresponding U.S. Appl. No. 15/256,419.

(56) References Cited

OTHER PUBLICATIONS

Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 2, 2021, from corresponding U.S. Appl. No. 17/504,102.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 3, 2018, from corresponding U.S. Appl. No. 16/055,998.
Office Action, dated Dec. 30, 2021, from corresponding U.S. Appl. No. 17/149,421.
Office Action, dated Dec. 31, 2018, from corresponding U.S. Appl. No. 16/160,577.
Office Action, dated Dec. 7, 2021, from corresponding U.S. Appl. No. 17/499,609.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 16, 2022, from corresponding U.S. Appl. No. 16/872,031.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 2, 2023, from corresponding U.S. Appl. No. 17/510,001.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Feb. 9, 2022, from corresponding U.S. Appl. No. 17/543,546.
Office Action, dated Jan. 14, 2022, from corresponding U.S. Appl. No. 17/499,595.
Office Action, dated Jan. 18, 2019, from corresponding U.S. Appl. No. 16/055,984.
Office Action, dated Jan. 19, 2023, from corresponding U.S. Appl. No. 17/205,165.
Office Action, dated Jan. 21, 2022, from corresponding U.S. Appl. No. 17/499,624.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 25, 2022, from corresponding U.S. Appl. No. 17/494,220.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 31, 2022, from corresponding U.S. Appl. No. 17/493,290.
Office Action, dated Jan. 31, 2023, from corresponding U.S. Appl. No. 17/836,872.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 4, 2022, from corresponding U.S. Appl. No. 17/480,377.
Office Action, dated Jan. 7, 2020, from corresponding U.S. Appl. No. 16/572,182.
Office Action, dated Jan. 7, 2022, from corresponding U.S. Appl. No. 17/387,421.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jul. 27, 2022, from corresponding U.S. Appl. No. 17/831,713.
Office Action, dated Jul. 28, 2022, from corresponding U.S. Appl. No. 16/925,550.
Office Action, dated Jul. 7, 2022, from corresponding U.S. Appl. No. 17/370,650.
Office Action, dated Jun. 1, 2020, from corresponding U.S. Appl. No. 16/862,952.
Office Action, dated Jun. 1, 2022, from corresponding U.S. Appl. No. 17/306,496.
Office Action, dated Jun. 14, 2022, from corresponding U.S. Appl. No. 17/346,586.
Office Action, dated Jun. 16, 2022, from corresponding U.S. Appl. No. 17/689,683.
Office Action, dated Jun. 24, 2019, from corresponding U.S. Appl. No. 16/410,336.

(56) References Cited

OTHER PUBLICATIONS

Office Action, dated Jun. 24, 2021, from corresponding U.S. Appl. No. 17/234,205.
Office Action, dated Jun. 27, 2019, from corresponding U.S. Appl. No. 16/404,405.
Office Action, dated Jun. 7, 2021, from corresponding U.S. Appl. No. 17/200,698.
Office Action, dated Jun. 7, 2023, from corresponding U.S. Appl. No. 17/977,285.
Office Action, dated Jun. 9, 2021, from corresponding U.S. Appl. No. 17/222,523.
Office Action, dated Mar. 1, 2022, from corresponding U.S. Appl. No. 17/119,080.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 2, 2022, from corresponding U.S. Appl. No. 17/020,275.
Office Action, dated Mar. 2, 2022, from corresponding U.S. Appl. No. 17/161,159.
Office Action, dated Mar. 2, 2022, from corresponding U.S. Appl. No. 17/200,698.
Office Action, dated Mar. 20, 2020, from corresponding U.S. Appl. No. 16/778,709.
Office Action, dated Mar. 21, 2022, from corresponding U.S. Appl. No. 17/571,871.
Office Action, dated Mar. 22, 2022, from corresponding U.S. Appl. No. 17/187,329.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 12, 2022, from corresponding U.S. Appl. No. 17/509,974.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 16, 2022, from corresponding U.S. Appl. No. 17/679,750.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 24, 2022, from corresponding U.S. Appl. No. 17/674,187.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated May 9, 2022, from corresponding U.S. Appl. No. 16/840,943.
Office Action, dated Nov. 1, 2017, from corresponding U.S. Appl. No. 15/169,658.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 10, 2022, from corresponding U.S. Appl. No. 17/670,341.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 18, 2022, from corresponding U.S. Appl. No. 17/836,454.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 23, 2021, from corresponding U.S. Appl. No. 17/013,756.
Office Action, dated Nov. 24, 2020, from corresponding U.S. Appl. No. 16/925,628.
Office Action, dated Nov. 26, 2021, from corresponding U.S. Appl. No. 16/925,550.
Office Action, dated Nov. 29, 2022, from corresponding U.S. Appl. No. 17/838,939.
Office Action, dated Nov. 4, 2021, from corresponding U.S. Appl. No. 17/491,906.
Office Action, dated Nov. 8, 2021, from corresponding U.S. Appl. No. 16/872,130.
Office Action, dated Oct. 10, 2018, from corresponding U.S. Appl. No. 16/041,563.
Office Action, dated Oct. 10, 2018, from corresponding U.S. Appl. No. 16/055,083.

(56) References Cited

OTHER PUBLICATIONS

Office Action, dated Oct. 10, 2018, from corresponding U.S. Appl. No. 16/055,944.
Office Action, dated Oct. 12, 2021, from corresponding U.S. Appl. No. 17/346,509.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 15, 2021, from corresponding U.S. Appl. No. 16/908,081.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 25, 2022, from corresponding U.S. Appl. No. 17/836,865.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 2, 2022, from corresponding U.S. Appl. No. 17/499,624.
Office Action, dated Sep. 22, 2017, from corresponding U.S. Appl. No. 15/619,278.
Office Action, dated Sep. 24, 2021, from corresponding U.S. Appl. No. 17/342,153.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Office Action, dated Sep. 8, 2022, from corresponding U.S. Appl. No. 17/850,244.
Petition for Post-Grant Review of related U.S. Pat. No. 9,691,090 dated Mar. 27, 2018.
Restriction Requirement, dated Apr. 10, 2019, from corresponding U.S. Appl. No. 16/277,715.
Restriction Requirement, dated Apr. 12, 2022, from corresponding U.S. Appl. No. 17/584,187.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 14, 2022, from corresponding U.S. Appl. No. 17/836,872.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017 /036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Invitation to Pay Additional Fees, dated May 2, 2023, from corresponding International Application No. PCT/US2023/011446.
U.S. Appl. No. 17/881,076, filed Jul. 17, 2024, Notice of Allowance.

* cited by examiner

COMPUTING PLATFORM FOR FACILITATING DATA EXCHANGE AMONG COMPUTING ENVIRONMENTS

CROSS-REFERENCE TO RELATED APPLICATIONS

This application is a divisional of U.S. patent application Ser. No. 17/881,076, filed on Aug. 4, 2022, which claims the benefit of and priority to U.S. Provisional Patent Application No. 63/229,854, filed on Aug. 5, 2021. Each of the aforementioned applications is hereby incorporated by reference in its entirety.

TECHNICAL FIELD

The present disclosure is generally related to systems and methods for processing data requests involving exchange of data between computing environments while protecting the data from maliciously caused destruction, unauthorized modification, or unauthorized disclosure.

BACKGROUND

A significant challenge encountered by many entities such as organizations, corporations, companies, and/or the like is mitigating risks associated with integrating computer-related functionality provided by third party computing systems (e.g., software, storage, processing capacity, etc.). For example, a first party may integrate computer-related functionality provided through a third party computing system into a computing system of the first party in the form of a computer-implemented service provided by the third party computing system that interfaces with the first party computing system. In another example, the first party may integrate computer-related functionality provided through the third party computing system into the first party computing system in the form of software functionality provided by the third party computing system that is installed within the first party computing system. Such integrations can expose the first party computing system to signification risk of experiencing some type of incident such as a data security breach, unauthorized access to the first party computing system, malicious attacks on the first party computing system such as malware or ransomware, and/or the like.

To combat this challenge, many first parties will vet the integration of computer-related functionality provided by third party computing systems into first party computing systems to evaluate the risk associated with such integrations and to better understand what challenges may be involved in such integrations. Often, the vetting process involves gathering data (e.g., information) from third parties that are associated with these third party computing systems. For example, a first party may request a third party to complete an assessment to provide information on particular computer-related functionality provided through a third party computing system so that the first party can use such information in performing the vetting process.

However, the data gathering process can present significant technical challenges to many first and third parties. For instance, technical challenges can arise from the fact that the different first parties and third parties that can be involved in the data gathering process may be quite diverse with respect to computing environments in which they operate and the different functionality, capabilities, interfaces, and/or the like among the computing environments. This diversity among the computing environments can often create significant diversity in the way in which these different computing environments communicate and exchange data. Therefore, any particular first or third party may be required to operate their computing environment using a variety of hardware components and/or software components, providing a variety of functionality, capabilities, and/or the like, so that the particular first or third party can take part in the data gathering process with a large number of other first and/or third parties.

In addition, technical challenges can arise due to the number of third parties any one first party may need to gather data from, as well as the volume of data that may need to be gathered from these third parties. The same can be true with respect to the number of first parties any one third party may need to provide data to, as well as the volume of data that may need to be provided to these first parties. For example, the data gathering process can prove to be quite taxiing on a first or third party's computing environment due to a large number of data requests and/or a large amount of data that may be involved in the data gathering process, as well as a large number of first and/or third party computing environments that needs to be interacted with in fulfilling the data requests.

Further, technical challenges can arise due to requirements imposed by first and/or third parties to allow exchange of certain types of data. For example, a third party may require a particular type of data that is considered to be sensitive in nature to be managed with certain security and/or access controls in place. These security and/or access controls can prove to be quite challenging when they need to be implemented within a first party's computing environment so that the computing environment is sufficiently operated to be used in the data gathering process. This can be especially true when the first party may be dealing with multiple third parties who impose different, conflicting requirements that need to be implemented within the first party's computing environment. Accordingly, a need exists in the art for improved systems and methods for facilitating data exchange among a diverse group of first and third computing environments. Various aspects of the disclosure provided herein address such a need.

SUMMARY

In general, various aspects of the present disclosure provide methods, apparatuses, systems, computing devices, computing entities, and/or the like for exchanging data among computing environments. In accordance with various aspects, a method is provided that comprises: receiving, by computing hardware, a request on behalf of a first party to have a third party provide an electronic artifact, wherein: the request is submitted by the first party through a data exchange computing platform, the data exchange computing platform provides a data exchange service that facilitates exchange of electronic artifacts between a plurality of tenants of the data exchange computing platform, and the first party is a first tenant of the plurality of tenants and has a first tenant instance on the data exchange computing platform; determining, by the computing hardware, that the third party is not a tenant of the plurality of tenants; responsive to determining the third party is not the tenant of the plurality of tenants, sending, by the computing hardware, an electronic notification on behalf of the first party to the third party requesting the electronic artifact, wherein the electronic notification comprises an invitation mechanism for facilitating registration of the third party with the data exchange service; receiving, by the computing hardware, an indication of an activation of the invitation mechanism; and responsive to receiving the indication: generating, by the computing hardware, a second tenant instance on the data exchange computing platform for the third party to facilitate the third party being a second tenant of the plurality of tenants; and providing, by the computing hardware, access to the request via the second tenant instance so that the request is automatically available to the third party through the data exchange service.

In some aspects, the method further comprises: providing, by the computing hardware, an upload mechanism through the second tenant instance to facilitate the third party uploading the electronic artifact into the data exchange computing platform; receiving, by the computing hardware and via the upload mechanism, the electronic artifact; and responsive to receiving the electronic artifact: providing, by the computing hardware, access to the electronic artifact to the first party through the first tenant instance; and sending, by the computing hardware, a second electronic notification to the first party indicating the electronic artifact is available through the data exchange service.

In some aspects, the electronic artifact comprises an assessment to be completed by the third party and the method further comprises: providing, by the computing hardware, an access mechanism through the second tenant instance to facilitate the third party accessing the assessment via the data exchange service; receiving, by the computing hardware, a second indication of a second activation of the access mechanism; responsive to receiving the second indication, providing, by the computing hardware, access to the assessment through the second tenant instance; providing, by the computing hardware, an upload mechanism through the second tenant instance to facilitate the third party uploading a completed version of the assessment into the data exchange computing platform; receiving, by the computing hardware and via the upload mechanism, the completed version of the assessment; and responsive to receiving the completed version of the assessment: providing, by the computing hardware, access to the completed version of the assessment to the first party through the first tenant instance; and sending, by the computing hardware, a second electronic notification to the first party indicating the completed version of the assessment is available through the data exchange service.

In some aspects, providing the upload mechanism through the second tenant instance to facilitate the third party uploading the completed version of the assessment into the data exchange computing platform comprises: providing, by the computing hardware, access to autocompletion assessment software through the second tenant instance, wherein the assessment comprises a set of questions and the autocompletion assessment software is configured to automatically identify answers to the set of questions based on previous answers to previous questions provided by the third party in a previous assessment completed by the third party; and processing, by the computing hardware, the assessment using the autocompletion assessment software to identify an answer to at least one question of the set of questions and to load the answer to the at least one question into the assessment as part of generating the completed version of the assessment. In some aspects, generating the second tenant instance on the data exchange computing platform for the third party to facilitate the third party being the second tenant of the plurality of tenants comprises: sending, by the computing hardware, a second electronic communication comprising a conformation mechanism for confirming creation of the second tenant instance for the third party; receiving, by the computing hardware, a second indication of an activation of the conformation mechanism; and responsive to receiving the second indication, creating, by the computing hardware, the second tenant instance on the data exchange computing platform.

In some aspects, the method further comprises: receiving, by the computing hardware and via the second tenant instance, a second request to claim a third party trust profile, wherein the third party trust profile is configured for allowing the third party to manage availability of the electronic artifacts through the data exchange service to the plurality of tenants; and responsive to receiving the second request: locking, by the computing hardware, the third party trust profile so that the third party trust profile is unavailable to be claimed by another tenant of the plurality of tenants; submitting, by the computing hardware, the second request to claim the third party trust profile to be validated; receiving, by the computing hardware, a second indication that the second request to claim the third party trust profile has been validated; and responsive to receiving the second indication, linking the third party trust profile to the second tenant instance in the data exchange computing platform so that the third party trust profile is available to the third party through the second tenant instance.

In some aspects, the method further comprises: receiving, by the computing hardware and via the second tenant instance, a third request to post a particular electronic artifact to the third party trust profile; receiving, by the computing hardware, the particular electronic artifact uploaded through the second tenant instance by the third party; and posting, by the computing hardware, the particular electronic artifact to the third party trust profile so that the particular electronic artifact is publicly available to the plurality of tenants.

In some aspects, the method further comprises: receiving, by the computing hardware and via the second tenant instance, a third request to post a particular electronic artifact to the third party trust profile; receiving, by the computing hardware, the particular electronic artifact uploaded through the second tenant instance by the third party; posting, by the computing hardware, the particular electronic artifact to the third party trust profile so that the particular electronic artifact is privately available to the plurality of tenants; receiving, by the computing hardware and from a particular tenant of the plurality of tenants, a fourth request to access the particular electronic artifact; and responsive to receiving the fourth request: sending, by the computing hardware, a second electronic communication to the third party, wherein the second electronic communication comprises the fourth request to access the particular electronic artifact; receiving, by the computing hardware, a third indication to fulfill the fourth request; and responsive to receiving the third indication, providing, by the computing hardware, access to the particular electronic artifact through a tenant instance associated with the particular tenant.

In accordance with various aspects, a system is provided comprising a non-transitory computer-readable medium storing instructions and a processing device communicatively coupled to the non-transitory computer-readable medium. The processing device is configured to execute the instructions and thereby perform operations comprising: receiving a request on behalf of a first party to have a third party provide an electronic artifact, wherein: the request is submitted by the first party through a data exchange computing platform used in facilitating exchange of electronic artifacts between a plurality of tenants of the data exchange computing platform; and the first party is a first tenant of the plurality of tenants and has a first tenant instance on the data exchange computing platform; sending an electronic notification on behalf of the first party to the third party requesting the electronic artifact, wherein the electronic notification comprises an invitation mechanism for facilitating the third party become a second tenant of the plurality of tenants; receiving an indication of an activation of the invitation mechanism; and responsive to receiving the indication: generating a second tenant instance on the data exchange computing platform for the third party to facilitate the third party being the second tenant of the plurality of tenants; and providing access to the request via the second tenant instance so that the request is automatically available to the third party through the data exchange computing platform.

In some aspects, the operations further comprise: receiving, via an upload mechanism, the electronic artifact, wherein the upload mechanism is provided through the second tenant instance; and responsive to receiving the electronic artifact, providing access to the electronic artifact to the first party through the first tenant instance. In some aspects, the electronic artifact comprises an assessment to be completed by the third party and the operations further comprise: providing access to the assessment through the second tenant instance; providing an upload mechanism through the second tenant instance to facilitate uploading a completed version of the assessment into the data exchange computing platform; receiving, via the upload mechanism, the completed version of the assessment; and providing access to the completed version of the assessment through the first tenant instance. In some aspects, providing the upload mechanism through the second tenant instance comprises: providing access to autocompletion assessment software through the second tenant instance, wherein the assessment comprises a set of questions and the autocompletion assessment software is configured to automatically identify answers to the set of questions based on previous answers to previous questions provided in a previous assessment completed by the third party; and processing the assessment using the autocompletion assessment software to identify an answer to at least one question of the set of questions and to load the answer to the at least one question into the assessment as part of generating the completed version of the assessment.

In some aspects, generating the second tenant instance on the data exchange computing platform for the third party comprises: receiving a second indication of an activation of a conformation mechanism provided in a second electronic communication; and responsive to receiving the second indication, creating the second tenant instance on the data exchange computing platform. In some aspects, the operations further comprise: receiving, via the second tenant instance, a second request to claim a third party trust profile, wherein the third party trust profile is configured for allowing managing availability of the electronic artifacts through the data exchange computing platform to the plurality of tenants; responsive to receiving the second request, locking the third party trust profile so that the third party trust profile is unavailable to be claimed by another tenant of the plurality of tenants; submitting the second request to claim the third party trust profile to be validated; receiving a second indication that the second request to claim the third party trust profile has been validated; and responsive to receiving the second indication, linking the third party trust profile to the second tenant instance in the data exchange computing platform.

In some aspects, the operations further comprise: receiving a particular electronic artifact uploaded through the second tenant instance to post to the third party trust profile; and posting the particular electronic artifact to the third party trust profile so that the particular electronic artifact is publicly available to at least a subset of the plurality of tenants. In some aspects, the operations further comprise: receiving a particular electronic artifact uploaded through the second tenant instance to post to the third party trust profile; posting the particular electronic artifact to the third party trust profile; receiving, from a particular tenant of the plurality of tenants, a third request to access the particular electronic artifact; and responsive to receiving the third request: sending a second electronic communication, wherein the second electronic communication comprises the third request to access the particular electronic artifact; receiving a third indication to fulfill the third request; and responsive to receiving the third indication, providing access to the particular electronic artifact through a tenant instance associated with the particular tenant.

In accordance with various aspects, a non-transitory computer-readable medium is provided having computer-executable instructions that are stored thereon. The instructions that, when executed by computing hardware, configure the computing hardware to perform operations comprising: receiving a request on behalf of a first party to have a third party provide data, wherein: the request is submitted through a data exchange computing platform used in facilitating exchange of data between a plurality of tenants of the data exchange computing platform; and the first party is a first tenant of the plurality of tenants and has a first tenant instance on the data exchange computing platform; receiving an indication to generate a second tenant instance for the third party, wherein the indication is generated as a result of the third party being notified of the request; and responsive to receiving the indication: generating the second tenant instance on the data exchange computing platform for the third party to facilitate the third party being a second tenant of the plurality of tenants; and providing access to the request via the second tenant instance so that the request is available to the third party through the data exchange computing platform.

In some aspects, the operations further comprise: sending an electronic notification on behalf of the first party to the third party notifying the third party of the request for the data, wherein the electronic notification comprises an invitation mechanism and the indication is received as a result of an activation of the invitation mechanism. In some aspects, the operations further comprise: receiving the data via an upload mechanism provided through the second tenant instance; and responsive to receiving the data, providing access to the data to the first party through the first tenant instance. In some aspects, the operations further comprise: receiving, via the second tenant instance, a second request to claim a third party trust profile, wherein the third party trust profile is configured for allowing managing availability of data through the data exchange computing platform to the plurality of tenants; and responsive to receiving the second request, locking the third party trust profile so that the third party trust profile is unavailable to be claimed by another tenant of the plurality of tenants; submitting the second request to claim the third party trust profile to be validated; receiving a second indication that the second request to claim the third party trust profile has been validated; and responsive to receiving the second indication, linking the third party trust profile to the second tenant instance in the data exchange computing platform.

In accordance with various aspects, a method is provided that comprises: sending, by computing hardware, an electronic notification on behalf of a first party to a third party requesting completion of an electronic assessment, wherein: the electronic notification comprises an access mechanism for facilitating access to the electronic assessment and is sent via a data exchange computing platform, the data exchange computing platform provides a data exchange service that facilitates exchange of data between a plurality of tenants of the data exchange computing platform, and the first party is a first tenant of the plurality of tenants and has a first tenant instance on the data exchange computing platform; receiving, by the computing hardware, a first indication of an activation of the access mechanism; responsive to receiving the first indication, providing, by the computing hardware, a graphical user interface for display, wherein the graphical user interface comprises a control element configured for facilitating registration of the third party with the data exchange service; receiving, by the computing hardware, a second indication of an activation of the control element; and responsive to receiving the second indication: generating, by the computing hardware, a second tenant instance on the data exchange computing platform for the third party to facilitate the third party being a second tenant of the plurality of tenants; and providing, by the computing hardware, access to autocompletion assessment software through the data exchange service, wherein the autocompletion assessment software is configured for automatically completing the electronic assessment for the third party so that the electronic assessment can be submitted to the first party through the data exchange computing platform.

In some aspects, the electronic assessment comprises a set of questions and the autocompletion assessment software is configured for automatically completing the electronic assessment for the third party by: comparing each question of the set of questions to each previous question of a set of previous questions found in an answer library, wherein the answer library comprises a corresponding previous answer for each previous question of the set of previous questions provided by the third party for a previous electronic assessment completed by the third party; identifying, based on comparing each question of the set of questions to each previous question of the set of previous questions, an answer to at least one question of the set of questions, wherein the answer comprises the corresponding previous answer for a previous question of the set of previous questions; and populating the answer to the at least one question in the electronic assessment as part of generating a completed version of the electronic assessment.

In some aspects, the electronic notification identifies the autocompletion assessment software is available through the data exchange service. In some aspects, the method further comprises receiving, by the computing hardware via the data exchange computing platform, a request that involves requesting completion of the electronic assessment by the third party, wherein the request is submitted by the first party through the data exchange service and identifies the electronic assessment and the third party. In some aspects, the graphical user interface further comprises a validation control element and the method further comprises, prior to generating the second tenant instance on the data exchange computing platform: receiving, by the computing hardware via the validation control element, input; and validating, by the computing hardware and based on the input, that the activation of the access mechanism is associated with the third party.

In some aspects, the method of claim 1 further comprises: sending, by the computing hardware, a second electronic notification comprising a conformation mechanism for confirming creation of the second tenant instance for the third party; and receiving, by the computing hardware, a third indication of an activation of the conformation mechanism, wherein the second tenant instance is generated based on receiving the third indication. In some aspects, the method of claim 1 further comprises: receiving, by the computing hardware via the data exchange computing platform, a request from the first party for an artifact from the third party, wherein the request is submitted by the first party through the first tenant instance; responsive to receiving the request: sending, by the computing hardware, a second electronic notification to the third party, wherein the second electronic notification identifies the request; and providing, by the computing hardware, access to the request to the third party through the second tenant instance; receiving, by the computing hardware, the artifact uploaded into the data exchange computing platform by the third party through the second tenant instance; and responsive to receiving the artifact: sending, by the computing hardware, a third electronic notification to the first party, wherein the third electronic notification identifies the artifact is available through the data exchange service; and providing, by the computing hardware, access to the artifact to the first party through the first tenant instance.

In accordance with various aspects, a system is provided comprising a non-transitory computer-readable medium storing instructions and a processing device communicatively coupled to the non-transitory computer-readable medium. The processing device is configured to execute the instructions and thereby perform operations comprising: sending an electronic notification on behalf of a first party to a third party requesting completion of an electronic assessment, wherein: the electronic notification is sent through a data exchange computing platform, the data exchange computing platform facilitates exchange of data between a plurality of tenants of the data exchange computing platform, the first party is a first tenant of the plurality of tenants and has a first tenant instance on the data exchange computing platform, and the electronic notification comprises an invitation mechanism for facilitating registration of the third party with the data exchange computing platform and indicates autocompletion assessment software is available through the data exchange computing platform; receiving a first indication of an activation of the invitation mechanism; responsive to receiving the first indication, providing a graphical user interface for display, wherein the graphical user interface comprises a control element configured for facilitating registration of the third party with the data exchange computing platform; receiving a second indication of an activation of the control element; and responsive to receiving the second indication: generating a second tenant instance on the data exchange computing platform to facilitate the third party being a second tenant of the plurality of tenants; and providing the third party with access to the autocompletion assessment software through the second tenant instance, wherein the autocompletion assessment software is configured for automatically completing the electronic assessment for the third party so that the electronic assessment can be submitted to the first party through the data exchange computing platform.

In some aspects, the electronic assessment comprises a set of questions and the autocompletion assessment software is configured for automatically completing the electronic assessment for the third party by: comparing each question of the set of questions to each previous question found in a set of previous question/previous answer pairings, wherein each previous answer of the set of previous question/previous answer pairings was provided by the third party for a previous assessment completed by the third party; identifying, based on comparing each question of the set of questions to each previous question of the set of previous question/previous answer pairings, an answer to at least one question of the set of questions, wherein the answer comprises the previous answer for one previous question/previous answer pairing of the set of previous question/previous answer pairings; and populating the electronic assessment with the answer to the at least one question.

In some aspects, the operations further comprise receiving, via the data exchange computing platform, a request that involves requesting completion of the electronic assessment by the third party, wherein the request is submitted by the first party through the first tenant instance and identifies the electronic assessment and the third party. In some aspects, the graphical user interface further comprises a validation control element and the operations further comprise, prior to generating the second tenant instance on the data exchange computing platform: receiving, via the validation control element, input; and validating, based on the input, that the activation of the invitation mechanism is associated with the third party. In some aspects, the operations further comprise: sending a second electronic notification comprising a conformation mechanism for confirming creation of the second tenant instance for the third party; and receiving a third indication of an activation of the conformation mechanism, wherein the second tenant instance is generated based on receiving the third indication.

In some aspects, the operations further comprise: receiving a request from the first party for an artifact from the third party; responsive to receiving the request, sending a second electronic notification to the third party, wherein the second electronic notification identifies the request; receiving the artifact uploaded into the data exchange computing platform by the third party through the second tenant instance; and responsive to receiving the artifact: sending a third electronic notification to the first party, wherein the third electronic notification identifies the artifact is available; and providing access to the artifact to the first party through the first tenant instance. In some aspects, the operations further comprise linking a third party trust profile to the second tenant instance in the data exchange computing platform so that the third party trust profile is available to the third party through the second tenant instance, wherein the third party trust profile is configured for allowing the third party to manage availability of data through the data exchange computing platform to the plurality of tenants. In some aspects, the operations further comprise: receiving particular data uploaded through the second tenant instance by the third party; and posting the particular data to the third party trust profile so that the particular data is publicly available to the plurality of tenants.

In accordance with various aspects, a non-transitory computer-readable medium is provided having computer-executable instructions that are stored thereon. The instructions that, when executed by computing hardware, configure the computing hardware to perform operations comprising: sending an electronic notification on behalf of a first party to a third party requesting completion of an electronic assessment, wherein: the electronic notification is sent through a data exchange computing platform, the data exchange computing platform facilitates exchange of data between a plurality of tenants of the data exchange computing platform, the first party is a first tenant of the plurality of tenants and has a first tenant instance on the data exchange computing platform, and the electronic notification comprises an invitation mechanism for facilitating registration of the third party with the data exchange computing platform; receiving a first indication of an activation of the invitation mechanism; responsive to receiving the first indication, providing a graphical user interface for display, wherein the graphical user interface comprises a control element configured for facilitating registration of the third party with the data exchange computing platform; receiving a second indication of an activation of the control element; and responsive to receiving the second indication: generating a second tenant instance on the data exchange computing platform to facilitate the third party being a second tenant of the plurality of tenants; and providing the third party with access to autocompletion assessment software through the second tenant instance, wherein the autocompletion assessment software is configured for automatically completing the electronic assessment for the third party.

In some aspects, the electronic assessment comprises a set of questions and the autocompletion assessment software is configured for automatically completing the electronic assessment for the third party by: comparing each question of the set of questions to each previous question found in a set of previous question/previous answer pairings, wherein each previous answer of the set of previous question/previous answer pairings was provided by the third party for a previous assessment completed by the third party; identifying, based on comparing each question of the set of questions to each previous question of the set of previous question/previous answer pairings, an answer to at least one question of the set of questions, wherein the answer comprises the previous answer for one previous question/previous answer pairing of the set of previous question/previous answer pairings; and populating the electronic assessment with the answer to the at least one question.

In some aspects, the graphical user interface further comprises a validation control element and the operations further comprise, prior to generating the second tenant instance on the data exchange computing platform: receiving, via the validation control element, input; and validating, based on the input, that the activation of the invitation mechanism is associated with the third party. In some aspects, the operations further comprise: receiving a request from the first party for particular data from the third party; responsive to receiving the request, sending a second electronic notification to the third party, wherein the second electronic notification identifies the request; receiving the particular data uploaded into the data exchange computing platform by the third party through the second tenant instance; and responsive to receiving the particular data: sending a third electronic notification to the first party, wherein the third electronic notification identifies the particular data is available; and providing access to the particular data to the first party through the first tenant instance. In some aspects, the operations further comprise linking a third party trust profile to the second tenant instance in the data exchange computing platform so that the third party trust profile is available to the third party through the second tenant instance, wherein the third party trust profile is configured for allowing the third party to manage availability of data through the data exchange computing platform to the plurality of tenants.

In accordance with various aspects, a method is provided that comprises: receiving, by computing hardware, an electronic assessment to be completed by an entity, wherein the electronic assessment comprises a set of questions; performing, by the computing hardware, a tokenization technique on the set of questions to generate a first token representation of each question in the set of questions; identifying, by the computing hardware and based on an answer library generated for the entity, a first answer to a first question in the set of questions, wherein: the answer library comprises (i) a set of previous questions answered by the entity for at least one previous electronic assessment, (ii) a second token representation for each previous question in the set of previous questions, and (iii) a previous answer for each previous question in the set of previous questions, and the first answer comprises the corresponding previous answer for a first previous question in the set of previous questions based on a similarity between the corresponding second token representation for the first previous question and the corresponding first token representation for the first question; generating, by the computing hardware and based on a level of the similarity between the corresponding second token representation for the first previous question and the corresponding first token representation for the first question, a first confidence measure, wherein the first confidence measure identifies a confidence in the first answer being correct for the first question; providing, by the computing hardware, a graphical user interface for display, wherein the graphical user interface comprises the first answer to the first question and the first confidence measure; receiving, by the computing hardware and via the graphical user interface, an indication that the first answer is correct for the first question; and responsive to receiving the indication, populating, by the computing hardware, the electronic assessment with the first answer for the first question.

In some aspects, the method further comprises: receiving, by the computing hardware, a first input of a first location of the set of questions found in the electronic assessment; receiving, by the computing hardware, a second input of a second location of answers to provide for the set of questions in the electronic assessment; identifying, by the computing hardware and based on the first location and the second location, a position in the electronic assessment for providing each answer for each question in the set of questions; and generating, by the computing hardware, a mapping comprising the position in the electronic assessment for providing each answer for each question in the set of questions, wherein populating the electronic assessment with the first answer for the first question comprises referencing the mapping to identify the position in the electronic assessment for providing the first answer for the first question and populating the position with the first answer. In some aspects, the method further comprises: extracting, by the computing hardware and based on the first location and the second location, each question in the set of questions from the electronic assessment.

In some aspects, the method further comprises: receiving, by the computing hardware, a selection of the answer library from a set of answer libraries available for the entity. In some aspects, the method further comprises: receiving, by the computing hardware, the at least one previous electronic assessment; extracting, by the computing hardware, the set of previous questions and the previous answer for each previous question in the set of previous questions from the at least one previous electronic assessment; performing, by the computing hardware, the tokenization technique on the set of previous questions to generate the second token representation of each previous question in the set of previous questions; and generating, by the computing hardware, the answer library to include the set of previous questions, the second token representation for each previous question in the set of previous questions, and the previous answer for each previous question in the set of previous questions.

In some aspects, the method further comprises: identifying, by the computing hardware and based on the answer library, a second answer to a second question in the set of questions, wherein the second answer comprises a second corresponding previous answer for a second previous question in the set of previous questions based on a similarity between the corresponding second token representation for the second previous question and the corresponding first token representation for the second question; generating, by the computing hardware and based on a level of the similarity between the corresponding second token representation for the second previous question and the corresponding first token representation for the second question, a second confidence measure, wherein the second confidence measure identifies a second confidence in the second answer being correct for the second question; providing, by the computing hardware, the second answer to the second question and the second confidence measure for display on the graphical user interface; receiving, by the computing hardware and via the graphical user interface, a corrected answer to the second question, wherein the corrected answer is based on a correction made to the second answer to the second question; and responsive to receiving the corrected answer, populating, by the computing hardware, the electronic assessment with the corrected answer for the second question. In some aspects, the method further comprises updating, by the computing hardware, the answer library to include the corrected answer for the second previous question.

In some aspects, the method further comprises: identifying, by the computing hardware and based on the answer library generated for the entity, a second answer to a second question in the set of questions, wherein the second answer comprises a second corresponding previous answer for a second previous question in the set of previous questions based on a similarity between the corresponding second token representation for the second previous question and the corresponding first token representation for the second question; generating, by the computing hardware and based on a level of the similarity between the corresponding second token representation for the second previous question and the corresponding first token representation for the second question, a second confidence measure, wherein the second confidence measure identifies a second confidence in the second answer being correct for the second question; providing, by the computing hardware, the second answer to the second question and the second confidence measure for display on the graphical user interface; receiving, by the computing hardware and via the graphical user interface, a second indication that the second answer is incorrect for the second question; and responsive to receiving the second indication, updating, by the computing hardware, the answer library to include the second question.

In accordance with various aspects, a system is provided comprising a non-transitory computer-readable medium storing instructions and a processing device communicatively coupled to the non-transitory computer-readable medium. The processing device is configured to execute the instructions and thereby perform operations comprising: receiving an electronic assessment to be completed by an entity, wherein the electronic assessment comprises a set of questions; performing a tokenization technique on the set of questions to generate a first token representation of each question in the set of questions; identifying, based on an answer library generated for the entity, a first answer to a first question in the set of questions, wherein: the answer library comprises (i) a set of previous questions answered by the entity for at least one previous electronic assessment, (ii) a second token representation for each previous question in the set of previous questions, and (iii) a previous answer for each previous question in the set of previous questions, and the first answer comprises the corresponding previous answer for a first previous question in the set of previous questions based on a similarity between the corresponding second token representation for the first previous question and the corresponding first token representation for the first question; providing a graphical user interface for display, wherein the graphical user interface comprises the first answer to the first question; receiving, via the graphical user interface, an indication that the first answer is correct for the first question; and responsive to receiving the indication, populating the electronic assessment with the first answer for the first question.

In some aspects, the operations further comprise: receiving a first input of a first location of the set of questions found in the electronic assessment; receiving a second input of a second location of answers to provide for the set of questions in the electronic assessment; and generating a mapping comprising a position in the electronic assessment for providing each answer for each question in the set of questions, wherein: the position is based on the first location and the second location, and populating the electronic assessment with the first answer for the first question comprises referencing the mapping to identify the position in the electronic assessment for providing the first answer for the first question and populating the position with the first answer. In some aspects, the operations further comprise extracting each question in the set of questions from the electronic assessment based on the first location and the second location.

In some aspects, the operations further comprise: extracting the set of previous questions and the previous answer for each previous question in the set of previous questions from the at least one previous electronic assessment; performing the tokenization technique on the set of previous questions to generate the second token representation of each previous question in the set of previous questions; and generating the answer library to include the set of previous questions, the second token representation for each previous question in the set of previous questions, and the previous answer for each previous question in the set of previous questions. In some aspects, the operations further comprise: identifying, based on the answer library, a second answer to a second question in the set of questions, wherein the second answer comprises a second corresponding previous answer for a second previous question in the set of previous questions based on a similarity between the corresponding second token representation for the second previous question and the corresponding first token representation for the second question; providing the second answer to the second question for display on the graphical user interface; receiving, via the graphical user interface, a corrected answer to the second question, wherein the corrected answer is based on a correction made to the second answer to the second question; and responsive to receiving the corrected answer, populating the electronic assessment with the corrected answer for the second question. In some aspects, the operations further comprise updating the answer library to include the corrected answer for the second previous question.

In some aspects, the operations further comprise: identifying, based on the answer library generated for the entity, a second answer to a second question in the set of questions, wherein the second answer comprises a second corresponding previous answer for a second previous question in the set of previous questions based on a similarity between the corresponding second token representation for the second previous question and the corresponding first token representation for the second question; providing the second answer to the second question for display on the graphical user interface; receiving, via the graphical user interface, a second indication that the second answer is incorrect for the second question; and responsive to receiving the second indication, updating the answer library to include the second question.

In accordance with various aspects, a non-transitory computer-readable medium is provided having computer-executable instructions that are stored thereon. The instructions that, when executed by computing hardware, configure the computing hardware to perform operations comprising: receiving an electronic assessment to be completed by an entity, wherein the electronic assessment comprises a set of questions; generating a first token representation of each question in the set of questions; identifying, based on an answer library generated for the entity, a first answer to a first question in the set of questions, wherein: the answer library comprises (i) a set of previous questions answered by the entity for at least one previous electronic assessment, (ii) a second token representation for each previous question in the set of previous questions, and (iii) a previous answer for each previous question in the set of previous questions, and the first answer comprises the corresponding previous answer for a first previous question in the set of previous questions based on the corresponding second token representation for the first previous question and the corresponding first token representation for the first question; providing a graphical user interface for display, wherein the graphical user interface comprises the first answer to the first question; receiving, via the graphical user interface, an indication that the first answer is correct for the first question; and responsive to receiving the indication, populating the electronic assessment with the first answer for the first question.

In some aspects, the operations further comprise: receiving a first input of a first location of the set of questions found in the electronic assessment; receiving a second input of a second location of answers to provide for the set of questions in the electronic assessment; generating a mapping comprising a position in the electronic assessment for providing each answer for each question in the set of questions, wherein: the position is based on the first location and the second location, and populating the electronic assessment with the first answer for the first question comprises referencing the mapping to identify the position in the electronic assessment for providing the first answer for the first question and populating the position with the first answer. In some aspects, the operations further comprise: extracting the set of previous questions and the previous answer for each previous question in the set of previous questions from the at least one previous electronic assessment; generating the second token representation of each previous question in the set of previous questions; and generating the answer library to include the set of previous questions, the second token representation for each previous question in the set of previous questions, and the previous answer for each previous question in the set of previous questions.

In some aspects, the operations further comprise: identifying, based on the answer library, a second answer to a second question in the set of questions, wherein the second answer comprises a second corresponding previous answer for a second previous question in the set of previous questions based on the corresponding second token representation for the second previous question and the corresponding first token representation for the second question; providing the second answer to the second question for display on the graphical user interface; receiving, via the graphical user interface, a corrected answer to the second question, wherein the corrected answer is based on a correction made to the second answer to the second question; and responsive to receiving the corrected answer: populating the electronic assessment with the corrected answer for the second question; and updating the answer library to include the corrected answer for the second previous question. In some aspects, the operations further comprise: identifying, based on the answer library generated for the entity, a second answer to a second question in the set of questions, wherein the second answer comprises a second corresponding previous answer for a second previous question in the set of previous questions based on the corresponding second token representation for the second previous question and the corresponding first token representation for the second question; providing the second answer to the second question for display on the graphical user interface; receiving, via the graphical user interface, a second indication that the second answer is incorrect for the second question; and responsive to receiving the second indication, updating the answer library to include the second question.

BRIEF DESCRIPTION OF THE DRAWINGS

In the course of this description, reference will be made to the accompanying drawings, which are not necessarily drawn to scale, and wherein.

DETAILED DESCRIPTION

Overview

Figure 1:
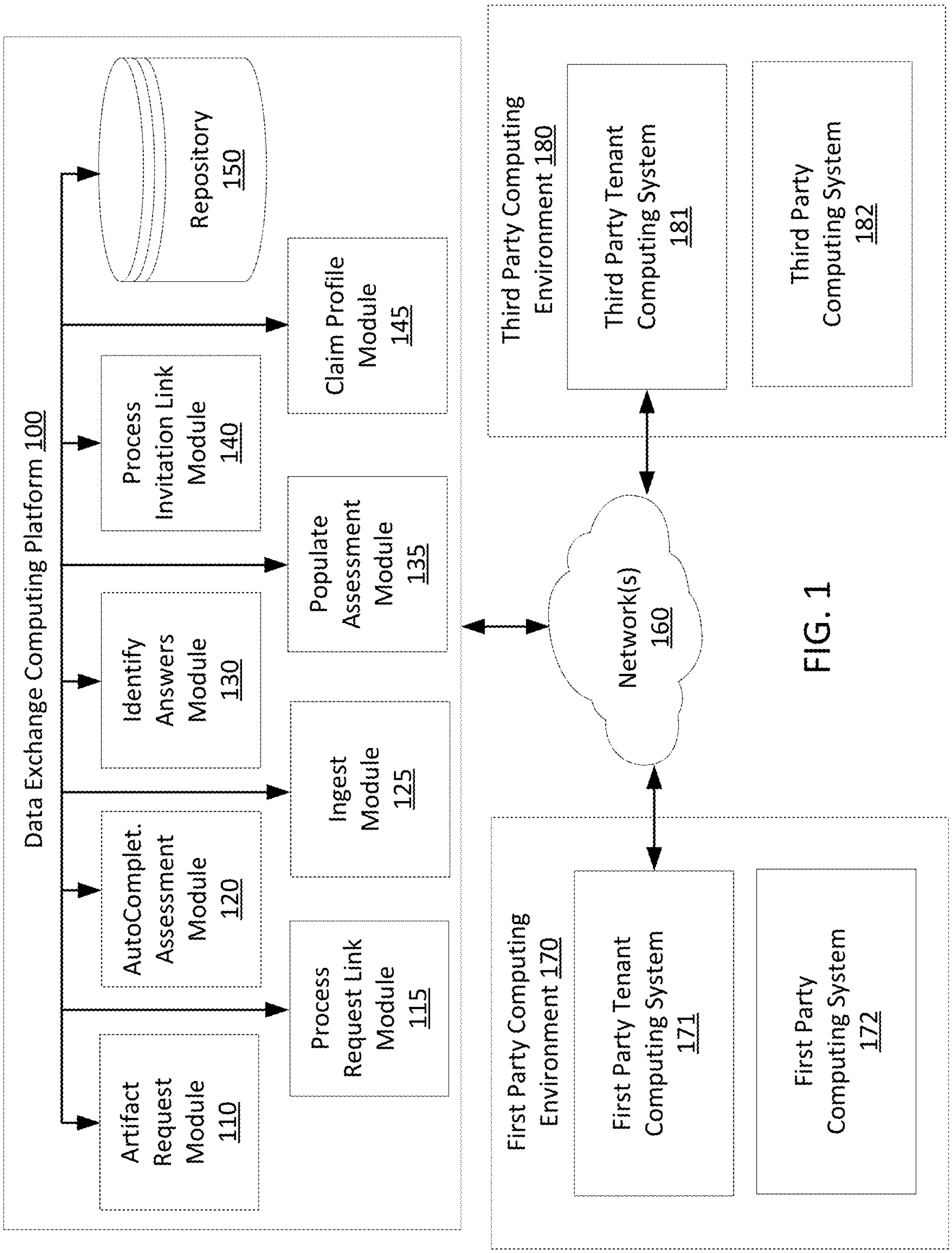
FIG. 1 depicts an example of a computational configuration that can be involved in facilitating data exchange among a diverse group of first and third party computing environments according to various aspects of the present disclosure.

As noted, a significant challenge encountered by many entities (e.g., first parties) such as organizations, corporations, companies, and/or the like is mitigating risks associated with integrating computer-related functionality provided by third party computing systems (e.g., computer-related services, software, storage, processing capacity, etc.). To combat this challenge, many first parties will vet the integration of computer-related functionality provided by third party computing systems into computing systems of the first parties (e.g., first party computing systems) to evaluate the risk associated with such integrations and to better understand what challenges may be involved in such integrations. Often, the vetting process involves gathering data (e.g., information) from third parties that are associated with these third party computing systems. For example, a first party may request a third party to complete an assessment to provide information on particular computer-related functionality provided through a third party computing system so that the first party can use such information in performing the vetting process. In another example, a first party may request a third party to provide supporting documentation with respect to some aspect of the computer-related functionality. Accordingly, the first party may request various types of data from the third party and a particular piece of data such as an assessment, document, certification, and/or the like requested by a first party may be referred to as an "artifact." In this respect, a third party may (continuously) receive multiple data requests from multiple first parties for multiple types of artifacts.

However, the data gathering process can present significant technical challenges to many first and/or third parties. For instance, technical challenges can arise from the fact that the different first parties and third parties that can be involved in the data gathering process may be quite diverse with respect to computing environments in which they operate and the different functionality, capabilities, interfaces, and/or the like among the computing environments. For example, a computing environment for a particular third party (e.g., a particular third party computing environment) may be required to interact with multiple first party computing environments to fulfill requests for various artifacts from the multiple first party computing environments. The multiple first party computing environments may use different hardware components and/or software components in providing communication channels to facilitate data exchange with external computing environments. Therefore, the particular third party computing environment may be required to have functionality and/or capabilities in place to interface, communicate, and/or the like with these different hardware components and/or software components.

Such technical challenges can arise even though some of first and/or third parties may be willing to use more standardized communication channels, such as email, to help facilitate exchange of artifacts. First, standardized communication channels used within many computing environments are typically accessible (available) to a large number of individuals (e.g., "users") of the environments. Therefore, the use of standardized communication channels can cause the data gathering process to become decentralized in nature because too many individuals can become easily involved in the data gathering process with artifacts being freely exchanged through the standardized communication channels between multiple individuals who are associated with various first and/or third parties.

This exchange can often occur without proper controls in place to ensure data requests are being timely fulfilled, and that the proper (correct) artifacts are being provided in the exchange. In addition, this exchange can often occur with the individuals who are involved in the exchange not knowing whether other individuals have already fulfilled the data requests and/or what artifacts have already been exchanged. Thus, the use of standardized communication channels within first and third party computing environments to facilitate exchange of artifacts during the data gathering process can result in inefficiencies in the use of various resources found in these environments due to the decentralized nature caused by the use of such channels.

Second, even though some first and/or third parties may be comfortable with using standardized communication channels, many other first and/or third parties are not. Often these first and/or third parties will require some other type of, more secure, communication channel be used in exchanging an artifact. For example, this may be because the artifact may be considered sensitive in nature. Or in the alternative, some of these first and/or third parties may be willing to use more standardized communication channels, but may require that such channels be used with additional security features and/or functionality such as encryption. Accordingly, many first and/or third parties may be required to implement hardware components and/or software components within their computing environments to facilitate these more secure communication channels required by several different first and/or third parties. This can prove to be technically challenging, as well create inefficiencies within their computing environments. Thus, the diversity found among the computing environments of various first and third parties can make exchanging data between the computing environments of these parties exceedingly difficult.

In addition, technical challenges can arise due to the number of third parties any one first party may need to gather data from, as well as the volume of data (e.g., number of artifacts) that may need to be gathered from these third parties. The same can be true for a third party with respect to the number of first parties any one third party may need to provide data to, as well as the volume of data (e.g., number of artifacts) that may need to be provided to these first parties.

More specifically, the data gathering process can prove to be quite taxiing on a first party's and/or third party's computing environment due to a large number of first and/or third party computing environments that needs to be interacted with and/or the amount of data that needs to be collected and/or provided. For example, a first party may be looking to implement certain computer-functionality into a computing system. Here, the first party may be vetting several different third parties in deciding which of the third parties' computer-related functionality to implement into the first party's computing system. In addition, the first party may require several different artifacts from each third party in performing the vetting process. Therefore, the first party's computing environment needs to interact with several different computing environments of the various third parties during the data gathering process to collect the different artifacts from each of the third parties.

The same can hold true for a third party who is required to fulfill data requests received from several different first parties. The third party's computing environment needs to interact with several different computing environments of the various first parties during the data gathering process to provide the different artifacts to each of the first parties. Not only can this prove technically challenging with respect to the first or third party's computing environment interacting with a diverse group of first and/or third party computing environments, but this can also prove technically challenging to the first or third party computing environment with respect to the resources required in facilitating the data gathering process involving the diverse group of first and/or third party computing environments.

Further, technical challenges can arise due to requirements imposed by first and/or third parties to allow exchange of certain types of data (e.g., exchange of certain artifacts). For example, a third party may require a particular artifact that is considered to be sensitive in nature to be handled with certain security and/or access controls in place. These security and/or access controls can prove to be quite challenging when they need to be implemented within a first party's computing environment so that the computing environment is sufficiently operated and can be used in the data gathering process. This can be especially true when the first party may be dealing with multiple third parties who impose different, conflicting requirements that need to be implemented within the first party's computing environment. Accordingly, the data gathering process can present significant technical challenges to many first and/or third parties.

Various aspects of the present disclosure overcome many of the technical challenges associated with facilitating data exchange among a diverse group of first and third party computing environments as discussed herein. Specifically, various aspects are directed to a data exchange computing platform that facilitates data exchange among a diverse group of first and third party computing environments. The data exchange computing platform provides a data exchange service available to various first and third parties who wish to exchange data. These various first and third parties register with the data exchange service to become tenants of the service and as a result, tenant instances are generated on the data exchange computing platform for the various first and third parties.

In various aspects, the data exchange computing platform provides a centralized, uniform, and secure environment in which the various first and third parties can exchange data (e.g., artifacts) among themselves through their computing environments. Therefore, the data exchange computing platform can address many of the technical challenges that result from different first and third parties being involved in the data gathering process who have diverse computing environments in which they operate and the different functionality, capabilities, interfaces, and/or the like among the diverse computing environments. Here, the data exchange computing platform can serve as a single, uniform, and secure point (e.g., interface) through which a computing environment for a particular first or third party can interact with to exchange data with multiple, diverse computing environments of other first and/or third parties, without the concerns of having to implement a diverse set of functionality, capabilities, interfaces, and/or the like in order to exchange the data with the multiple, diverse computing environments.

It is noted that any particular entity can be a first party or a third party, depending on the data exchange taking place. For example, a first particular entity may be interested in using a computer-implemented service provided by a second particular entity. Here, the first particular entity may require one or more artifacts from the second particular entity in evaluating whether or not to use the computer-implemented service, which may interface with a computing system of the first particular party. In this instance, the first particular entity is serving in a first party role of the data exchange, while the second particular entity is serving in a third party role of the data exchange.

However, the same first particular entity may also provide a computer-implemented service. A third particular entity may be interested in evaluating the computer-implemented service that is to interface with a computing system of the third particular entity and the third particular entity may request one or more artifacts from the first particular entity in conducting the evaluation of the computer-implemented service. In this instance, the first particular entity is serving in a third party role of the data exchange, while the third particular entity is serving in a first party role of the data exchange. Thus, the data exchange computing platform can address many of the technical challenges that result from the first particular entity serving in either a first party or third party role with the first particular entity's computing environment interacting with the diversity found in both second and third entities' computing environments.

In various aspects, each tenant instance on the data exchange computing platform provides the corresponding first or third party with a portal though which the first or third party can access the data exchange service to initiate and/or fulfill requests for data sent to and/or received from other first and/or third parties who are also tenants of the data exchange service. Accordingly, the data exchange computing platform can allow for a first party to send a request for data (e.g., a particular artifact) through the first party's tenant instance directly to a third party who is also a tenant of the data exchange service. In turn, the data exchange computing platform can allow for a third party to fulfill a request for data through the third party's tenant instance directly with a first party who is also a tenant of the data exchange service.

In some aspects, the data exchange computing platform can allow for a first party to send a request for data (e.g., a particular artifact) through the first party's tenant instance to a third party who is not currently a tenant of the data exchange service. For example, the data exchange computing platform can receive the request and determine that the third party is not a tenant of data exchange service. As a result, the data exchange computing platform can send an electronic notification, such as an email, on behalf of the first party to the third party (e.g., personnel thereof) requesting the data. Here, the electronic notification can include an invitation mechanism for facilitating registration of the third party with the data exchange service. For example, the invitation mechanism can be a hyperlink that when activated, opens a guest portal (e.g., graphical user interface) for the data exchange service in a browser application residing on a user device being used by the personnel. In some aspects, the guest portal may include a control element configured for facilitating registration of the third party with the data exchange service. Therefore, upon activation of the control element, the data exchange computing platform can generate a tenant instance on the data exchange computing platform for the third party to facilitate the third party becoming a tenant of the data exchange service.

In addition, the data exchange computing platform can provide access to the request received from the first party via the third party's tenant instance so that the request is automatically available to the third party through the data exchange service. Further, the data exchange computing platform can provide an upload mechanism through the third party's tenant instance to facilitate the third party uploading the requested data into the data exchange computing platform. Upon receiving the uploaded data, the data exchange computing platform can then provide access to the data to the first party through the first party's tenant instance. In addition, the data exchange computing platform can send an electronic notification to the first party indicating the data is available through the data exchange service.

Accordingly, the data exchange computing platform can facilitate the exchange of the data between the first and third parties without concern of the functionality, capabilities, interfaces, and/or the like of the first and third parties' computing environments. In other words, the data exchange computing platform can address the technical challenges that can result from a diverse group of computing environments that may be found among the different first and/or third parties in that the data exchange computing platform can provide a centralized, uniform, and secure environment in which the various first and third parties can exchange data.

In some instances, a first party may submit a request that involves an artifact such as an electronic assessment that the first party wishes to have the third party complete. For example, the electronic assessment may involve a set of questions that the first party may request the third party to answer, and the first party may provide the electronic assessment to complete. The data exchange computing platform can provide the third party with access to the electronic assessment through the third party's tenant instance. In addition, the data exchange computing platform can provide an upload mechanism through the third party's tenant instance to facilitate the third party uploading a completed version of the electronic assessment into the data exchange computing platform. Upon receiving the completed version of the electronic assessment, the data exchange computing platform can provide access to the completed version of the electronic assessment to the first party through the first party's tenant instance. In addition, the data exchange computing platform can send an electronic notification to the first party indicating the completed version of the electronic assessment is available through the data exchange service. Accordingly, the data exchange computing platform can facilitate the completion of an electronic assessment by the third party without concern of the functionality, capabilities, interfaces, and/or the like of the first and third parties' computing environments.

In various aspects, the data exchange computing platform provides autocompletion assessment software through the data exchange service to assist third parties with completing electronic assessments requested by first parties. The autocompletion assessment software is configured to automatically identify answers to the set of questions found in the electronic assessment based on previous answers to previous questions provided by the third party in one or more previous electronic assessments completed by the third party. The autocompletion assessment software can then load the answers into the electronic assessment as part of generating the completed version of the electronic assessment.

In some aspects, the autocompletion assessment software may use an answer library generated for the third party that includes a set of previous questions answered by the third party for at least one previous electronic assessment, a token representation for each previous question in the set of previous questions, and at least one previous answer for each previous question in the set of previous questions. Accordingly, the data exchange computing platform can execute the autocompletion assessment software to perform natural language processing on the set of questions found in the electronic assessment to generate a token representation of each question. The software can then identify, based on the answer library, at least one answer to any particular question in the set of questions. Here, the answer comprises the one or more corresponding previous answers for a previous question in the set of previous questions based on a similarity between the corresponding token representation for the previous question and the corresponding token representation for the particular question. In addition, the software can generate, based on a level of the similarity between the corresponding tokens, a confidence measure that identifies a confidence in the answer being correct for the corresponding question.

The data exchange computing platform can further execute the autocompletion assessment software to provide a graphical user interface that displays the answers identified for the questions and their confidence measures. The confidence measures can allow for personnel of the third party to more quickly review the answers for correctness by concentrating on those answers that have a lower confidence measure. The graphical user interface can allow for the personnel to correct/revise any answers and/or to identify those answers that may be wrong for the corresponding questions. The data exchange computing platform can then update the answer library accordingly. For example, the data exchange computing platform can update the answer library to reflect a corrected/revised answer for a particular question. In addition, the data exchange computing platform can revise the token representation in the answer library for any previous question in which the previous question was mistakenly identified by the autocompletion assessment software as corresponding to a question found in the electronic assessment.

The data exchange computing platform can further execute the autocompletion assessment software to populate the electronic assessment with the answers for questions found in the assessment that have been identified as correct by the personnel. In some aspects, the autocompletion assessment software is configured to generate a mapping of the set of questions found in the electronic assessment, and more specifically generate a mapping of the positions in the electronic assessment where the answers to the various questions are to be filled in for the electronic assessment. The autocompletion assessment software can then use this mapping in populating the answers in the electronic assessment to generate a completed version of the electronic assessment. Therefore, the autocompletion assessment software can assist third parties in completing electronic assessments more quickly, as well as assist the third parties in providing accurate and consistent answers to the set of questions provided in the electronic assessments. Such capabilities can be especially beneficial to third parties who may receive a significant number of electronic assessments from different first parties.

In various aspects, the data exchange computing platform also provides third party trust profiles to further assist third parties with providing first parties with access to data (e.g., various type of artifacts) of the third parties. A third party trust profile can serve as an electronic forum available through the data exchange service that is controlled by a particular (associated) third party with respect to making data available through the third party trust profile. For example, the third party trust profile can be used in publicly publishing data (e.g., artifacts) to make the data available to other tenants of the data exchange service. In addition, the third party trust profile can be used in privately publishing data (e.g., artifacts) to make the data available to a select group of tenants of the data exchange service. Further, the third party trust profile can be used in facilitating receipt of requests for data, as well as fulfilling requests for data. Furthermore, the third party trust profile can be used in providing other data on the third party such as information on various computer-related functionality (e.g., services and/or products) offered by the third party, certifications held by the third party, endorsements received by the third party, case studies conducted by the third party, and/or the like.

In various aspects, the data exchange computing platform facilitates a third party claiming a third party trust profile. Here, the data exchange computing platform can receive a request from a third party to claim a particular third party trust profile and in response, lock the third party trust profile so that the profile becomes unavailable to be claimed by another third party (e.g., another tenant of the data exchange service). The data exchange computing platform then submits the request to claim the particular third party trust profile to be validated.

In some aspects, the data exchange computing platform validates the request without human intervention, or with minimal human intervention. For example, the request may include data (information) on the third party and/or personnel (e.g., an individual) who is submitting the request that can then be used by the data exchange computing platform to validate the request for the third party trust profile. As a specific example, the data may include identification information on personnel (e.g., the individual) who submitted the request on behalf of the third party. Here, the data exchange computing platform may use the identification information to investigate publicly available information found through various data sources (e.g., information found on LinkedIn®) to determine that the request is legitimate and that the proper third party (and/or personnel thereof) is claiming the third party trust profile. In other aspects, the data exchange computing platform submits the request to validation personnel who then conducts a validation process to validate that the request is legitimate.

The data exchange computing platform can receive an indication that the request to claim the particular third party trust profile has been validated. In turn, the data exchange computing platform can link the third party trust profile to the third party's tenant instance in the data exchange computing platform so that the third party trust profile is available to the third party through the third party's tenant instance (e.g., portal thereof). At this point, the third party (e.g., personnel thereof) can access the third party trust profile and control the availability of data provided through the third party trust profile.

Accordingly, the third party trust profile can address many of the technical challenges the third party may encounter with respect to the diversity that can be experienced in fulfilling data requests with respect to first parties' computing environments in which they operate and the different functionality, capabilities, interfaces, and/or the like among the computing environments. In addition, the third party trust profile can address many of the technical challenges the third party may encounter that can arise due to the number of first parties the third party may need to provide data to, as well as the volume of data (e.g., number of artifacts) that may need to be provided to these first parties. The third party trust profile can facilitate the exchange of data with first parties without the third party's computing environment necessarily having to directly interact with the first parties' computing environment. In some instances, the third party trust profile can facilitate the exchange of data without the third party having to necessarily get involved at all in the request for the data. For example, the data involved in a request may be publicly available through the third party's trust profile. As a result, the third party trust profile can reduce the number of requests for data received from first parties that the third party may need to field. Accordingly, other technical contributions of various aspects of the disclosure will become apparent in further details of these various aspects provided herein.

Example Computational Configuration

FIG. 1 depicts an example of a computational configuration that can be involved in facilitating data exchange among a diverse group of first and third party computing environments 170, 180 according to various aspects. A data exchange computing platform 100 is provided that may contain the integration of one or more computing systems to facilitate the exchange of data between the first and third party computing environments 170, 180. Accordingly, a computing system of the data exchange computing platform 100 can include various software components and/or hardware components used in facilitating the exchange of data between the first and third party computing environments 170, 180.

For example, a first party may be looking to integrate computer-related functionality provided by a computing system 182 found within a third party's computing environment 180 into a computing system 172 found within the first party's computing environment 170. Here, the first party may be interested in vetting the integration of the computer-related functionality to evaluate the risk associated with the integration and to better understand what challenges may be involved in the integration. Therefore, the first party may require certain data (e.g., certain artifacts) from the third party to use in the vetting process.

Accordingly, the data exchange computing platform 100 in various aspects can facilitate exchange of the certain data between the first and third parties by providing a data exchange service that is accessible over one or more networks 160 (e.g., the Internet) by the first and third parties who are "tenants" of the data exchange service. The data exchange computing platform 100 can provide personnel of the first and third parties with portals that are accessible over the one or more networks 160 by a first party tenant computing system 171 for the first party and a third party tenant computing system 181 for the third party. For example, the portals can comprise one or more graphical user interfaces (e.g., one or more webpages) that are provided through the data exchange service and are used in accessing tenant instances found on the data exchange computing platform 100 for the first and third parties.

The tenant instances provide the first and third parties (e.g., personnel thereof) with various functionality that can be performed within the data exchange service to facilitate exchanging data between the first and third parties over the data exchange computing platform 100. For example, the first party's tenant instance can facilitate the first party's submission of a request for certain data from the third party. In turn, the third party's tenant instance can facilitate fulfilling the request and providing the first party with the certain data. In facilitating this exchange of data, the tenant instances for the first and third parties can allow for personnel of the third party to upload the certain data from the third party tenant computing system 181 into the data exchange computing platform 100. The tenant instances can then provide personnel of the first party with access to the certain data uploaded to the data exchange computing platform 100 from the first party tenant computing system 171. Accordingly, the data exchange computing platform 100 can facilitate this exchange of data without the first party's computing environment 170 having to directly interact with the third party's computing environment 180.

The data exchange computing platform 100 in various aspects includes a repository 150 that can be used for storing data (e.g., various artifacts) that has been uploaded by different third parties to make the data more readily available through the data exchange service. For example, the repository 150 can be used in storing data for a particular third party that can then be made available through the third party's trust profile. Therefore, the repository 150 can serve as a centralized, secure source of data for the third party that can then be used in fulfilling data requests, as well as making data publicly available through the third party's trust profile to other tenants of the data exchange service.

In some aspects, the data exchange computing platform 100 executes an artifact request module 110 that processes a request for particular data (e.g., a particular artifact) submitted by a first party to have fulfilled by a third party. The artifact request module 110 first identifies whether the third party being asked to fulfill the request is a current tenant of the data exchange service. If so, then the artifact request module 110 processes the request to make the request available through the third party's tenant instance. The data exchange computing platform 100 can then provide the third party with access to the request and allow the third party to fulfill the request through the third party's tenant instance. If the third party is not a current tenant of the data exchange service, then the artifact request module 110 can facilitate sending an invitation to the third party to register with the data exchange service and become a tenant of the service. Once registered, the data exchange computing platform 100 can provide the third party with access to the request and allow the third party to fulfill the request through the tenant instance generated on the data exchange computing platform 100 for the third party.

In additional or alternative aspects, the data exchange computing platform 100 executes a process request link module 115. The process request link module 115 processes a request for data that has been responded to by the third party. The data exchange computing platform 100 can send an electronic notification, such as an email, to the third party (e.g., personnel thereof) on behalf of a first party identifying a request for data has been made by the first party. The notification can include an access mechanism that the third party can activate to access the data exchange service and invoke the process request link module 115. In turn, the process request link module 115 directs the third party to the third party's portal that provides access to the third party's tenant instance. The process request link module 115 can then provide the third party with access to the request through the third party's tenant instance, as well as an upload mechanism to allow the third party to upload the requested data into the data exchange computing platform 100. In addition, in instances where the data involves an artifact such as an electronic assessment, the process request link module 115 can provide the third party with access to the assessment, itself, through the third party's tenant instance. Once the data is uploaded, the process request link module 115 can make the uploaded data available to the first party who requested the data through the first party's tenant instance. In addition, the process request link module 115 can save the uploaded data to the repository 150 for the third party.

In additional or alternative aspects, the data exchange computing platform 100 provides autocompletion assessment software within the data exchange service that can be used by a third party in completing an electronic assessment. Accordingly, the autocompletion assessment software can include an autocompletion assessment module 120, an ingest module 125, an identify answers module 130, and a populate assessment module 135. The data exchange computing platform 100 executes the autocompletion assessment module 120 to assist a third party in completing an electronic assessment that has been submitted by a first party for completion by the third party. The autocompletion assessment module 120 assists the third party by automatically identifying answers to the questions provided in electronic assessment and loading the identified answers into the assessment.

In assisting the third party, the autocompletion invokes the ingest module 125, the identify answers module 130, and populate assessment module 135. The data exchange computing platform 100 executes the ingest module 125 to extract the set of questions found in the electronic assessment and ingest them into the data exchange computing platform 100 so that each question in the set of questions can be processed for identifying one or more appropriate answers for the question.

The data exchange computing platform 100 executes the identify answers module 130 to identify appropriate answers for one or more questions found in the set of questions. Here, the identify answers module 130 identifies the answers by comparing the questions found in the set of questions to previous questions answered by the third party in one or more previous assessments completed by the third party. In some aspects, the data exchange computing platform 100 can generate one or more answer libraries for the third party that include previous questions and answers provided in the one or more previous assessments completed by the third party. The identify answers module 130 can then use these answer libraries in identifying appropriate answers to questions found in the electronic assessment.

The data exchange computing platform 100 executes the populate assessment module 135 to populate the electronic assessment with the identified answers for various questions found in the set of questions presented in the assessment. In various aspects, the populate assessment module 135 makes use of a mapping generated for the set of questions presented in the electronic assessment that identifies positions found in the assessment where the answers to the set of questions are to be provided. Accordingly, the populate assessment module 135 can use the mapping in automatically populating the electronic assessment with the identified answers to one or more of the set of questions to generate a completed version of the electronic assessment.

In additional or alternative aspects, when the data exchange computing platform 100 receives a request for data from a third party who is not currently a tenant of the data exchange service, the data exchange computing platform 100 executes a process invitation link module 140 to process an invitation sent to the third party to become a tenant of the data exchange service. The data exchange computing platform 100 can send an electronic notification, such as an email, to the third party (e.g., personnel thereof) on behalf of a first party notifying the third party that the first party is requesting data from the third party and inviting the third party to register with the data exchange service. The notification can include an invitation mechanism that the third party can activate to register with the data exchange service. In turn, the process invitation link module 140 directs the third party (e.g., personnel thereof) to a guest portal that facilitates the third party's registration with the data exchange service. For example, the guest portal can comprise one or more graphical user interfaces (e.g., one or more webpages) that facilitates the third party's registration with the data exchange service.

The process invitation link module 140 validates the registration for the third party and once validated, creates a tenant instance on the data exchange computing platform 100 for the third party. In addition, the process invitation link module 140 can confirm the registration of the third party. Once confirmed, the process invitation link module 140 can provide the third party with access to the request for data through the third party's tenant instance. In addition, if the request for data involves an artifact such as an electronic assessment, the process invitation link module 140 can provide the third party with access to the electronic assessment through the third party's tenant instance.

In additional or alternative aspects, when the data exchange computing platform 100 receives a request from the third party to claim a third party trust profile, the data exchange computing platform 100 executes a claim profile module 145 to process the request. The claim profile module 145 locks the third party trust profile so that the trust profile is unavailable for another third party to claim. The claim profile module 145 receives an indication as to whether the request is valid. If the request is valid, then the claim profile module 145 links the third party trust profile to the third party's tenant instance. As a result, the data exchange computing platform 100 provides the third party with access to the third party trust profile through the third party's tenant instance and allows the third party to control the data (e.g., artifacts) that is made available to other tenants of the data exchange service through the third party trust profile. Further details on the different modules is provided.

Artifact Request Module

Figure 2:
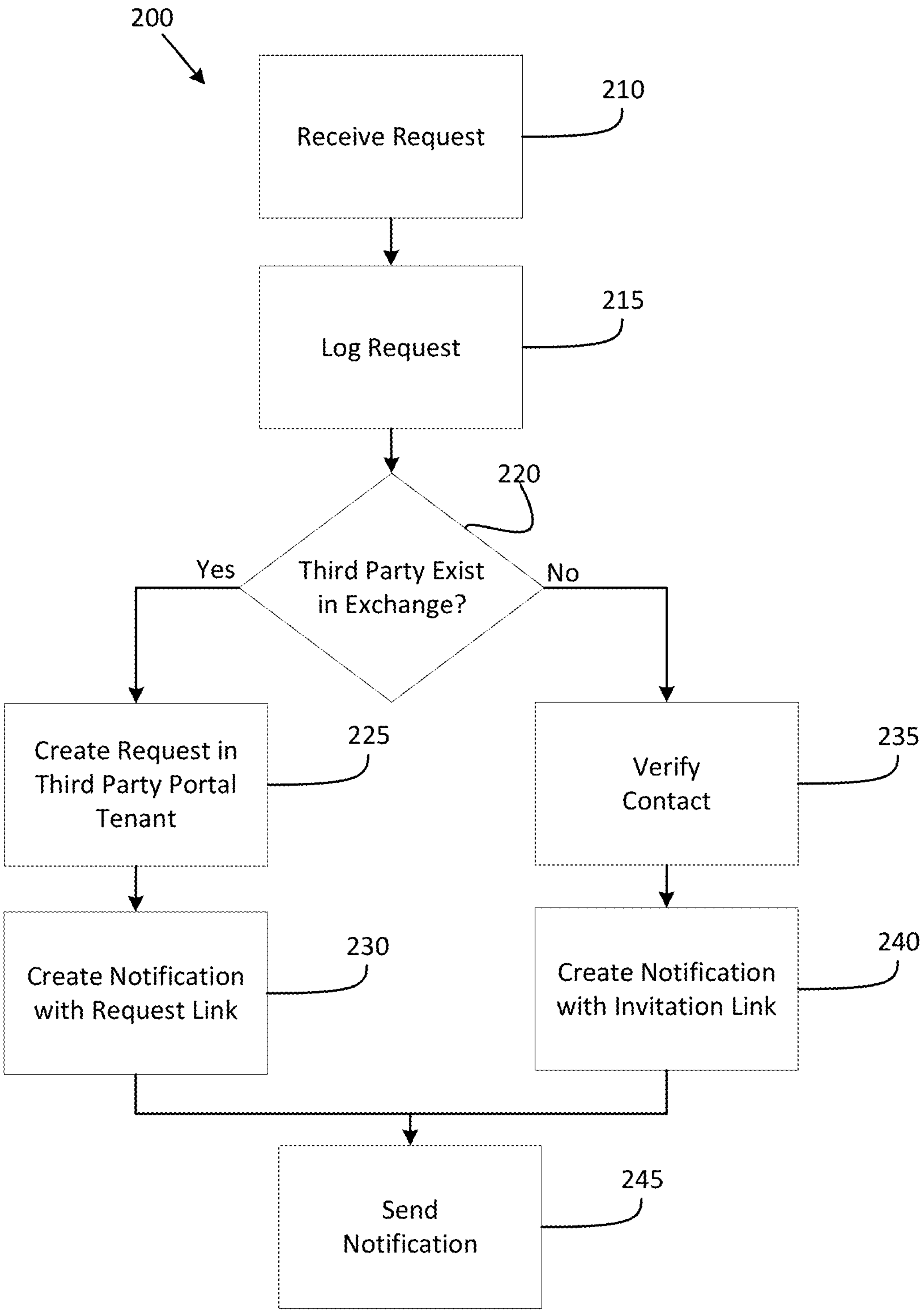
FIG. 2 depicts an example of a process for processing an artifact request in accordance with various aspects of the present disclosure.

Turning now to FIG. 2, additional details are provided regarding an artifact request module 110 used for processing a request submitted by a first party for data from a third party in accordance with various aspects. Accordingly, the flow diagram shown in FIG. 2 may correspond to operations executed, for example, by computing hardware found in the data exchange computing platform 100 as described herein, as the computing hardware executes the artifact request module 110.

The data exchange computing platform 100 can allow a first party (e.g., personnel thereof) to log into the data exchange service and upon logging in, provided the first party with a portal (e.g., one or more graphical user interfaces) that allows the first party to perform functionality through the party's tenant instance. One such functionality is submitting a request for a third party to provide data such as an artifact. The artifact can be, for example, a particular piece of data such as an assessment, document, certification, and/or the like. Accordingly, the data exchange computing platform 100 can invoke the artifact request module 110 to process the request.

The process 200 involves the artifact request module 110 receiving the request in Operation 210. The request may include information needed to process the request such as, for example, the name of the artifact, the type of artifact being requested, instructions for the request, an identifier (e.g., name) of the first party, an identifier (e.g., name) of the third party, a contact (e.g., email address) for the third party, and/or the like. In some aspects, the first party (personnel thereof) provides some or all of the information when submitting the request. In additional or alternative aspects, the data exchange computing platform 100 may retrieve some or all of the information from the repository 150. For example, the data exchange computing platform 100 may have sent the third party another request in the past and in doing so, store information on the third party in the repository 150, or the third party may currently be a tenant of the data exchange service and therefore, information on the third party may be stored in the repository 150 accordingly.

The artifact request module 110 logs the request in Operation 215. In some aspects, the artifact request module 110 logs the request by recording the request in the repository 150. In addition, the artifact request module 110 may record an initial status of the request as "open."

In Operation 220, the artifact request module 110 determines whether the third party is currently a tenant of the data exchange service. In some aspects, the information provided along with the request may indicate that the third party is or is not a current tenant of the data exchange service. In alternative aspects, the artifact request module 110 may query the data exchange computing platform 100 (e.g., the repository 150) to determine whether a tenant instance currently exists on the data exchange computing platform 100 for the third party.

In various aspects, the data exchange computing platform 100 allows for first parties to identify (e.g., "link" with) those third parties who are also tenants of the data exchange service that the first parties would like to exchange data with through the data exchange service. Here, the data exchange computing platform 100 may provide a first party (e.g., personnel thereof) with functionality through the first party's tenant instance (e.g., via the first party's portal) to allow personnel for the first party to identify those third parties that the first party would like to exchange data with through the data exchange service. For example, the data exchange computing platform 100 can provide the personnel with one or more graphical user interfaces that lists the third parties who are current tenants of the data exchange service. Therefore, the personnel can select which third parties that the first party would like to exchange data with through the data exchange service.

In some aspects, the data exchange computing platform 100 may first solicit approval from the third party before linking the third party with the first party. For example, the data exchange computing platform 100 may send a notification to the third party requesting the third party approve the first party's request to be linked with the third party so that the two parties can exchange data through the data exchange service. Once approved, the data exchange computing platform 100 can then link the first party and third party in the data exchange service (e.g., link the first party's tenant instance with the third party's tenant instance on the data exchange computing platform 100). Therefore, in these instances, the artifact request module 110 can determine whether to treat the third party as a current tenant of the data exchange service, with respect to the first party, by determining whether the third party is linked with the first party in the data exchange service.

If the third party is currently a tenant of the data exchange service, then the artifact request module 110 creates the request in the third party's tenant instance in Operation 225. As a result, the request becomes available to access through the third party's tenant instance. In some aspects, the data exchange computing platform 100 may provide an upload mechanism in the third party's tenant instance to allow the third party to upload the artifact being requested. For example, the artifact request module 110 may provide a control such as a button that allows the third party (personnel thereof) to navigate and choose an electronic document (e.g., file) from a third party tenant computing system 181 to upload into the data exchange computing platform 100. In this regard, the data exchange computing platform 100 provides the third party (the third party's computing environment 180) with a single, secure interface through which the third party can provide artifacts to a variety of first parties (first parties' computing environments 170).

In addition to providing access to the request, the artifact request module 110 creates an electronic notification to send to the third party in Operation 230. For example, depending on the contact available for the third party, the electronic notification can be in the form of an electronic communication such as an email, text message, platform message (e.g., LinkedIn®), and/or the like. In some aspects, the artifact request module 110 creates the electronic notification to include an access mechanism that the third party (e.g., personnel thereof) can use to access the request. For example, the access mechanism may comprise a request link such as a hyperlink that the personnel can select to access the third party's tenant instance.

The artifact request module 110 sends the electronic notification on behalf of the first party to notify the third party of the request made by the first party in Operation 245. Upon activating the link, the data exchange computing platform 100 may facilitate the third party (e.g., personnel thereof) logging into the data exchange service and provide the personnel with a tenant portal to access the third party's tenant instance. For example, the tenant portal may comprise one or more graphical user interfaces such as one or more webpages that are displayed through a browser application residing on a computing device of a third party tenant computing system 181.

If the third party is not currently a tenant of the data exchange service, then the artifact request module 110 verifies the contact provided along with the request in Operation 235. In various aspects, the artifact request module 110 performs this particular operation by verifying the personnel (e.g., individual) who is associated with the contact is also associated with the third party. In some aspects, the artifact request module 110 verifies the contact through soliciting (e.g., query) one or more publicly available data sources. For example, the artifact request module 110 may verify the individual is associated (e.g., employed) with the third party through soliciting a professional networking platform such as LinkedIn®, Xing, MeetUp®, Bark, and/or the like.

In additional or alternative aspects, the artifact request module 110 assigns a respondent to the request to verify the contact. A respondent may be personnel who is responsible for ensuring the contact is associated with the third party. For example, the respondent may verify that the contact is associated with the third party by searching one or more publicly available data sources, directly contacting the contact, contacting the third party, and/or the like. Once verified, the artifact request module 110 may receive an indication that the contact has been verified for the request.

In some aspects, the artifact request module 110 creates an electronic notification to send to the third party in Operation 240. Again, depending on the contact available for the third party, the electronic notification can be in the form of an electronic communication such as an email, text message, platform message (e.g., LinkedIn®), and/or the like. Here, the artifact request module 110 can create the electronic notification to include an invitation mechanism that the third party (e.g., personnel thereof) can use to register with the data exchange service, and subsequently access the request. For example, similar to the access mechanism, the invitation mechanism may comprise an invitation link such as a hyperlink that the personnel can select to access a guest portal for the data exchange service that can be used to register the third party with the data exchange service.

Therefore, in Operation 245, the artifact request module 110 sends the electronic notification on behalf of the first party to notify the third party of the request made by the first party and to invite the third party to register with the data exchange service. Upon activating the link, the data exchange computing platform 100 may provide personnel for the third party with a guest portal that can be used in registering with the data exchange service. For example, the guest portal may comprise one or more graphical user interfaces such as one or more webpages that are displayed through a browser application residing on a computing device of a third party tenant computing system 181.

It is noted that in some aspects, depending on the circumstances and/or responsibilities of the respondent, the artifact request module 110 may or may not send the electronic notification with the invitation link to the third party, or may not send the electronic notification upon receiving the request. Instead, the respondent, independent of the artifact request module 110, may verify the contact for the third party and then send the electronic notification to the third party accordingly.

Process Request Link Module

Figure 3:
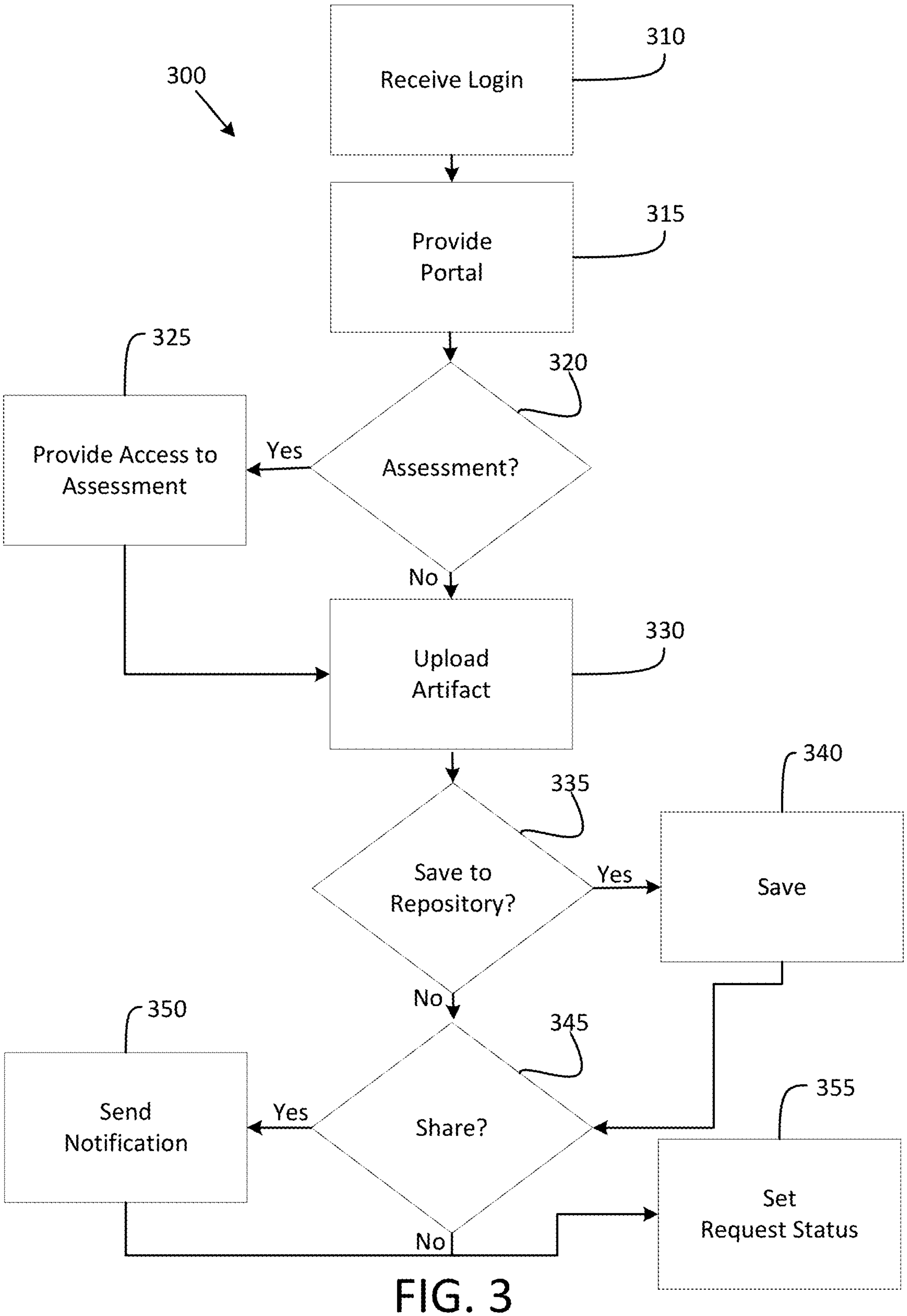
FIG. 3 depicts an example of a process for fulfilling an artifact request in accordance with various aspects of the present disclosure.

Turning now to FIG. 3, additional details are provided regarding a process request link module 115 used for fulfilling an artifact request in accordance with various aspects. Accordingly, the flow diagram shown in FIG. 3 may correspond to operations executed, for example, by computing hardware found in the data exchange computing platform 100 as described herein, as the computing hardware executes the process request link module 115.

The data exchange computing platform 100 may receive a request for an artifact to be sent to a third party submitted by a first party through the data exchange service. In turn, the data exchange computing platform 100 (e.g., the artifact request module 110) may generate and send an electronic notification on behalf of the first party that includes an access mechanism that personnel for the third party may activate to gain access to the request. Upon activation, the data exchange computing platform 100 may provide the personnel with a login portal to facilitate the personnel logging into the data exchange service. For example, the login portal may comprise one or more graphical user interfaces such as one or more webpages that are displayed through a browser application residing on a computing device of a third party tenant computing system 181.

Upon successful login, the data exchange computing platform 100 activates the process request link module 115 and provides the module 115 with the login (e.g., information on the third party who has successfully logged into the data exchange service). Therefore, the process 300 involves the process request link module 115 receiving the login at Operation 310. In turn, the process request link module 115 provides the personnel for the third party with a tenant portal in Operation 315. Again, the tenant portal may comprise one or more graphical user interfaces such as one or more webpages that are displayed through the browser application.

In general, the tenant portal provides the personnel with access to the third party's tenant instance. In doing so, the tenant portal may provide the personnel with access to certain functionality that can be performed through the data exchange service. For example, the tenant portal may provide the personnel with access to functionality that allows the personnel to view a request for an artifact that has been submitted by a first party for the third party. In addition, the tenant portal may provide the personnel with access to functionality that allows the personnel to upload an artifact into the data exchange computing platform 100 so that the artifact can be made available to one or more first parties. Further, the tenant portal may provide the personnel with access to functionality that allows the personal to download and/or access an electronic assessment that has been requested to be completed by a first party. Furthermore, the tenant portal may provide the personnel with access to functionality that assists the personnel in completing an electronic assessment that has been requested to be completed by a first party.

Therefore, in Operation 320, the process request link module 115 determines whether the current request being made of the third party involves the third party completing an electronic assessment for the first party. If so, then the process request link module 115 provides access to the electronic assessment through the third party's tenant instance in Operation 325. Accordingly, the electronic assessment (e.g., assessment file) may be provided in various formats such as, for example, an Excel® spreadsheet, a Word® document, a fillable portable document format (PDF) file, and/or the like. Thus, the process request link module 115 can provide access to the electronic assessment that enables the personnel to the download the assessment from the data exchange computing platform 100 to a third party tenant computing system 181 if desired.

Per the personnel's request, the process request link module 115 may upload an artifact into the data exchange computing platform 100 in Operation 330. For example, per the personnel's request, the process request link module 115 may upload an artifact (e.g., a completed version of an assessment) into the data exchange computing platform 100 to fulfill the request for the artifact submitted by the first party. Here, the data exchange computing platform 100 can provide the personnel with an upload mechanism available through the tenant portal to facilitate uploading the artifact into the data exchange computing platform 100. For example, the tenant portal may provide a control such as a button that allows the third party personnel to navigate and choose the artifact (e.g., an electronic file) from a third party tenant computing system 181 to upload into the data exchange computing platform 100.

Once uploaded, the process request link module 115 may determine whether to save the uploaded artifact in Operation 335. For example, the process request link module 115 may cause the tenant portal to inquire as to whether the third party would like to have the uploaded artifact saved on the data exchange computing platform 100 so that the artifact may be used for fulfilling future requests made by first parties. If the process request link module 115 receives a positive response from the personnel, then the process request link module 115 saves the artifact in the repository 150 of the data exchange computing platform 100 in Operation 340. In various aspects, the data exchange computing platform 100 may then make the artifact available to the third party through the third party's tenant instance. As a result, the data exchange computing platform 100, upon request, can then provide the artifact to other first parties who are tenants through the data exchange service without having to upload the artifact again into the data exchange computing platform 100.

In Operation 345, the process request link module 115 determines whether to share the uploaded artifact with the first party who submitted the request for the artifact. Again, the process request link module 115 may cause the tenant portal to inquire as to whether the third party would like to share the uploaded artifact with the first party who submitted the request for the artifact. If the process request link module 115 receives a positive response from the personnel, then the process request link module 115 sends an electronic notification to the first party indicating the artifact is now available through the data exchange service in Operation 350. In addition, the process request link module 115 sets the request status to "completed" in Operation 355.

Accordingly, the process request link module 115 may provide the first party with access to the artifact through the first party's tenant instance on the data exchange computing platform 100. In doing so, the data exchange computing platform 100 can facilitate exchange of the artifact between the first and third parties without the first party's computing environment 170 and the third party's computing environment 180 having to directly interact to exchange the artifact. As a result, the data exchange computing platform 100 can address any technical challenges that may be encountered due to different functionality, capabilities, interfaces, and/or the like between the first party and third party computing environments 170, 180.

Autocompletion Assessment Module

Figure 4:
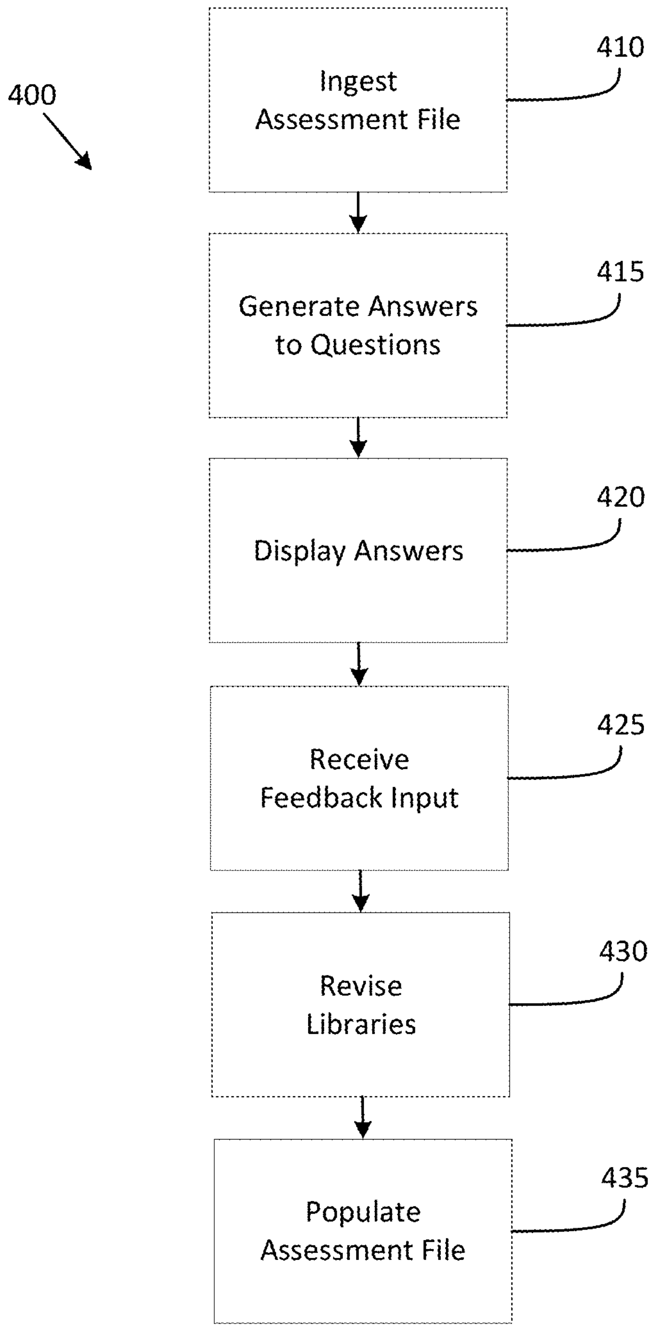
FIG. 4 depicts an example of a process for autocompleting an electronic assessment in accordance with various aspects of the present disclosure.

Turning now to FIG. 4, additional details are provided regarding an autocompletion assessment module 120 used for autocompleting an electronic assessment in accordance with various aspects. Accordingly, the flow diagram shown in FIG. 4 may correspond to operations executed, for example, by computing hardware found in the data exchange computing platform 100 as described herein, as the computing hardware executes the autocompletion assessment module 120.

In various aspects, the data exchange computing platform 100 provides functionality through the data exchange service that can assist a third party (e.g., personnel thereof) in completing an electronic assessment. The electronic assessment can involve a set of questions that a first party has asked the third party to provide answers to in the assessment. In various aspects, the functionality provided through the data exchange computing platform 100 can automatically identify answers to one or more questions in the set of questions. The data exchange computing platform 100 can make such functionality available to third parties through the third parties' tenant instances. Therefore, upon receiving an indication that a third party has access the functionality through the third party's tenant instance, the data exchange computing platform 100 can invoke the autocompletion assessment module 120.

The process 400 involves the autocompletion assessment module 120 ingesting the electronic assessment (assessment file) in Operation 410. This operation may involve extracting the set of questions from the assessment file. For example, the assessment file may be in various formats such as an Excel® spreadsheet, a Word® document, a fillable portable document format (PDF) file, and/or the like. In various aspects, the autocompletion assessment module 120 performs this particular operation by invoking an ingest module 125. In turn, the ingest module 125 extracts the set of questions from the assessment file. In addition to extracting the set of questions, the ingest module 125 can generate a mapping of the set of questions and/or one or more positions for each question in the set of questions where one or more answers to the question are to be provided in the assessment file.

In Operation 415, the autocompletion assessment module 120 generates answers for one or more questions in the set of questions found in the assessment file. In various aspects, the autocompletion assessment module 120 performs this particular operation by invoking an identify answers module 130. The identify answers module 130 generates the answers for one or more questions in the set of questions by identifying previous answers provided by the third party to previous questions found in one or more previous assessments completed by the third party that are similar to the questions found in the set of questions. Here, the data exchange computing platform 100 may generate and store one or more answer libraries for the third party that include the previous questions and answers that can be used by the identify answers module 130 in generating the answers for the one or more questions in the set of questions found in the assessment file.

In Operation 420, the autocompletion assessment module 120 displays the generated answers for the one or more questions in the set of questions to the personnel for the third party. Here, the autocompletion assessment module 120 may provide one or more graphical user interfaces for display through the third party's tenant portal. The graphical user interface(s) may display the answers generated for the one or questions so that the personnel for the third party can review the accuracy of the answers. In some aspects, the graphical user interface(s) also display a confidence measure (e.g., score) for the one or more answers identified for each question that indicates a level of confidence that the correct answers has been generated for the corresponding question. The confidence measure can allow for the personnel to quickly identify those answers that may need to be reviewed more closely to ensure that the answers are correct for the corresponding questions. The graphical user interface(s) may allow for the personnel to filter the answers based on the confidence measures to further assist the personnel in identify those answers that may need to be reviewed more closely.

In addition, the one or more graphical user interfaces may provide the personnel with the capability to edit and revise the answers, as well as identify those answers that are incorrect for their corresponding questions. As a result, the autocompletion assessment module 120 can receive feedback input in Operation 425. The autocompletion assessment module 120 can then revise the answer libraries based on the feedback input in Operation 430.

In some aspects, the autocompletion assessment module 120 can perform this operation by updating the one or more corresponding previous answers for a particular previous question found in an answer library to reflect the one or more answers that were revised by the personnel. In additional or alternative aspects, the autocompletion assessment module 120 can perform this operation by revising an answer library to include a question, and one or more corresponding answers, in which an incorrect answer was identified for the question. In this way, the autocompletion assessment module 120 can update the answer library to include the question as an additional previous question, along with the one or more corresponding answers as previous answer(s), so that the autocompletion assessment module 120 can then identify the correct answer(s) for the question in the future. In addition, the autocompletion assessment module 120 can generating a token representation of the question to also include in the answer library.

In Operation 435, the autocompletion assessment module 120 populates the assessment file with the identifies answers to generate a completed version of the electronic assessment. Here, the autocompletion assessment module 120 can perform this operation by using the mapping of the set of questions and/or positions for each question in the set of questions to populate the answers in the assessment file.

Once populated, the autocompletion assessment module 120 makes the assessment file available to the third party through the third party's tenant instance.

Ingest Module

Figure 5:
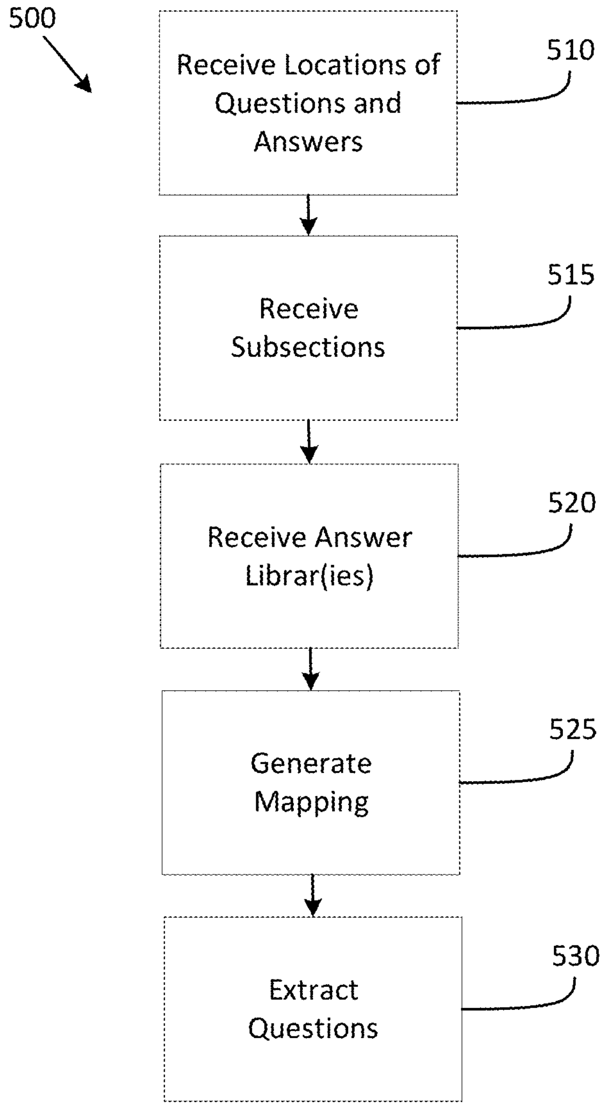
FIG. 5 depicts an example of a process for ingesting an electronic assessment in accordance with various aspects of the present disclosure.

Turning now to FIG. 5, additional details are provided regarding an ingest module 125 used for ingesting an electronic assessment into the data exchange computing platform 100 in accordance with various aspects. Accordingly, the flow diagram shown in FIG. 5 may correspond to operations executed, for example, by computing hardware found in the data exchange computing platform 100 as described herein, as the computing hardware executes the ingest module 125.

The process 500 involves the ingest module 125 receiving locations of where the questions can be found and the answers are to be provided in the electronic assessment (e.g., the assessment file) in Operation 510. In various aspects, the ingest module (or some other module such as the autocompletion assessment module 120) can provide personnel of the third party with one or more graphical user interfaces through the third party's tenant portal that allow the personnel to enter locations of where the set of questions can be found in the assessment file, as well as where the corresponding answers are to be provided in the assessment file.

For example, the assessment file may be provided in a spreadsheet format such as an Excel® spreadsheet. Here, the ingest module 125 can receive a first input provided through the one or more graphical user interfaces of a first location where the set of questions is found in the assessment file such as, for example, a first column of the spreadsheet in which the set of questions are listed. In addition, the ingest module 125 can receive a second input through the one or more graphical user interfaces of a second location of where answers are to be provided for the set of questions such as, for example, a second column of the spreadsheet in which the answers to the set of questions are to be provided.

In some aspects, the ingest module 125 may receive additional information on the sets of questions and corresponding answers in addition to the first and second locations. For example, the ingest module 125 may receive a third input provided through the one or more graphical user interfaces of where question numbers for the set of questions can be found such as, for example, a third column of the spreadsheet in which the question numbers (e.g., 1, 2, 3, 4, etc.) are listed. In addition, the ingest module 125 may receive a fourth input through the one or more graphical user interfaces of a fourth location of where supporting answers are to be provided for the set of questions such as, for example, a fourth column of the spreadsheet in which the supporting answers to the set of questions are to be provided. For example, the spreadsheet may be designed to provide a yes/no response for each question in the set of questions in the second column of the spreadsheet and a more detailed response in support of the yes/no response for each question in the set of questions in the fourth column.

In Operation 515, the ingest module 125 can also receive subsections of the set of questions through the one or more graphical user interfaces. For example, the set of questions provided in the assessment file may be divided into subsections based on the type of question being asked. For example, a first subset of the set of questions may be directed to access controls that have been put into place by the third party with respect to a computer-implemented service being offered by the third party. As a specific example, the first subset of questions may include a first question as to whether the third party has implemented two-factor authentication for the service, a second question as to whether the third party has implemented physical access restrictions on the area in which a repository used to support the service is located, and so forth. A second subset of the set of questions may be directed to encryption controls that have been put into place by the third party with respect to data stored in the repository for the service. As a specific example, the second subset of questions may include a first question as to whether the third party encrypts the data before storing the data in the repository, a second question as to whether the third party makes any transfers of the data within its computing environment 180 without first encrypting the data, and so forth.

The ingest module 125 can receive input through the one or more graphical user interfaces that identifies these two subsections that contain the first subset of questions and the second subset of questions. In addition, the ingest module 125 can receive input through the one or more graphical user interfaces that provides a label for each subsection. Accordingly, the data exchange computing platform 100 may provide functionality via one or more graphical user interfaces to allow personnel to filter out each of the subset of questions found in each of the subsections for reviewing purposes.

For example, particular personnel of the third party may be responsible for ensuring the correct information is provided for the first subset of questions involving the access controls that have been put into place for the service. Therefore, the data exchange computing platform 100 (e.g., the autocompletion assessment module 120) can filter out the first subset of questions from the set of questions provided in the assessment file using the identified subsections to display to the particular personnel so that the personnel can more quickly and efficiently review the answers that have been identified for the first subset of questions.

In Operation 520, the ingest module 125 receives input of the one or more answer libraries that are applicable to the set of questions through the one or more graphical user interfaces. As previously noted, the data exchange computing platform 100 can generate and store one or more answer libraries for the third party. Therefore, the ingest module 125 can receive input on which of the one or more answer libraries stored on the data exchange computing platform 100 are applicable to the set of questions found in the assessment file.

In Operation 525, the ingest module 125 generates a mapping of the set of questions and corresponding answers found in the assessment file. In various aspects, the ingest module 125 performs this particular operation by identifying one or more positions in the assessment file for providing each answer (or answers) for each question in the set of questions based on the first location and the second location. In addition, the ingest module 125 may use other information such as the third location in which the question numbers are provided and/or a fourth location in which the supporting answers are provided in identifying the one or more positions in the assessment file for providing each answer (or answers) for each question in the set of questions.

For example, the ingest module 125 can identify, based on the first, second, third, and fourth locations, a first position as a first particular cell in the assessment file that is in the format of an Excel® spreadsheet to provide the yes/no answer for a first question found in the set of questions and a second position as a second particular cell in the assessment file to provide the supporting answer for the first question In addition, the ingest module 125 can identify a third position as a third particular cell in the assessment file to provide the yes/no answer for a second question found in the set of questions and a fourth position as a fourth particular cell in the assessment file to provide the supporting answer for the second question, and so forth. The ingest module 125 can then generate the mapping for the set of questions and corresponding answers based on the identified cells for each of the questions found in the set of questions.

In Operation 530, the ingest module 125 extracts the set of questions (e.g., text thereof) from the assessment file. The ingest module 125 can also perform this particular operation based on one or more of the locations. For example, the ingest module 125 can extract the set of questions, and corresponding question numbers, based on the first and third locations that identify the columns in which the set of questions are listed, and the question numbers are listed.

Identify Answers Module

Figure 6:
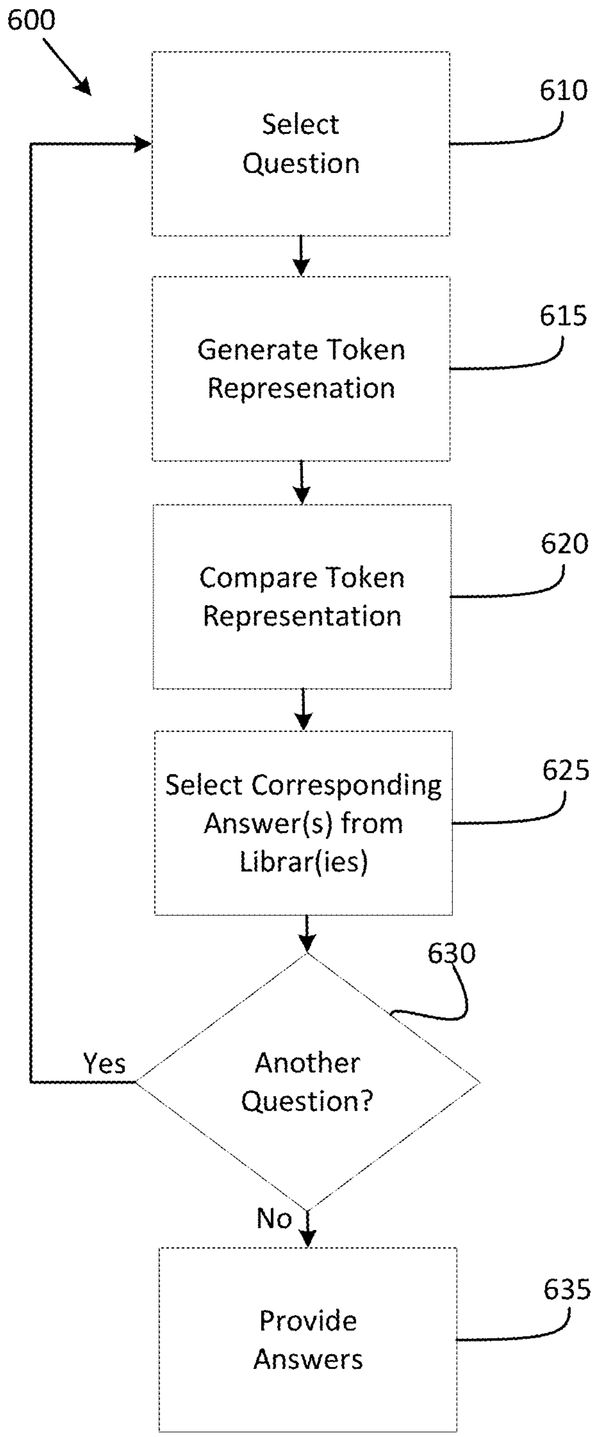
FIG. 6 depicts an example of a process for identifying answers to questions in accordance with various aspects of the present disclosure.

Turning now to FIG. 6, additional details are provided regarding an identify answers module 130 used for identifying answers to the set of questions found in an electronic assessment (assessment file) in accordance with various aspects. Accordingly, the flow diagram shown in FIG. 6 may correspond to operations executed, for example, by computing hardware found in the data exchange computing platform 100 as described herein, as the computing hardware executes the identify answers module 130.

The process 600 involves the identify answers module 130 selecting a question from the set of questions in Operation 610. Once selected, the identify answers module 130 generates a token representation of the question in Operation 615. In various aspects, the identify answers module 130 performs this particular operation by performing natural language processing on the question to generate a vector representation of the question that serves as the token representation. For instance, the identify answers module 130 can use a tokenization technique on the question to generate the vector representation of the question such as, for example, a count vectorizer, a TF-IDF vectorizer, and/or the like.

In Operation 620, the identify answers module 130 compares the generated token representation for the selected question with the token representations provided for the previous questions found in the one or more corresponding answer libraries. In various aspects, the identify answers module 130 performs this particular operation by generating a similarity measure between the two token representations. For example, the identify answers module 130 may generate a cosine measure, an overlap measure, a Euclidean measure, a dot product measure, and/or the like between the two token representations.

In Operation 625, the identify answers module 130 can then select the corresponding one or more answers for the previous question that appears to have a level of the similarity (e.g., similarly measure) that demonstrates the question, and the previous question are closely similar. In various aspects, the identify answers module 130 performs this particular operation based on the similarity measures generated between the token representation for the question and the token representations for each of the previous questions.

In some aspects, the identify answers module 130 also generates a confidence measure (e.g., confidence value) that identifies a confidence that the identified one or more answers are correct for the question. For example, the identify answers module can generate the confidence measure based on the number of words that match between the question and the previous question as indicated via their corresponding token representations. In addition, the identify answers module 130 may also determine that the confidence measure for the one or more identified answers satisfies a certain threshold in order to maintain the one or more answers are provided as answers for the question.

In various aspects, an answer library can be constructed to include the previous questions grouped into entries. Here, an entry may represent a group of previous questions that are related. For example, an entry may represent a group of previous questions related to requesting information on a third party's encryption practices. Accordingly, such a previous question may be asked via multiple variations. As a specific example, such a previous question may be asked as a yes/no question such as "do you use encryption for stored data?" In addition, such a previous question may be asked that solicits more detailed information such as "what type of encryption method do you use for stored data?" Therefore, an answer library may be constructed to include an entry to represent these two previous questions.

In some aspects, the entry may comprise a hierarchical structure that includes a primary previous question representing the entry, along with secondary previous questions that are treated as alternative questions for the entry. For example, the entry related to requesting information on a third party's encryption practices may identify the previous question "what type of encryption method do you use for stored data?" as the primary question for the entity, with the previous question "do you use encryption for stored data?" as a secondary question. In addition, an entry may include one or more previous answers associated with the entry. Accordingly, the one or more previous answers may be arranged in a hierarchical structure. For example, the one or more previous answers may be arranged so that a single previous answer is provided for each previous question found in the hierarchical structure for the entity.

Therefore, in some aspects, the identify answers module 130 can generate the confidence measure by initially identifying a previous question that matches the question based on the similarity measure generated between the previous question and the question. The identify answers module 130 can then generate the confidence measure based on the similarity measure and the similarity measures for the remaining previous questions found in the entry in which the identified previous question is found. In additional or alternative aspects, the identify answers module 130 can generate the confidence measure based on the number of words that match and the similarities measures for the previous questions found in the corresponding entry.

In additional or alternative aspects, the identify answers module 130 can perform one or more natural language processing techniques in confirming a closet match between the question and a previous question. For example, the identify answers module 130 can perform natural language processing techniques such as sentiment analysis, entity analysis, syntax analysis, and/or the like. Accordingly, the identify answers module 130 can perform such techniques to better improve the capabilities of the identify answers module 130 in accurately identifying the closets match to the question found in the previous questions.

In Operation 630, the identify answers module 130 determines whether another question is found in the set of questions for the assessment file. If so, then the identify answers module 130 returns to Operation 610, selects the next question in the set of questions, and determines one or more answers for the newly selected question as just discussed. Once the identify answers module 130 has processed all of the questions in the set of questions, the identify answers module 130 returns the answers in Operation 635. As discussed, the data exchange computing platform 100 (e.g., the autocompletion assessment module 120) can then display the identified answers for the set of questions to personnel of the third party to review through the third party's tenant portal.

Populate Assessment Module

Figure 7:
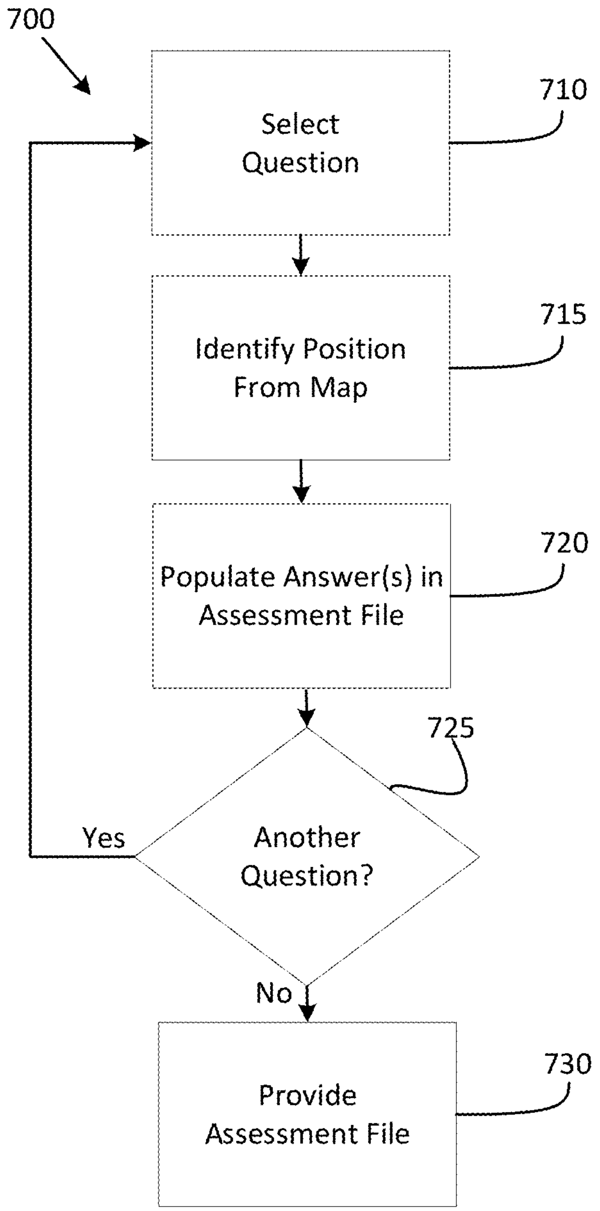
FIG. 7 depicts an example of a process for populating answers in an electronic assessment in accordance with various aspects of the present disclosure.

Turning now to FIG. 7, additional details are provided regarding a populate assessment module 135 used for populating answers in an assessment (assessment file) in accordance with various aspects. Accordingly, the flow diagram shown in FIG. 7 may correspond to operations executed, for example, by computing hardware found in the data exchange computing platform 100 as described herein, as the computing hardware executes the populate assessment module 135.

The process 700 involves the populate assessment module 135 selecting a question from the set of questions found in the assessment file that one or more answers have been identified for the question in Operation 710. The data exchange computing platform 100 (e.g., the autocompletion assessment module 120) may have first displayed the answers identified for the set of questions to personnel of the third party via one or more graphical user interfaces through the third party's tenant portal. In turn, the data exchange computing platform 100 (e.g., the autocompletion assessment module 120) may have received an indication for each question that the one or more answers identified for the question are correct. Therefore, the populate assessment module 135 may be provided with those questions (and/or indication thereof) in the set of questions in which answers have been identified as correct for the questions.

In Operation 715, the populate assessment module 135 identifies one or more positions in the assessment file to populate with the one or more answers identified for the question. In various aspects, the populate assessment module 135 performs this operation by using the mapping of the questions and answers generated for the assessment file (e.g., by the ingest module 125). For example, the populate assessment module 135 may use the question number and/or the question, itself, in identifying the one or more positions in the assessment file that are to be populated with the one or more answers for the question. As a specific example, the assessment file may be in the format of an Excel® spreadsheet. Here, the populate assessment module may identify a first particular cell in the spreadsheet for storing a first yes/no answer for the question and a second particular cell in the spreadsheet for storing a supporting answer for the question. Once the positions have been identified, the populate assessment module 135 populates the one or more positions (e.g., cells) in the assessment file with the one or mor answers for the question in Operation 720.

In Operation 725, the populate assessment module 135 determines whether another question exists in which one or more answers for the question need to be populated in the assessment file. If so, then the populate assessment module 135 returns to Operation 710, selects the next question, and populates the one or more answers for the newly selected question in the assessment file accordingly. Once the populate assessment module 135 has processed all of the questions that exist in which one or more answers for the questions are to be populated in the assessment file, the populate assessment module 135 provides the assessment file in Operation 730. For example, the populate assessment module 135 may provide the file to the autocompletion assessment module 120 and in turn, the autocompletion assessment module 120 may provide the third party (e.g., personnel thereof) with access to the assessment file through the third party's tenant portal.

Answer Library

As noted, the data exchange computing platform 100 can generate one or more answer libraries for a particular third party. In various aspects, the data exchange computing platform 100 can generate an answer library for a particular third party that comprises a set of previous questions and answers. For example, the data exchange computing platform 100 can receive one or more different electronic assessments (e.g., assessment files) that were previously completed by the third party and uploaded by personnel of the third party into the data exchange computing platform 100.

In turn, the data exchange computing platform 100 can extract the previous questions and corresponding answers found in each of the previously completed assessments to include in the answer library. In some aspects, the data exchange computing platform 100 can receive input from the personnel identifying locations within the previous assessment files that previous questions and corresponding previous answers can be found. Accordingly, the data exchange computing platform 100 can use the locations in extracting the previous questions and corresponding previous answers provided in the previous assessment files.

In additional or alternative aspects, the data exchange computing platform 100 can use a template in extracting the previous questions and corresponding previous answers from the previously completed assessments. For example, the data exchange computing platform 100 may receive a selection on a template from a listing of different templates that may be based on various types of layouts for assessments. Accordingly, the data exchange computing platform 100 can use the selected template in extracting the previous questions and corresponding answers from the assessments. The data exchange computing platform 100 can then use the extract previous questions and answers in generating the answer library for the third party.

However, many of the previous questions may be asking for the same and/or similarly related information. For example, a first previous question may ask "is your data repository located in a restricted area?" While a second previous question may ask "can you please provide details on what personnel have access to your data repository?" In addition, similar previous questions may be asking for the same information using different variations. For example, a first previous question may ask "does your computing service require two-factor authentication?" While a second previous question may ask "do you have two-factor authentication controls in place?" Therefore, the data exchange computing platform 100 can address these concerns in generating the answer library for the third party by clustering previous questions that are similar into groups of similar previous questions and identifying one or more previous answers for each of the groups of previous similar questions to include in the answer library.

In various aspects, the data exchange computing platform 100 clusters the previous questions by using a tokenization technique on each previous question to generate a token representation of the previous question. In some aspects, the data exchange computing platform 100 uses a count vectorizer that generates a token representation in the form of a vector out of each previous question based on a word count for each question. Here, a word listing can be generated that includes each unique word that appears in the previous questions extracted from the assessments. The data exchange computing platform 100 can then generate a vector for each previous question that includes a position for each word found in the word listing with the positions in the vector representing the words found in the previous question set to an integer to indicate an occurrence of the word in the question. For example, for the previous question "do you have two-factor authentication controls in place?," the data exchange computing platform 100 can set the position in the vector representing the word "authentication" to a one, while setting all the positions in the vector representing the words found in the word listing that do not appear in the question to zero.

In additional or alternative aspects, the data exchange computing platform 100 can use other tokenization techniques such as a TF-IDF vectorizer that performs a similar process as the count vectorizer except the TF-IDF vectorizer replaces the integers in the positions representing the words that appear in a previous question with a calculated TF-IDF value. TF is the term frequency determined as the number of times the word appears in the previous question and IDF is the inverse document frequency determined as the log to the base e of the total number of previous questions divided by the number of previous questions in which the word appears.

In various aspects, the data exchange computing platform 100 then uses a clustering model to cluster the previous questions that are similar into groups of similar previous questions. The clustering model is configured to process the token representations to cluster the previous questions with high similarity based on the token representations generated for the various previous questions. For example, the clustering model may be configured to perform a k-nearest neighbor (k-NN) classification to place each previous question into a class membership to form the groups of similar previous questions.

Once all of the previous questions have been placed into a group, the data exchange computing platform 100 identifies one or more previous answers for each of the groups of similar previous questions to include in the answer library. In some aspects, the data exchange computing platform 100 can provide the third party (e.g., personnel thereof) with the different groups of similar previous questions along with the corresponding answers for the previous questions found in each group. For example, the data exchange computing platform 100 can display the different groups on one or more graphical user interfaces made available through the third party's tenant portal.

In various aspects, the data exchange computing platform 100 can place an entry in the library to represent one or more of the groups of similar previous questions. In some aspects, an entry comprises a hierarchical structure that includes a primary previous question representing the entry, along with secondary previous questions that are treated as alternative questions for the entry.

Here, the data exchange computing platform 100 can receive a selection of one or more groups of similar previous questions via the one or more graphical user interfaces that have been identify by personnel as related and that an entry should be included in the library for the one or more groups. In addition, the data exchange computing platform 100 can receive a selection of a particular previous question for the one or more groups of similar previous questions to serve as the primary previous question for the entry. Further, the data exchange computing platform 100 can receive a selection of which of the previous questions and corresponding previous answers from each of the one or more groups of similar previous questions. Accordingly, these identified previous questions can serve as secondary previous questions for the entry.

The data exchange computing platform 100 can then include the entries for the different groups of similar previous questions and corresponding answers, as identified via the one or more graphical user interfaces, in the answer library to generate the answer library. In addition to the selected previous questions and answers, the data exchange computing platform 100 can also include the token representation of each previous question in the answer library.

In various aspects, the data exchange computing platform 100 can generate multiple answer libraries for a particular third party. For example, the data exchange computing platform 100 can generate different answer libraries for a particular third party based on different types of assessments that are completed by the particular third party. In addition or alternatively, the data exchange computing platform 100 can generate different answer libraries for a particular third party based on different computer-implemented services and/or products offered by the particular third party. The data exchange computing platform 100 can use other criteria in generating multiple answer libraries for a particular third party.

Process Invitation Link Module

Figure 8A:
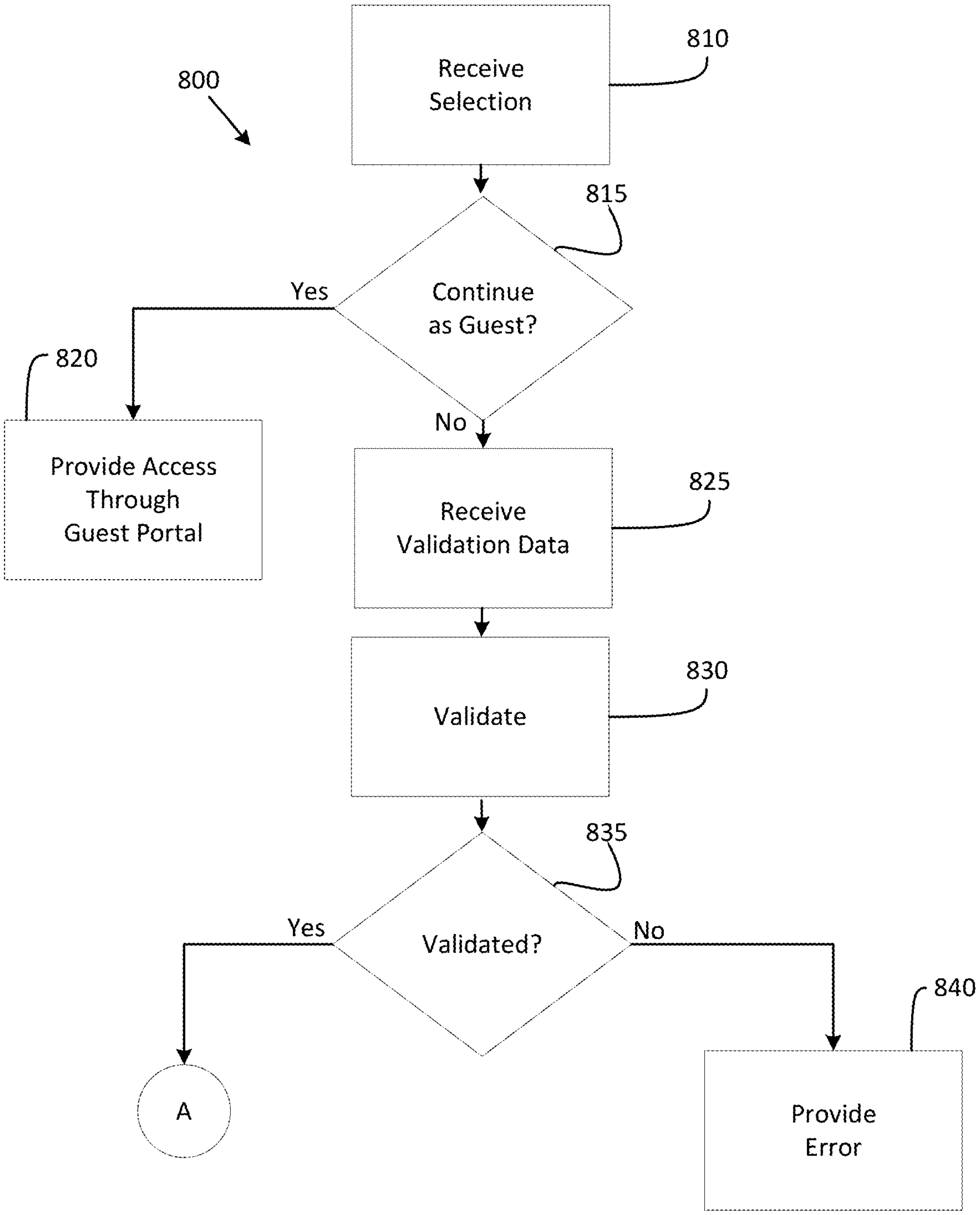
FIGS. 8A and 8B depict an example of a process for registering a third party with a data exchange service in accordance with various aspects of the present disclosure.
Figure 8B:
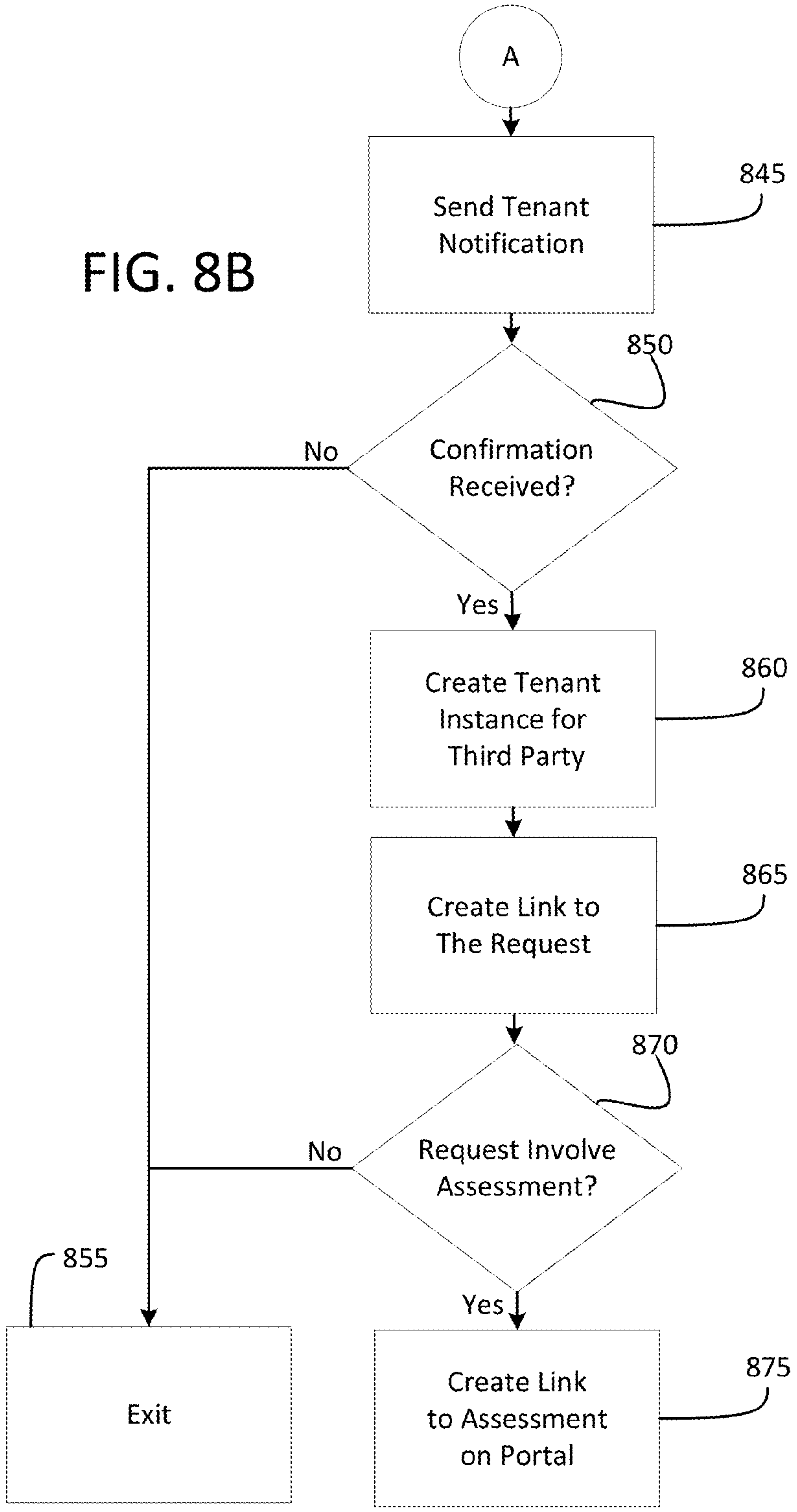

Turning now to FIGS. 8A and 8B, additional details are provided regarding a process invitation link module 140 used for registering a third party with the data exchange service in accordance with various aspects. Accordingly, the flow diagram shown in FIGS. 8A and 8B may correspond to operations executed, for example, by computing hardware found in the data exchange computing platform 100 as described herein, as the computing hardware executes the process invitation link module 140.

A first party may submit a request for an artifact to be sent to a third party through the data exchange service. In turn, the data exchange computing platform 100 (e.g., the artifact request module 110) may determine the third party is not currently a tenant of the data exchange service. As a result, the data exchange computing platform 100 (e.g., the artifact request module 110) may generate and send an electronic notification on behalf of the third party that includes an invitation and/or access mechanism that personnel for the third party may activate to register the third party with the data exchange service and/or to gain access to the request. Upon activation, the data exchange computing platform 100 may provide the personnel with a guest portal that facilitates the personnel initiating a registration of the third party with the data exchange service to gain access to the request, or in the alternative to gain access to the request as a guest of the data exchange service. For example, the guest portal may comprise one or more graphical user interfaces such as one or more webpages that are displayed through a browser application residing on a computing device of a third party tenant computing system 181.

Upon the personnel making a selection, the data exchange computing platform 100 activates the process invitation link module 140 and provides the module 140 with the selection made by the personnel of registering the third party with the data exchange service to gain access to the quest or to gain access to the request as a guest. Therefore, the process 800 involves the process invitation link module 140 receiving the selection at Operation 810. In turn, the process invitation link module 140 determines whether the personnel would like to continue as a guest in Operation 815. If so, then the process invitation link module provides the personnel with access to the request submitted by the first party through the guest portal in Operation 820.

If the process invitation link module 140 determines that the personnel instead wants to register the third party with the data exchange service, then the process invitation link module receives validation data in Operation 825. In some aspects, the process invitation link module automatically receives the validation data. For example, the validation data can be automatically populated in the guest portal as a result of an activation of the invitation and/or access mechanism sent to the third party. As a specific example, the invitation and/or access mechanism may comprise a link, such a hyperlink, that includes the validation data such as a contact (e.g., email address), a validation code, and/or the like that is populated in the guest portal upon activation of the link.

Here, the validation data may be unique to the third party so that the validation data can only be used in registering the third party with the data exchange service. In addition, the guest portal may lock the validation data once the data has been populated in the guest portal so that the validation data cannot be edited by the personnel. The guest portal may be configured in such a manner as to ensure that the validation data has been populated in the guest portal via the invitation and/or access mechanism, and that the third party (personnel thereof) is actually registering the third party with the data exchange service.

In additional or alternative aspects, the process invitation link module 140 may provide one or more graphical user interfaces for display to the personnel. Here, the one or more graphical user interfaces may request the personnel to provide the validation data such as a contact (e.g., email address), a validation code, and/or the like through which the third party received the invitation (e.g., the invitation and/or access mechanism) to register with the data exchange service. For example, the process invitation link module 140 may provide a graphical user interface for display that requests the validation data and provides an input control on the interface for the personnel to fill in and submit the contact.

In Operation 830, the process invitation link module 140 validates the registration of the third party with the data exchange service based on the validation data. For example, the process invitation link module 140 may compare the validation data (e.g., the contact, the validation code, and/or the link) with validation data the data exchange computing platform 100 has linked to the invitation and/or access mechanism sent to the third party. In various aspects, the process invitation link module 140 performs the validation to ensure that proper (e.g., authorized) personnel who are actually associated with the third party are registering the third party with the data exchange service.

In additional or alternative aspects, the process invitation link module 140 may also perform one or more checks in validating the registration of the third party with the data exchange service. For example, the process invitation link module 140 may determine whether the contact (e.g., personnel associated with the contact) and/or third party has been placed on a blacklist that prohibits the contact in registering a third party with the data exchange service and/or the third party is prohibited with registering with the data exchange service. In another example, the process invitation link module 140 may determine whether the contact (e.g., personnel associated with the contact) is associated with a competitor of the third party.

In Operation 835, the process invitation link module 140 determines whether the registration of the third party has been validated. If not, then the process invitation link module 140 may provide the personnel with an error in Operation 840. For example, the process invitation link module 140 may cause the display of an error message via the guest portal to indicate to the personnel that an error has occurred in validating the registration of the third party with the data exchange service.

Turning to FIG. 8B, if instead the process invitation link module 140 determines that the registration of the third party has been validated, then the process invitation link module 140 sends a tenant notification to the third party in Operation 845. For example, the process invitation link module 140 may send the third party an electronic communication, such as an email, text message, platform message (e.g., LinkedIn®), and/or the like, to the third party to notify the third party that an attempt is being made to register the third party with the data exchange service. In addition, the tenant notification may include credentials for the third party to use to access the data exchange service (e.g., to access the third party's tenant instance) such as a username and/or password. Further, the tenant notification may include a confirmation mechanism, such as a hyperlink, that the third party (e.g., personnel thereof) can activate to confirm the third party's registration with the data exchange service.

In Operation 850, the process invitation link module 140 determines whether confirmation for registration of the third party with the data exchange service has been received. For example, the process invitation link module 140 may receive an indication of the third party (e.g., personnel thereof) logging into the data exchange service using the credentials sent to the third party. In an additional or alternative example, the process invitation link module 140 may receive an indication of an activation of the confirmation mechanism provided in the tenant notification sent to the third party. If confirmation is not received (e.g. within a particular time period and/or an indication is received that registration of the third party has not been confirmed), then the process invitation link module 140 simply exists the process 800 in Operation 855.

However, if the process invitation link module 140 determines the registration of the third party has been confirmed, then the process invitation link module 140 generates a tenant instance for the third party on the data exchange computing platform 100 in Operation 860. In addition to generating the tenant instance, the process invitation link module 140 can create a link to access the request submitted by the first party on the third party's tenant instance in Operation 865. In addition, the process invitation link module 140 can determine whether the request involves an electronic assessment that the first party has submitted to have the third party complete in Operation 870. If so, then the process invitation link module 140 can create a link to access the electronic assessment on the third party's tenant instance in Operation 875. The process invitation link module 140 can then exist the process 800 in Operation 860.

As a result, the data exchange computing platform 100 can make the request, and accompanying electronic assessment if there is one, available through the data exchange service. Therefore, upon the data exchange computing platform 100 receiving an indication of the third party (personnel thereof) logging into the service, the data exchange computing platform 100 can provide the third party with access to the request and/or the electronic assessment through the third party's tenant instance.

The data exchange computing platform 100 may then receive an artifact uploaded through the third party's tenant instance to fulfill the request and in turn, make the uploaded artifact available to the first party who submitted the request through the first party's tenant instance on the data exchange computing platform 100. In doing so, the data exchange computing platform 100 can facilitate exchange of the artifact between the first and third parties without the first party's computing environment 170 and the third party's computing environment 180 having to directly interact to exchange the artifact. As a result, the data exchange computing platform 100 can address many of the technical challenges that may be encountered due to different functionality, capabilities, interfaces, and/or the like between the first party and third party computing environments 170, 180.

Claim Profile Module

Figure 9:
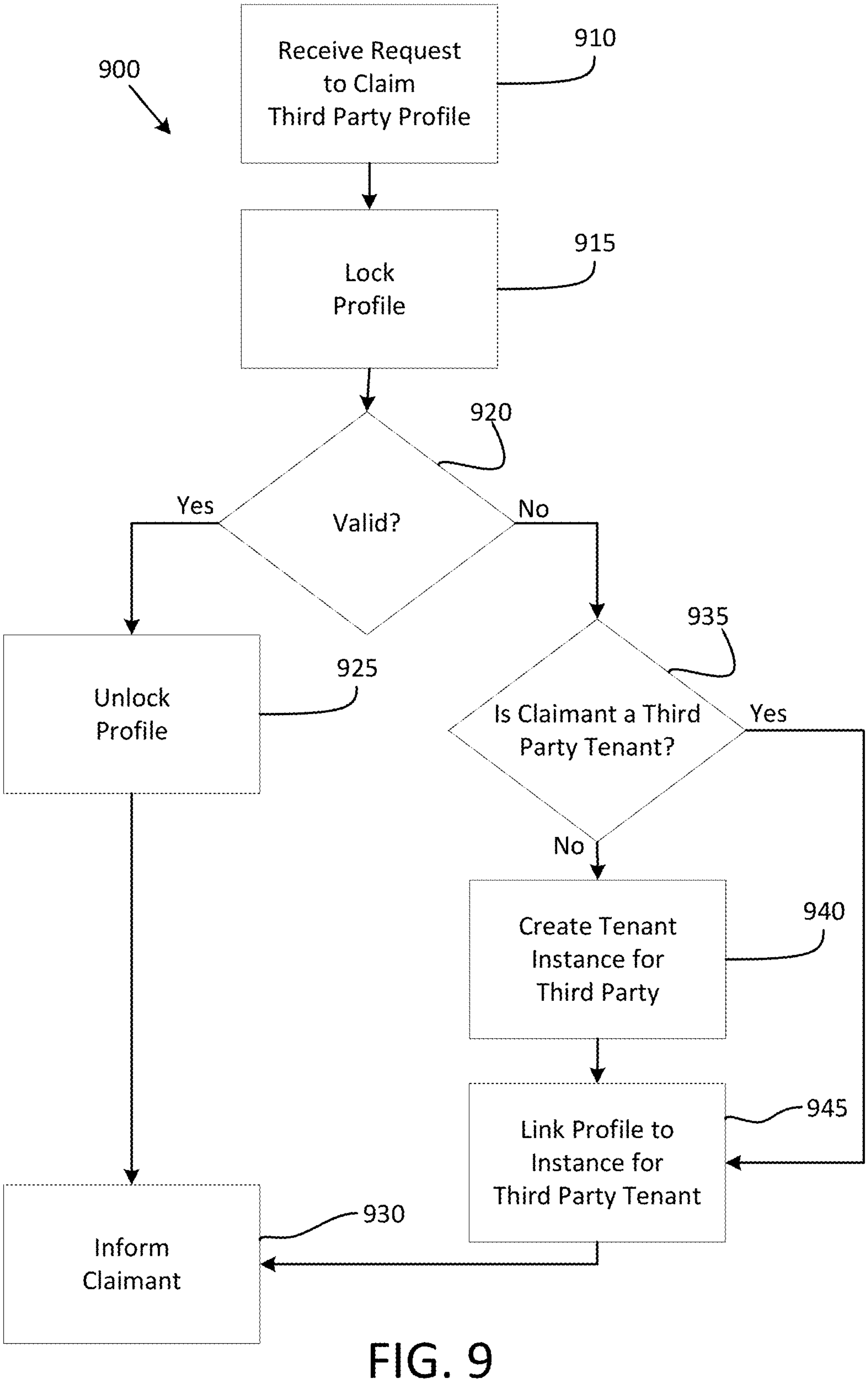
FIG. 9 depicts an example of a process for linking a trust profile to a third party tenant instance in accordance with various aspects of the present disclosure.

Turning now to FIG. 9, additional details are provided regarding a claim profile module 145 used for linking a trust profile to a third party tenant instance in accordance with various aspects. Accordingly, the flow diagram shown in FIG. 9 may correspond to operations executed, for example, by computing hardware found in the data exchange computing platform 100 as described herein, as the computing hardware executes the claim profile module 145.

In various aspects, the data exchange computing platform 100 provides third party trust profiles to further assist third parties with providing first parties with access to data (e.g., various artifacts) of the third parties. A third party trust profile can serve as an electronic forum available through the data exchange service that is controlled by a particular (associated) third party with respect to making data available through the third part trust profile.

In various aspects, the data exchange computing platform 100 may provide one or more graphical user interfaces through the data exchange service to allow third parties (e.g., personnel thereof) to view third party trust profiles that have been created on the data exchange computing platform 100 for various third parties, but have yet to be claimed by the third parties. For example, the data exchange computing platform 100 may include a third party trust profile that may have been created for a particular third party who is not currently a tenant of the data exchange service, but who provides a service that is frequently used by many of the first parties who are tenants of the data exchange service. Here, the third party trust profile for the particular third party may provide information that is publicly available for the third party that may have been gathered from publicly available data sources such as the particular third party's public facing website. The data exchange computing platform 100 may include such third party trust profiles to make the publicly available information more readily and/or conveniently available for first party tenants of the data exchange service.

Accordingly, the particular third party may become a tenant of the data exchange service and decide to claim the third party trust profile or may instead, as a guest of the data exchange service, decide to claim the third party trust profile. Therefore, the data exchange computing platform 100 may receive a request from the particular third party (e.g., third party claimant) to claim the third party trust profile that is available through the data exchange service, but has not yet been claimed by the third party. Upon receiving the request, the data exchange computing platform 100 can invoke the claim profile module 145 to process the request.

Therefore, the process 900 involves the claim profile module 145 receiving the request in Operation 910. In response to receiving the request, the claim profile module 145 locks the third party trust profile on the data exchange computing platform 100 in Operation 915 so that the trust profile is unavailable for another third party to claim. The claim profile module 145 performs this particular operation in various aspects so that a third party trust profile on the data exchange computing platform 100 is not (accidently) linked to multiple third parties.

In Operation 920, the claim profile module 145 determines whether the third party's request to claim the third party trust profile is valid. In some aspects, the claim profile module 145 performs this particular operation without human intervention, or with minimal human intervention. For example, the request may include data (information) on the third party and/or personnel (e.g., an individual) who is submitting the request that can then be used by the claim profile module 145 to validate the request for the third party trust profile. As a specific example, the data may include identification information on personnel (e.g., the individual) who submitted the request on behalf of the third party. Here, the claim profile module 145 may use the identification information to investigate publicly available information found through various data sources (e.g., information found on LinkedIn®) to determine that the request is legitimate and that the proper third party (and/or personnel thereof) is claiming the third party trust profile. In other aspects, the claim profile module 145 submits the request to validation personnel who then conducts a validation process to validate that the request is legitimate.

If the claim profile module 145 determines the request has not been validated, then the claim profile module 145 unlocks the third party trust profile in Operation 925. As a result, the third party trust profile is again available through the data exchange service to be claimed by another (e.g., valid) third party. In Operation 930, the claim profile module 145 informs the third party that the request to link the third party profile with the third party (with the third party's tenant instance) could not be validated and has been rejected. For example, the claim profile module 145 may provide an electronic notification through the third party's tenant instance and/or the claim profile module 145 may send an electronic notification, such as an email, to the third party informing the third party that the request has been rejected.

If instead the claim profile module 145 determines the request has been validated, then the claim profile module 145 determines whether the third party is a current tenant of the data exchange service in Operation 935. If the claim profile module 145 determines the third party is not currently a tenant of the data exchange service, then the claim profile module 145 creates a tenant instance for the third party on the data exchange computing platform 100 in Operation 940. In various aspects, the claim profile module 145 may perform this particular operation in a similar manner as the process invitation link module 140. For example, the claim profile module 145 may perform validation and/or confirmation operations similar to the validation and/or confirmation operations performed by the process invitation link module 140.

In Operation 945, the claim profile module 145 links the third party trust profile to the third party's tenant instance. In Operation 930, the claim profile module 145 notifies the third party that the third party trust profile has been linked to the third party's tenant instance. For example, the claim profile module 145 may provide a notification through the third party's tenant instance and/or the claim profile module 145 may send an electronic notification, such as an email, to the third party informing the third party that the third party trust profile has been linked to the third party's tenant instance. As a result, the data exchange computing platform 100 provides access and control of the third party trust profile to the third party (e.g., personnel thereof) through the third party's tenant instance on the data exchange computing platform 100.

In various aspects, the data exchange computing platform 100 can provide a third party with the capabilities to claim and management multiple trust profiles that are associated with the third party. For example, a particular third party may wish to maintain separate trust profiles for each of the third party computer-implemented services being offered by the third party. The data exchange computing platform 100 providing the particular third party with the multiple trust profiles can allow for first parties to location and access needed data (e.g., needed artifacts) for a particular computer-implemented service that is being offered by the particular third party without the first parties having to sift through data for other computing-implemented services being offered by the particular third party. That is to say, the data exchange computing platform 100 providing the particular third party with the multiple trust profiled can facilitate more efficient and effective exchange of data between the particular third party and first parties.

In addition, the data exchange computing platform 100 can provide additional functionality for the trust profiles that can assist third parties in managing the trust profiles. For example, the data exchange computing platform 100 can provide functionality that allows for attachments to be made available along with certain data, auditing functionality that tracks and logs what first parties and/or personnel thereof who have access certain data through the trust profile, and/or the like.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 10:
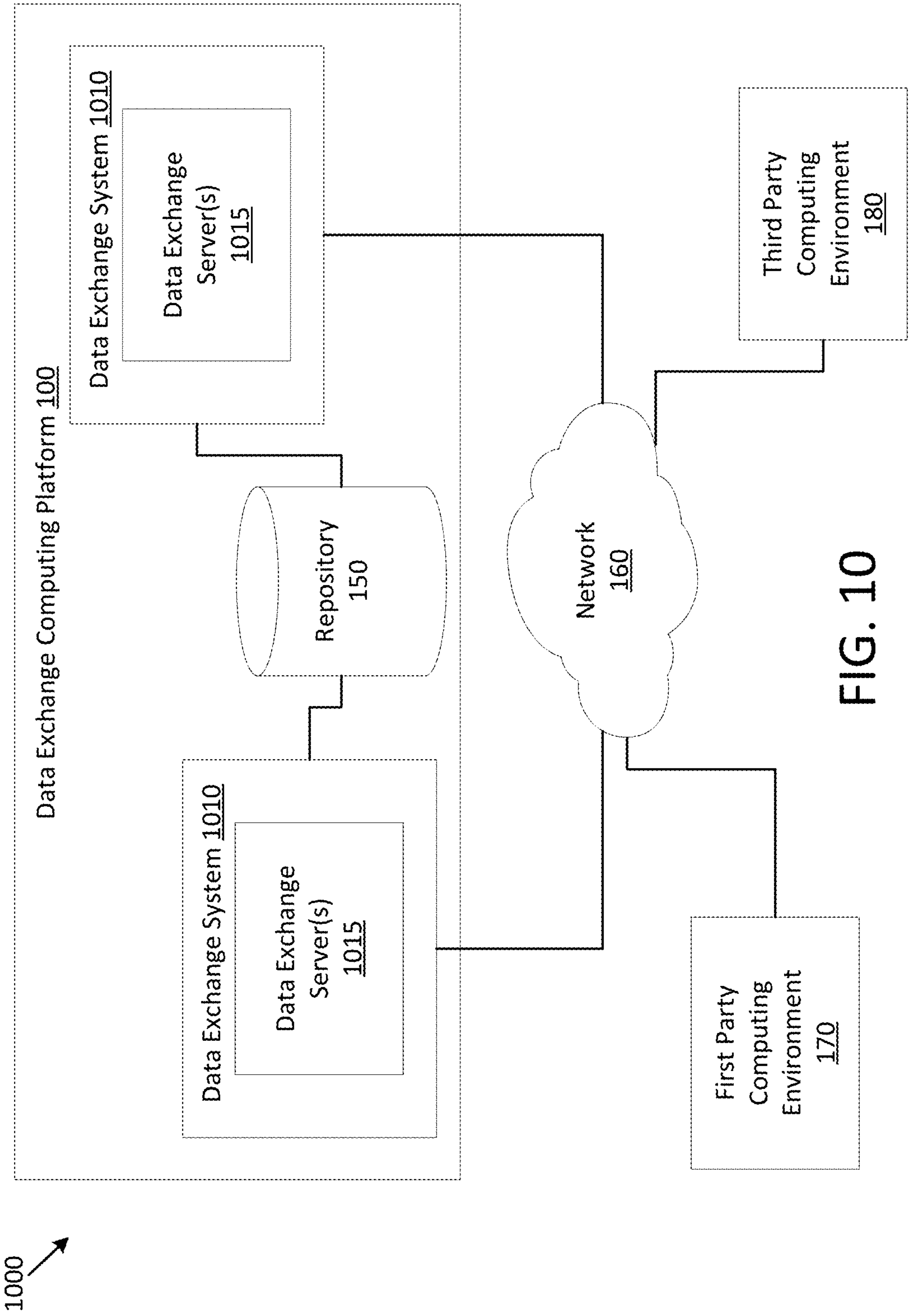
FIG. 10 depicts an example of a system architecture that may be used in accordance with various aspects of the present disclosure.

FIG. 10 is a block diagram of a system architecture 1000 that can be used in providing the data exchange service that is accessible to various first and third party computing environments 170, 180 according to various aspects as detailed herein. As may be understood from FIG. 10, the system architecture 1000 in various aspects includes a data exchange computing platform 100. Here, the data exchange computing platform 100 can comprise one or more data exchange computing systems 1010. Each data exchange computing system 1010 can include various hardware components such as one or more data exchange servers 1015.

In addition, the data exchange computing platform 100 can include a repository 150. The repository 150 may be made up of one or more computing components such as servers, routers, data storage, networks, and/or the like that are used on the data exchange computing platform 100 to store and manage data associated with first and/or third parties who are tenants of the data exchange service. For example, the repository 150 may store and manage data associated with various tenant instances found on the data exchange computing platform 100 for the various first and/or third parties such as artifacts that are to be made available through the data exchange service, requests made for data artifacts through the data exchange service, third party trust profiles for various third parties, answer libraries used in autocompleting electronic assessments for various third parties, and/or the like.

Accordingly, the data exchange computing platform 100 may provide the data exchange service to various first and/or third parties by making the service available over one or more networks 160. Here, a first and/or third party may access the service via a first and/or third computing environment 170, 180 associated with the party interacting with the data exchange computing platform 100. For example, the data exchange computing platform 100 may provide the service through a website that is accessible to the first and/or third party's computing environment 170, 180 over the one or more networks 160.

According, the data exchange server(s) 1015 found within the one or more data exchange computing systems 1010 may execute an artifact request module 110, a process request link module 115, an autocompletion assessment module 120, an ingest module 125, an identify answers module 130, a populate assessment module 135, a process invitation link module 140, and/or a claim profile module 145 as described herein. Further, according to particular aspects, the data exchange server(s) 1010 may provide one or more portals that include one or more graphical user interfaces (e.g., one or more webpages, webform, and/or the like through the website) through which personnel of a first and/or third party can interact with the data exchange computing platform 100. Furthermore, the data exchange server(s) 1010 may provide one or more interfaces that allow the data exchange computing platform 100 to communicate with first and/or third party computing environment(s) 170, 180 such as one or more suitable application programming interfaces (APIs), direct connections, and/or the like.

Example Computing Hardware

Figure 11:
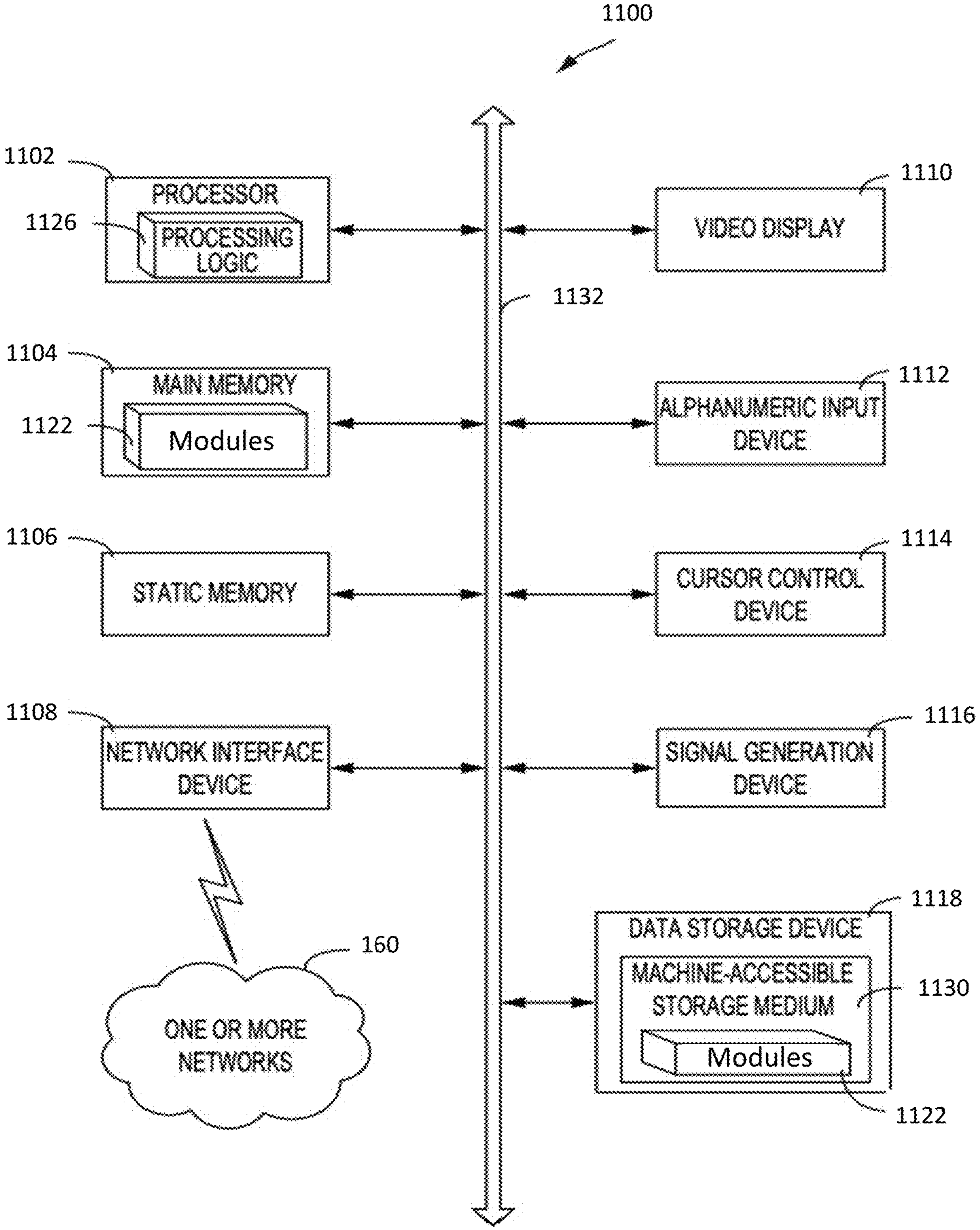
FIG. 11 depicts an example of a computing entity that may be used in accordance with various aspects of the present disclosure.

FIG. 11 illustrates a diagrammatic representation of a computing hardware device 1100 that may be used in accordance with various aspects. For example, the hardware device 1100 may be computing hardware such as a data exchange server 1015 as described in FIG. 10. According to particular aspects, the hardware device 1100 may be connected (e.g., networked) to one or more other computing entities, storage devices, and/or the like via one or more networks such as, for example, a LAN, an intranet, an extranet, and/or the Internet. As noted above, the hardware device 1100 may operate in the capacity of a server and/or a client device in a client-server network environment, or as a peer computing device in a peer-to-peer (or distributed) network environment. In some aspects, the hardware device 1100 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 1100 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 1100 includes a processor 1102, a main memory 1104 (e.g., read-only memory (ROM), flash memory, dynamic random-access memory (DRAM) such as synchronous DRAM (SDRAM), Rambus DRAM (RDRAM), and/or the like), a static memory 1106 (e.g., flash memory, static random-access memory (SRAM), and/or the like), and a data storage device 1118, that communicate with each other via a bus 1132.

The processor 1102 may represent one or more general-purpose processing devices such as a microprocessor, a central processing unit, and/or the like. According to some aspects, the processor 1102 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 1102 may be one or more special-purpose processing devices such as an application specific integrated circuit (ASIC), a field programmable gate array (FPGA), a digital signal processor (DSP), network processor, and/or the like. The processor 1102 can execute processing logic 1126 for performing various operations and/or steps described herein.

The hardware device 1100 may further include a network interface device 1108, as well as a video display unit 1110 (e.g., a liquid crystal display (LCD), a cathode ray tube (CRT), and/or the like), an alphanumeric input device 1112 (e.g., a keyboard), a cursor control device 1114 (e.g., a mouse, a trackpad), and/or a signal generation device 1116 (e.g., a speaker). The hardware device 1100 may further include a data storage device 1118. The data storage device 1118 may include a non-transitory computer-readable storage medium 1130 (also known as a non-transitory computer-readable storage medium or a non-transitory computer-readable medium) on which is stored one or more modules 1122 (e.g., sets of software instructions) embodying any one or more of the methodologies or functions described herein. For instance, according to particular aspects, the modules 1122 include an artifact request module 110, a process request link module 115, an autocompletion assessment module 120, an ingest module 125, an identify answers module 130, a populate assessment module 135, a process invitation link module 140, and/or a claim profile module 145 as described herein. The one or more modules 1122 may also reside, completely or at least partially, within main memory 1104 and/or within the processor 1102 during execution thereof by the hardware device 1100—main memory 1104 and processor 1102 also constituting computer-accessible storage media. The one or more modules 1122 may further be transmitted or received over a network 160 via the network interface device 1108.

While the computer-readable storage medium 1130 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 1100 and that causes the hardware device 1100 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

CONCLUSION

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

The invention claimed is:

1. A method comprising:

sending an electronic notification on behalf of a first party to a third party requesting completion of an electronic assessment, wherein:

the electronic notification comprises a hyperlink configured for facilitating access to the electronic assessment and is sent via a data exchange computing platform, the data exchange computing platform provides a data exchange service that facilitates exchange of data between a plurality of tenants of the data exchange computing platform, and the first party is a first tenant of the plurality of tenants and has a first tenant instance on the data exchange computing platform;

receiving a first indication of an activation of the hyperlink;

responsive to receiving the first indication, providing a graphical user interface for display, wherein the graphical user interface comprises a button configured for facilitating registration of the third party with the data exchange service;

receiving a second indication of an activation of the button; and responsive to receiving the second indication:

generating a second tenant instance on the data exchange computing platform for the third party to facilitate the third party as a second tenant of the plurality of tenants; and providing access to autocompletion assessment software through the data exchange service, wherein the autocompletion assessment software is configured for automatically completing the electronic assessment for the third party so that the electronic assessment is submitted to the first party through the data exchange computing platform.

2. The method of claim 1, wherein the electronic assessment comprises a set of questions and the autocompletion assessment software is configured for automatically completing the electronic assessment for the third party by:

comparing each question of the set of questions to each previous question of a set of previous questions found in an answer library, wherein the answer library comprises a corresponding previous answer for each previous question of the set of previous questions provided by the third party for a previous electronic assessment completed by the third party;

identifying, based on comparing each question of the set of questions to each previous question of the set of previous questions, an answer to at least one question of the set of questions, wherein the answer comprises the corresponding previous answer for a previous question of the set of previous questions; and populating the answer to the at least one question in the electronic assessment as part of generating a completed version of the electronic assessment.

3. The method of claim 1, further comprising receiving, via the data exchange computing platform, a request that involves requesting completion of the electronic assessment by the third party, wherein the request is submitted by the first party through the data exchange service and identifies the electronic assessment and the third party.

4. The method of claim 1, wherein the graphical user interface further comprises an input field and the method further comprises, prior to generating the second tenant instance on the data exchange computing platform:

receiving, via the input field, input; and validating, based on the input, that the activation of the hyperlink is associated with the third party.

5. The method of claim 1, further comprising:

sending a second electronic notification comprising a confirmation hyperlink configured for confirming creation of the second tenant instance for the third party; and receiving a third indication of an activation of the confirmation hyperlink, wherein the second tenant instance is generated based on receiving the third indication.

6. The method of claim 1 further comprising:

receiving, via the data exchange computing platform, a request from the first party for an artifact from the third party, wherein the request is submitted by the first party through the first tenant instance;

responsive to receiving the request:

sending a second electronic notification to the third party, wherein the second electronic notification identifies the request; and providing access to the request to the third party through the second tenant instance;

receiving the artifact uploaded into the data exchange computing platform by the third party through the second tenant instance; and responsive to receiving the artifact:

sending a third electronic notification to the first party, wherein the third electronic notification identifies the artifact is available through the data exchange service; and providing access to the artifact to the first party through the first tenant instance.

7. A system comprising:

a non-transitory computer-readable medium storing instructions; and a processing device communicatively coupled to the non-transitory computer-readable medium, wherein, the processing device is configured to execute the instructions and thereby perform operations comprising:

sending an electronic notification on behalf of a first party to a third party requesting completion of an electronic assessment, wherein:

the electronic notification comprises a hyperlink for facilitating access to the electronic assessment and is sent via a data exchange computing platform, the data exchange computing platform provides a data exchange service that facilitates exchange of data between a plurality of tenants of the data exchange computing platform, and the first party is a first tenant of the plurality of tenants and has a first tenant instance on the data exchange computing platform;

receiving a first indication of an activation of the hyperlink;

responsive to receiving the first indication, providing a graphical user interface for display, wherein the graphical user interface comprises a button configured for facilitating registration of the third party with the data exchange service;

receiving a second indication of an activation of the button; and responsive to receiving the second indication:

generating a second tenant instance on the data exchange computing platform for the third party to facilitate the third party being a second tenant of the plurality of tenants; and providing access to autocompletion assessment software through the data exchange service, wherein the autocompletion assessment software is configured for automatically completing the electronic assessment for the third party so that the electronic assessment is submitted to the first party through the data exchange computing platform.

8. The system of claim 7, wherein the electronic assessment comprises a set of questions and the autocompletion assessment software is configured for automatically completing the electronic assessment for the third party by:

comparing each question of the set of questions to each previous question of a set of previous questions found in an answer library, wherein the answer library comprises a corresponding previous answer for each previous question of the set of previous questions provided by the third party for a previous electronic assessment completed by the third party;

identifying, based on comparing each question of the set of questions to each previous question of the set of previous questions, an answer to at least one question of the set of questions, wherein the answer comprises the corresponding previous answer for a previous question of the set of previous questions; and populating the answer to the at least one question in the electronic assessment as part of generating a completed version of the electronic assessment.

9. The system of claim 7, wherein the operations further comprise receiving, via the data exchange computing platform, a request that involves requesting completion of the electronic assessment by the third party, wherein the request is submitted by the first party through the data exchange service and identifies the electronic assessment and the third party.

10. The system of claim 7, wherein the graphical user interface further comprises an input field and the operations further comprise, prior to generating the second tenant instance on the data exchange computing platform:

receiving, via the input field, input; and validating, based on the input, that the activation of the hyperlink is associated with the third party.

11. The system of claim 7, wherein the operations further comprise:

sending a second electronic notification comprising a confirmation hyperlink for confirming creation of the second tenant instance for the third party; and receiving a third indication of an activation of the confirmation hyperlink, wherein the second tenant instance is generated based on receiving the third indication.

12. The system of claim 7, wherein the operations further comprise:

receiving, via the data exchange computing platform, a request from the first party for an artifact from the third party, wherein the request is submitted by the first party through the first tenant instance;

responsive to receiving the request:

sending a second electronic notification to the third party, wherein the second electronic notification identifies the request; and providing access to the request to the third party through the second tenant instance;

receiving the artifact uploaded into the data exchange computing platform by the third party through the second tenant instance; and responsive to receiving the artifact:

sending a third electronic notification to the first party, wherein the third electronic notification identifies the artifact is available through the data exchange service; and providing access to the artifact to the first party through the first tenant instance.

13. The system of claim 7, wherein the autocompletion assessment software is configured to automatically identify answers to a set of questions based on previous answers to previous questions provided by the third party in a previous assessment completed by the third party.

14. A non-transitory computer-readable medium storing computer-executable instructions that, when executed by computing hardware, configure the computing hardware to perform operations comprising:

sending an electronic notification on behalf of a first party to a third party requesting completion of an electronic assessment, wherein:

the electronic notification comprises a hyperlink for facilitating access to the electronic assessment and is sent via a data exchange computing platform, the data exchange computing platform provides a data exchange service that facilitates exchange of data between a plurality of tenants of the data exchange computing platform, and the first party is a first tenant of the plurality of tenants and has a first tenant instance on the data exchange computing platform;

receiving a first indication of an activation of the hyperlink;

responsive to receiving the first indication, providing a graphical user interface for display, wherein the graphical user interface comprises a button configured for facilitating registration of the third party with the data exchange service;

receiving a second indication of an activation of the button; and responsive to receiving the second indication:

generating a second tenant instance on the data exchange computing platform for the third party to facilitate the third party being a second tenant of the plurality of tenants; and providing access to autocompletion assessment software through the data exchange service, wherein the autocompletion assessment software is configured for automatically completing the electronic assessment for the third party so that the electronic assessment is submitted to the first party through the data exchange computing platform.

15. The non-transitory computer-readable medium of claim 14, wherein the electronic assessment comprises a set of questions and the autocompletion assessment software is configured for automatically completing the electronic assessment for the third party by:

comparing each question of the set of questions to each previous question of a set of previous questions found in an answer library, wherein the answer library comprises a corresponding previous answer for each previous question of the set of previous questions provided by the third party for a previous electronic assessment completed by the third party;

identifying, based on comparing each question of the set of questions to each previous question of the set of previous questions, an answer to at least one question of the set of questions, wherein the answer comprises the corresponding previous answer for a previous question of the set of previous questions; and populating the answer to the at least one question in the electronic assessment as part of generating a completed version of the electronic assessment.

16. The non-transitory computer-readable medium of claim 14, wherein the operations further comprise receiving, via the data exchange computing platform, a request that involves requesting completion of the electronic assessment by the third party, wherein the request is submitted by the first party through the data exchange service and identifies the electronic assessment and the third party.

17. The non-transitory computer-readable medium of claim 14, wherein the graphical user interface further comprises an input field and the operations further comprise, prior to generating the second tenant instance on the data exchange computing platform:

receiving, via the input field, input; and validating, based on the input, that the activation of the hyperlink is associated with the third party.

18. The non-transitory computer-readable medium of claim 14, wherein the operations further comprise:

sending a second electronic notification comprising a confirmation hyperlink for confirming creation of the second tenant instance for the third party; and receiving a third indication of an activation of the confirmation hyperlink, wherein the second tenant instance is generated based on receiving the third indication.

19. The non-transitory computer-readable medium of claim 14, wherein the operations further comprise:

receiving, via the data exchange computing platform, a request from the first party for an artifact from the third party, wherein the request is submitted by the first party through the first tenant instance;

responsive to receiving the request:

sending a second electronic notification to the third party, wherein the second electronic notification identifies the request; and providing access to the request to the third party through the second tenant instance;

receiving the artifact uploaded into the data exchange computing platform by the third party through the second tenant instance; and responsive to receiving the artifact:

sending a third electronic notification to the first party, wherein the third electronic notification identifies the artifact is available through the data exchange service; and providing access to the artifact to the first party through the first tenant instance.

20. The non-transitory computer-readable medium of claim 14, wherein the autocompletion assessment software is configured to automatically identify answers to a set of questions based on previous answers to previous questions provided by the third party in a previous assessment completed by the third party.

* * * * *